US011098222B2

(12) United States Patent
Boghossian et al.

(10) Patent No.: US 11,098,222 B2
(45) Date of Patent: Aug. 24, 2021

(54) SPRAYABLE POLYTHIOETHER COATINGS AND SEALANTS

(71) Applicant: PRC-DeSoto International, Inc., Sylmar, CA (US)

(72) Inventors: Razmik Boghossian, Porter Ranch, CA (US); James Smith, Glendale, CA (US)

(73) Assignee: PRC-DeSoto International, Inc., Sylmar, CA (US)

(*) Notice: Subject to any disclaimer, the term of this patent is extended or adjusted under 35 U.S.C. 154(b) by 275 days.

(21) Appl. No.: 16/026,083

(22) Filed: Jul. 3, 2018

(65) Prior Publication Data
US 2020/0010719 A1 Jan. 9, 2020

(51) Int. Cl.
C09D 175/02 (2006.01)
C09D 181/02 (2006.01)
C08G 18/77 (2006.01)
C08G 75/045 (2016.01)

(52) U.S. Cl.
CPC ......... C09D 175/02 (2013.01); C09D 181/02 (2013.01); C08G 18/775 (2013.01); C08G 75/045 (2013.01)

(58) Field of Classification Search
None
See application file for complete search history.

(56) References Cited

U.S. PATENT DOCUMENTS

| | | | |
|---|---|---|---|
| 3,940,374 A | 2/1976 | Oswald et al. | |
| 3,965,067 A | 6/1976 | Jin | |
| 4,366,307 A | 12/1982 | Singh et al. | |
| 4,496,720 A | 1/1985 | Bruynes et al. | |
| 4,609,762 A | 9/1986 | Morris et al. | |
| 4,623,711 A | 11/1986 | Morris et al. | |
| 4,698,407 A | 10/1987 | Nakagima et al. | |
| 4,902,736 A | 2/1990 | Nonaka et al. | |
| 5,126,421 A | 6/1992 | Majewski et al. | |
| 5,189,176 A | 2/1993 | Blum et al. | |
| 5,206,200 A | 4/1993 | Bush et al. | |
| 5,225,472 A | 7/1993 | Cameron et al. | |
| 5,270,364 A | 12/1993 | Schwartz et al. | |
| 5,284,888 A | 2/1994 | Morgan | |
| 5,747,627 A | 5/1998 | Kimura et al. | |
| 5,912,319 A | 6/1999 | Zook et al. | |
| 6,123,179 A | 7/2000 | Chen | |
| 6,172,179 B1 | 1/2001 | Zook et al. | |
| 6,184,280 B1 | 2/2001 | Shibuta | |
| 6,509,418 B1 | 1/2003 | Zook et al. | |
| 6,525,168 B2 | 2/2003 | Zook et al. | |
| 6,639,046 B1 | 10/2003 | Van Dijk | |
| 7,009,032 B2 | 3/2006 | Bojkova et al. | |
| 7,524,564 B2 | 4/2009 | Cosman | |
| 7,553,908 B1 | 6/2009 | Cosman et al. | |
| 7,598,326 B2 | 10/2009 | Cosman | |
| 7,638,162 B2 | 12/2009 | Cosman | |
| 7,671,145 B2 | 3/2010 | Sawant et al. | |
| 7,786,226 B2 | 8/2010 | Cosman | |
| 7,879,955 B2 | 2/2011 | Rao et al. | |
| 7,888,436 B2 | 2/2011 | Szymanski et al. | |
| 8,017,720 B2 | 9/2011 | Bojkova et al. | |
| 8,092,128 B1 | 1/2012 | Bray et al. | |
| 8,138,273 B2 | 3/2012 | Rao et al. | |
| 8,143,370 B2 | 3/2012 | Lin | |
| 8,513,339 B1 | 8/2013 | Keledjian et al. | |
| 8,541,513 B2 | 9/2013 | Hobbs et al. | |
| 8,710,159 B2 | 4/2014 | Backford et al. | |
| 8,784,989 B2 * | 7/2014 | Kettner | C08K 5/12 428/411.1 |
| 8,869,579 B2 | 10/2014 | Bray et al. | |
| 8,871,896 B2 | 10/2014 | Anderson et al. | |
| 8,952,124 B2 | 2/2015 | Rao et al. | |
| 9,056,949 B2 | 6/2015 | Cai et al. | |
| 2004/0091716 A1 | 5/2004 | Van Den Berg et al. | |
| 2004/0152866 A1 | 8/2004 | Cosman | |
| 2004/0220327 A1 | 11/2004 | Cosman et al. | |
| 2005/0010003 A1 | 1/2005 | Sawant et al. | |
| 2006/0175005 A1 | 8/2006 | Sawant et al. | |
| 2006/0270796 A1 | 11/2006 | Sawant | |
| 2007/0173602 A1 | 7/2007 | Brinkamn et al. | |
| 2007/0184290 A1 | 8/2007 | Ando et al. | |
| 2007/0287810 A1 | 12/2007 | Rao et al. | |
| 2008/0194720 A1 | 8/2008 | Stappers et al. | |
| 2009/0326167 A1 | 12/2009 | Sawant et al. | |
| 2010/0010133 A1 | 1/2010 | Zook et al. | |
| 2010/0036063 A1 | 2/2010 | Sawant et al. | |
| 2010/0041839 A1 | 2/2010 | Anderson et al. | |
| 2010/0184899 A1 | 7/2010 | Rao et al. | |
| 2011/0009557 A1 | 1/2011 | Lin | |
| 2011/0319559 A1 | 12/2011 | Kania et al. | |
| 2012/0040104 A1 | 2/2012 | Keledjian et al. | |
| 2012/0121359 A1 | 5/2012 | Bray et al. | |
| 2012/0168055 A1 | 7/2012 | Bray et al. | |
| 2012/0234205 A1 | 9/2012 | Hobbs et al. | |
| 2012/0234255 A1 | 9/2012 | Bernardini et al. | |
| 2012/0238707 A1 | 9/2012 | Hobbs et al. | |
| 2012/0238708 A1 | 9/2012 | Hobbs et al. | |
| 2012/0277382 A1 | 11/2012 | Booth et al. | |
| 2013/0071571 A1 | 3/2013 | Hobbs et al. | |
| 2013/0079485 A1 | 3/2013 | Cai et al. | |
| 2013/0181161 A1 | 7/2013 | Pajel et al. | |
| 2013/0284359 A1 | 10/2013 | Virnelson | |
| 2013/0296490 A1 | 11/2013 | Hobbs et al. | |
| 2013/0344251 A1 | 12/2013 | Cai et al. | |

(Continued)

FOREIGN PATENT DOCUMENTS

EP 499188 8/1992
EP 565798 10/1993

(Continued)

OTHER PUBLICATIONS

Glass., "A Facile Synthesis of Trimethylsilyl Thioethers", Journal of Organometallic Chemistry, Mar. 20, 1973, vol. 61, p. 83-90.

(Continued)

Primary Examiner — Tae H Yoon
(74) Attorney, Agent, or Firm — William R. Lambert

(57) ABSTRACT

Isocyanate-terminated chain-extended polythioether prepolymers, compositions thereof, and methods of use thereof are disclosed. The isocyanate-terminated chain-extended polythioether prepolymers are useful in sprayable coatings and sealants and especially sprayable coatings and sealants having a high filler content.

30 Claims, No Drawings

(56) References Cited

U.S. PATENT DOCUMENTS

| | | |
|---|---|---|
| 2013/0344253 A1 | 12/2013 | Abrami et al. |
| 2013/0344340 A1* | 12/2013 | Senkfor ............ C08G 18/3234 428/419 |
| 2013/0345371 A1 | 12/2013 | Anderson et al. |
| 2013/0345389 A1 | 12/2013 | Cai et al. |
| 2014/0051789 A1 | 2/2014 | Rao et al. |
| 2014/0110881 A1 | 4/2014 | Keledjian et al. |
| 2014/0272287 A1 | 9/2014 | Cai et al. |
| 2014/0275461 A1 | 9/2014 | Rao et al. |
| 2014/0275474 A1 | 9/2014 | Rao et al. |
| 2014/0314960 A1 | 10/2014 | Srivatsan et al. |
| 2014/0378650 A1 | 12/2014 | Rao et al. |
| 2015/0086726 A1 | 3/2015 | Keledjian et al. |
| 2015/0099858 A1 | 4/2015 | Cai et al. |
| 2015/0119549 A1 | 4/2015 | Rao et al. |
| 2015/0240122 A1 | 8/2015 | Rao et al. |
| 2015/0240140 A1 | 8/2015 | Rao et al. |
| 2015/0252230 A1 | 9/2015 | Keledjian et al. |
| 2015/0252232 A1 | 9/2015 | Keledjian et al. |
| 2016/0090507 A1 | 3/2016 | Keledjian et al. |
| 2018/0171060 A1 | 6/2018 | Boghossian et al. |

FOREIGN PATENT DOCUMENTS

| | | |
|---|---|---|
| EP | 2148897 | 2/2010 |
| JP | 63053195 | 3/1988 |
| JP | 6093073 | 4/1994 |
| JP | 6271641 | 9/1994 |
| JP | 7025966 | 1/1995 |
| JP | 7025972 | 1/1995 |
| JP | 7188612 | 7/1995 |
| JP | 9255750 | 9/1997 |
| JP | H10-81826 | 3/1998 |
| JP | H11-36599 | 2/1999 |
| JP | 2002-363251 | 12/2012 |
| WO | 95/03156 | 2/1995 |
| WO | 96/08308 | 3/1996 |
| WO | 99/07762 | 2/1999 |
| WO | 99/55794 | 11/1999 |
| WO | 2005/054307 | 6/2005 |
| WO | 2006/083343 | 8/2006 |
| WO | 2012/061498 | 5/2012 |
| WO | 2013/192266 | 12/2013 |
| WO | 2013/192279 | 12/2013 |
| WO | 2015/134850 | 9/2015 |

OTHER PUBLICATIONS

Lowry et al., Cure Evaluation of Intelimer latent curing agents for Thermoset Resin Applications, Thermostat Resin Formulators Association Meetings, Chicago, IL, Sep. 15-16, 2008., 23 pages.

Martel et al., "Coordination of Al(III) in the environment and in biological systems", Coordination Chemistry Reviews, 1996, vol. 149, p. 311-328.

Matsui et al., "New Liquid Polysilfide Polymer Termianted with Silyl Group", Journal of Applied Polymer Science, Apr. 27, 2004, vol. 93, p. 2642-2649.

International Search Report and Written Opinion for Application No. PCT/US2016/065637, dated Jul. 15, 2017, 11 pages.

International Search Report and Written Opinion for Application No. PCT/US2017/039724, dated Jan. 4, 2018, 10 pages.

* cited by examiner

SPRAYABLE POLYTHIOETHER COATINGS AND SEALANTS

FIELD

The disclosure relates to chain-extended polythioether prepolymers, to sprayable coating and sealant formulations containing the chain-extended polythioether prepolymers, and to cured coatings and sealants prepared from the prepolymers and sprayable formulations.

BACKGROUND

Coatings and sealants based on sulfur-containing prepolymers can meet the performance requirements of many applications requiring high tensile strength and % elongation and the ability to maintain those properties following solvent immersion such as important in aerospace applications. Polyurethane prepolymers incorporating nonlinear short chain diols are disclosed in U.S. application Ser. No. 15/384,346 filed on Dec. 20, 2016, which is incorporated by reference in its entirety. However, as existing requirements continue to develop and new requirements are imposed there is a continuing need to develop new coatings and sealants. In addition to meeting the performance requirements it is desirable that sprayable coatings and sealants cure rapidly upon application to the surface of a vehicle.

SUMMARY

According to the present invention, isocyanate-terminated chain-extended polythioether prepolymers comprise reaction products of reactants, wherein the reactants comprise: a thiol-terminated polythioether, a hydroxyl-terminated polythioether, or a combination thereof; a diisocyanate; a diisocyanate trimer; and a non-linear short chain diol.

According to the present invention, isocyanate-terminated chain-extended polythioether prepolymers comprise a moiety of Formula (15):

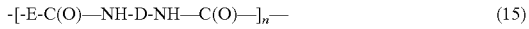

-[-E-C(O)—NH-D-NH—C(O)—]$_n$—      (15)

wherein,
n is an integer from 1 to 60;
each E is independently selected from (i), (ii), and (iii), wherein,
(i) is a moiety derived from a non-linear short-chain diol;
(ii) is a moiety derived from a thiol-terminated polythioether; and
(iii) is a moiety derived from a hydroxyl-terminated polythioether; and
each D is independently selected from a moiety derived from a diisocyanate and a moiety derived from a diisocyanate trimer,
wherein the prepolymer comprises:
at least one moiety of Formula (15) in which E is selected from (i); and at least one moiety of Formula (15) in which E is selected from (ii); or
at least one moiety of Formula (15) in which E is selected from (i); and at least one moiety of Formula (15) in which E is selected from (iii).

According to the present invention, isocyanate-terminated chain-extended polythioether prepolymers comprise a prepolymer having the structure of Formula (19):

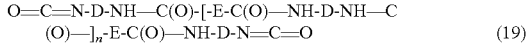

O=C=N-D-NH—C(O)-[-E-C(O)—NH-D-NH—C(O)—]$_n$-E-C(O)—NH-D-N=C=O      (19)

wherein,
n is an integer from 1 to 60;
each E is independently selected from (i), (ii), and (iii), wherein,
(i) is a moiety derived from a non-linear short-chain diol;
(ii) is a moiety derived from a thiol-terminated polythioether; and
(iii) is a moiety derived from a hydroxyl-terminated polythioether; and
each D is independently selected from a moiety derived from a diisocyanate and a moiety derived from a diisocyanate trimer,
wherein the prepolymer comprises:
at least one E is selected from (i); and at least one E is selected from (ii); or
at least one E is selected from (i); and at least one E is selected from (iii).

According to the present invention, methods of making an isocyanate-terminated chain-extended polythioether prepolymer comprise:
(a) combining:
a polythioether, wherein the polythioether comprises a thiol-terminated polythioether, a hydroxyl-terminated polythioether, or a combination thereof;
a diisocyanate;
a non-linear short-chain diol; and
a diisocyanate trimerization catalyst to provide a first mixture;
(b) reacting the first mixture to provide a second mixture, wherein the second mixture comprises a diisocyanate trimer, the polythioether, the diisocyanate, and the non-linear short-chain diol;
(c) adding a cross-linking catalyst to the second mixture; and
(d) reacting the second mixture to provide an isocyanate-terminated chain-extended polythioether prepolymer.

According to the present invention, isocyanate-terminated chain-extended-polythioether prepolymers are prepared by a method according to the present invention.

According to the present invention, compositions comprise an isocyanate-terminated chain-extended polythioether prepolymer according to the present invention.

According to the present invention, a cured composition is prepared from a composition according to the present invention.

According to the present invention, parts comprise a cured composition according to the present invention.

According to the present invention, vehicles comprise a cured composition according to the present invention.

According to the present invention, methods of coating a surface comprise applying a composition according to the present invention to a surface; and curing the applied composition to provide a surface coating.

According to the present invention coating systems comprise: a first part, wherein the first part comprises the isocyanate-terminated chain-extended polythioether prepolymer according to the present invention; and a second part, wherein the second part comprises a curing agent reactive with the isocyanate-terminated chain-extended polythioether prepolymer.

According to the present invention, methods of coating a surface comprise: combining the first part of the coating system according to the present invention with the second part of the coating system according to the present invention to provide a coating composition; applying the coating composition to a surface; and curing the applied coating composition to provide a coated surface.

According to the present invention, cured compositions are prepared using the method according to the present invention.

According to the present invention, parts comprise a cured composition according to the present invention.

According to the present invention, vehicles comprise a cured composition according to the present invention.

DETAILED DESCRIPTION

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredient7s used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("-") that is not between two letters or symbols is used to indicate a point of bonding for a substituent or between two atoms. For example, —CONH$_2$ is bonded to another atom through the carbon atom.

A hydrocarbon group includes saturated and unsaturated groups. For example, a hydrocarbyl group includes hydrocarbyl groups having any degree of level of saturation such as having exclusively carbon-carbon single bonds, groups having one or more carbon-carbon double bonds, groups having one or more carbon-carbon triple bonds, and groups hang combinations of carbon-carbon single, double, and triple bonds. Where a specific level of saturation is intended, the terms alkane, alkene, alkynyl are specifically used.

"Alkanediyl" refers to a diradical of a saturated or unsaturated branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of two carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, decane-1,10-diyl, and dodecane-1,12-diyl.

"Alkanecycloalkane" refers to a saturated or unsaturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$ arenediyl, $C_{6-10}$ arenediyl, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{7-18}$ alkanearene, $C_{7-16}$ alkanearene, $C_{7-13}$ alkanearene, $C_{7-8}$ alkanearene, $C_{7-13}$ alkanearene, $C_{7-10}$ alkanearene, or $C_{7-9}$ alkanearene. Examples of alkanearene groups include diphenyl methane.

"Alkanearenediyl" refers to a diradical of an alkanearene group. An alkanearenediyl group is $C_{7-18}$ alkanearenediyl, $C_{7-16}$ alkanearenediyl, $C_{7-13}$ alkanearenediyl, $C_{7-8}$ alkanearenediyl, $C_{7-13}$ alkanearenediyl, $C_{7-10}$ alkanearenediyl, or $C_{7-9}$ alkanearenediyl. Examples of alkanearenediyl groups include diphenyl methane-4,4'-diyl.

"Alkenyl" group refers to the structure —CR═C(R)$_2$ where the alkenyl group is a terminal group and is bonded to a larger molecule. In such embodiments, each R may independently comprise, for example, hydrogen and $C_{1-3}$ alkyl. Each R can be hydrogen and an alkenyl group can have the structure —CH═CH$_2$.

"Alkoxy" refers to a —OR group where R is alkyl as defined herein. Examples of alkoxy groups include methoxy, ethoxy, n-propoxy, isopropoxy, and n-butoxy. An alkoxy group can be $C_{1-8}$ alkoxy, $C_{1-6}$ alkoxy, $C_{1-4}$ alkoxy, or $C_{1-3}$ alkoxy.

"Alkyl" refers to a monoradical of a saturated or unsaturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group can be $C_{1-6}$ alkyl, $C_{1-4}$ alkyl, and $C_{1-3}$ alkyl.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_{6-8}$ arenediyl, or benzene-diyl.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

"Cycloalkyl" refers to a saturated monocyclic or polycyclic hydrocarbon mono-radical group. A cycloalkyl group can be $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, or P. In a heteroalkanediyl, the one or more heteroatoms can comprise N or O.

"Heteroalkyl" refers to $C_{2-20}$ alkyl group in which one or more of the carbon atoms and associated hydrogen atoms are replaced with a heteroatom, such as N, O, S, or P, or an heteroatom and associated hydrogen atom such as —NH—. In a heteroalkyl, the one or more heteroatoms can comprise N or O. Heteroalkyl includes alkoxy. A $C_{2-4}$ heteroalkyl can have one to three carbon atoms and from one to four heteroatoms such as, for example, —CH$_2$—SH, —S—SH, —CH$_2$—O—CH$_3$, —S—CH$_2$—CH$_2$—OH and others. A $C_2$ heteroalkyl can be, for example, —CH$_2$—OH and —S—CH$_3$. A heteroalkyl group can be, for example, $C_{2-20}$ heteroalkyl, $C_{2-16}$, $C_{2-12}$, $C_{2-10}$, $C_{2-8}$, $C_{2-6}$, or $C_{2-4}$ heteroalkyl.

"Heterocycloalkanediyl" refers to a cycloalkanediyl group in which one or more of the carbon atoms are replaced with a heteroatom, such as N, O, S, or P. In a heterocycloalkanediyl, the one or more heteroatoms can comprise N or O.

"Heteroarenediyl" refers to an arenediyl group in which one or more of the carbon atoms are replaced with a heteroatom, such as N, O, S, or P. In a heteroarenediyl, the one or more heteroatoms can comprise N or O.

"Substituted" refers to a group in which one or more hydrogen atoms are each independently replaced with the same or different substituent(s). A substituent can comprise halogen, —S(O)$_2$OH, —S(O)$_2$, —SH, —SR where R is $C_{1-6}$ alkyl, —COOH, —NO$_2$, —NR$_2$ where each R independently comprises hydrogen and $C_{1-3}$ alkyl, —CN, =O, $C_{1-6}$ alkyl, —CF$_3$, —OH, phenyl, $C_{2-6}$ heteroalkyl, $C_{5-6}$ heteroaryl, $C_{1-6}$ alkoxy, or —C(O)R where R is $C_{1-6}$ alkyl. A substituent can be —OH, —NH$_2$, or $C_{1-3}$ alkyl.

"Formed from" or "prepared from" denotes open, e.g., comprising, claim language. As such, it is intended that a composition "formed from" or "prepared from" a list of recited components include a composition comprising at least the recited components or the reaction product of at least the recited components, and can further comprise other, non-recited components used to form or prepare the composition.

"Reaction product of" means a chemical reaction product(s) of at least the recited reactants, and can include partial reaction products as well as fully reacted products and other reaction products that are present in a lesser amount. For example, a "prepolymer comprising the reaction product of reactants" refers to a prepolymer or combination of prepolymers that are the reaction product of at least the recited reactants. The reactants can further comprise additional reactants.

As used herein, the term "cure" or "cured" as used in connection with a composition, e.g., "composition when cured" or a "cured composition", means that any curable or crosslinkable components of the composition are at least partially reacted or crosslinked.

The term "equivalent" refers to the number of functional reactive groups of the substance. "Equivalent weight" is effectively equal to the molecular weight of a substance, divided by the valence or number of functional reactive groups of the substance.

A "backbone" of a prepolymer refers to the segment between the reactive terminal groups. A prepolymer backbone typically includes repeating subunits. For example, the backbone of a polythiol HS—[R]$_n$—SH is —[R]$_n$—.

A "core" of a polyfunctionalizing agent B(—V)$_z$ refers to the moiety B. B can include the polyfunctionalizing agent with the terminal functional group V.

"Prepolymer" refers to oligomers, homopolymers, and copolymers. For thiol-terminated prepolymers, molecular weights are number average molecular weights "Mn" as determined by end group analysis using iodine titration, unless indicated otherwise. For prepolymers that are not thiol-terminated, the number average molecular weights are determined by gel permeation chromatography using polystyrene standards. A prepolymer comprises reactive groups capable of reacting with another compound such as a curing agent or crosslinker to form a cured polymer. A prepolymer such as a chain-extended polythioether prepolymer provided by the present disclosure can be combined with a curing agent to provide a curable composition, which can cure to provide a cured polymer network. Prepolymers are liquid at room temperature (25° C.) and pressure (760 torr; 101 kPa).

A prepolymer includes multiple repeating subunits bonded to each other that can be the same or different. The multiple repeating subunits make up the backbone of the prepolymer.

A "curable composition" refers to a composition that comprises at least two reactants capable of reacting to form a cured composition. For example, a curable composition can comprise an isocyanate-terminated chain-extended polythioether prepolymer and a polyamine capable of reacting to form a cured polymer. A curable composition may include a catalyst for the curing reaction and other components such as, for example, fillers, pigments, and adhesion promoters. A curable composition may be curable at room temperature, or may require exposure to elevated temperature such as a temperature above room temperature or other condition(s) to initiate and/or to accelerate the curing reaction. A curable composition may initially be provided as a two-part composition including, for example, a separate base component and an accelerator component. The base composition can contain one of the reactants participating in the curing reaction such as an isocyanate-terminated chain-extended polythioether prepolymer and the accelerator component can contain the other reactant such as a polyamine. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec) at 25° C. A Class B sealant composition, which is suitable for fillet seal applications, can be characterized by a viscosity from 4,500 poise to 20,000 poise (450 Pa-sec to 2,000 Pa-sec) at 25° C. A Class C sealant composition, which is suitable for fay seal applications, can be characterized by a viscosity from 500 poise to 4,500 poise (50 Pa-sec to 450 Pa-sec) at 25° C. The viscosity of the compositions is measured as described herein. After the two components of a sealant system are combined and mixed, the curing reaction can proceed and the viscosity of the curable composition can increase and at some point, will no longer be workable, as described herein. The duration between when the two components are mixed to form the curable composition and when the curable composition can no longer be reasonably or practically applied to a surface for its intended purpose can be referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, cures, and then fully cures over a period of time. A curable composition can be considered to be cured when the hardness of the surface is at least 30 Shore A for a Class B sealant or a Class C sealant. After a sealant has cured to a hardness of 30 Shore A it can take from several days to several weeks for a curable composition fully cure. A composition is considered fully cured when the hardness no longer increases. Depending on the formulation, a fully cured sealant can exhibit, for example, a hardness from 40 Shore A to 70 Shore A, determined according to ISO 868. For coating applications, a curable composition can have a viscosity, for example, from 200 cps to 800 cps (0.2 Pa-sec to 0.8 Pa-sec) at 25° C. For sprayable coating and sealant compositions, a curable composition can have a viscosity, for example, from 15 cps to 100 cps (0.015 Pa-sec to 0.1 Pa-sec), such as from 20 cps to 80 cps (0.02 Pa-sec to 0.08 Pa-sec) at 25° C.

"Derived from" as in "a moiety derived from a compound" refers to a moiety that is generated upon reaction of a parent compound with a reactant. For example, a bis (alkenyl) compound $CH_2$=CH—R—CH=$CH_2$ can react with another compound such as two compounds having thiol groups to produce the moiety—$(CH_2)_2$—R—$(CH_2)_2$— derived from the reaction of the alkenyl groups with the thiol groups. For example, for a parent diisocyanate having the structure O=C=N—R—N=C=O, a moiety derived from the diisocyanate has the structure —C(O)—NH—R—NH—C(O)—. As another example, for a parent non-linear short chain diol having the structure HO—R—OH, a moiety derived from the non-linear short-chain diol has the structure —O—R—O—.

"Derived from the reaction of —V with a thiol" refers to a moiety —V'— that results from the reaction of a thiol group with a moiety comprising a terminal group reactive with a thiol group. For example, a group V— can comprise $CH_2$=CH—$CH_2$—O—, where the terminal alkenyl group $CH_2$=CH— is reactive with a thiol group —SH. Upon reaction with a thiol group, the moiety —V'— is —$CH_2$—$CH_2$—$CH_2$—O—.

A "core" of a compound or a polymer refers to the segment between the reactive terminal groups. For example, the core of a polythiol HS—R—SH will be —R—. A core of a compound or prepolymer can also be referred to as a backbone of a compound or a backbone of a prepolymer. A core of a polyfunctionalizing agent can be an atom or a structure such as a cycloalkane, a substituted cycloalkane, heterocycloalkane, substituted heterocycloalkane, arene, substituted arene, heteroarene, or substituted heteroarene from which moieties having a reactive functional are bonded.

Specific gravity and density of compositions and sealants is determined according to ISO 2781.

Specific gravity and density of fillers is determined according to ISO 787 (Part 10).

Shore A hardness is measured using a Type A durometer in accordance with ISO 868.

Tensile strength and elongation are measured according to ISO 37.

Glass transition temperature $T_g$ is determined by dynamic mechanical analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

Skydrol® is a fire-resistant hydraulic fluid based on phosphate ester chemistry. Skydrol® fluids include Skydrol® 500B-4, Skydrol® LD-4, Skydrol® 5, and Skydrol® PE-5 which are commercially available from Eastman Chemical Company.

When reference is made to a chemical group defined, for example, by a number of carbon atoms, the chemical group is intended to include all sub-ranges of carbon atoms as well as a specific number of carbon atoms. For example, a $C_{2-10}$ alkanediyl includes a $C_{2-4}$ alkanediyl, $C_{5-7}$ alkanediyl, and other sub-ranges, a $C_2$ alkanediyl, a $C_6$ alkanediyl, and alkanediyls having other specific number(s) of carbon atoms from 2 to 10, for example, 2, 3, 4, 5, 6, 7, 8, 9 or 10.

"Diisocyanate" refers to an organic component having two isocyanate groups —N=C=O. A diisocyanate can include aliphatic diisocyanates, alicyclic diisocyanates, and aromatic diisocyanates. A diisocyanate can have a molecular weight of, for example, less than 1,500 Daltons, less than 1,250 Daltons, less than 1,000 Daltons, less than 750 Daltons, or less than 500 Daltons. Diisocyanates are capable of forming a covalent bond with a reactive group such as hydroxyl, thiol, or amine functional group. Diisocyanates useful in the present invention can be branched or unbranched. Use of branched diisocyanates may be desirable to increase the free volume within the cured polymer matrix to provide space for the molecules to move.

"Short-chain diol" refers to a compound having two hydroxyl groups linked through an organic moiety. A short-chain diol can include a linear short-chain diol, a non-linear short-chain diol, or a combination thereof. A linear short chain diol has a linking group consisting of methane-diyl groups (—$CH_2$—) or one or more of the methane-diyl groups can be substituted with a heteroatom such as —O—, —S—, or —NH—. Non-linear short-chain diols include branched short chain diols and cyclic diols. In a branched short-chain diol, one or more of the methane-diyl groups comprises one or two substituent groups, which can be expressed, for example, as —CH(—$R^1$)— and —C($R^1$)$_2$—, where $R^1$ represents a substituent group. A substituent group can be a $C_{1-4}$ alkyl group such as methyl, ethyl, n-propyl, isopropyl, n-butyl, and iso-butyl. A non-linear short-chain diol can also include cyclic diols in which the group linking the two hydroxyl groups comprises a cyclic organic moiety. A short-chain diol can have a molecular weight, for example, less than 500 Daltons, less than 400 Daltons, less than 300 Daltons, less than 200 Daltons, or less than 100 Daltons. A short-chain diol including linear and non-linear short-chain diols can have a molecular weight, for example, from 50 Daltons to 500 Daltons, from 50 Daltons to 400 Daltons, from 50 Daltons to 300 Daltons, or from 50 Daltons to 200 Daltons. When a moiety derived from a non-linear short-chain diol is incorporated into a prepolymer backbone, it is believed that the non-linear segments within the prepolymer backbone can increase the free volume within the cured polymer matrix, thereby providing free volume for molecular motion. The molecules can orient and rotate into configurations and alignments having favorable energy states which can provide good impact properties and/or high modulus of elasticity for the cured polymer matrix.

"Polymeric diol" refers to a diol characterized by a molecular weight greater than that of a short-chain diol. For example, a polymeric diol can be characterized by a weight average molecular weight greater than 500 Daltons, greater than 1,000 Daltons, greater than 2,000 Daltons, greater than 3,000 Daltons, or greater than 4,000 Daltons. Polymeric diols are liquid at room temperature such as 25° C. and 100 kPa.

"Polyfunctionalizing agent" refers to a compound having reactive functionality of three or more, such as from 3 to 6. A polyfunctionalizing agent can have three reactive functional groups and can be referred to as a trifunctionalizing agent. Polyfunctionalizing agents can be used as precursors for synthesizing the sulfur-containing prepolymers provided by the present disclosure and/or can be used as a reactant in the polymer curing composition to increase the crosslinking density of the cured polymer network. A polyfunctionalizing agent can have reactive terminal thiol groups, reactive terminal alkenyl groups, or a combination thereof. A polyfunctionalizing agent can have a calculated molecular weight, for example, less than 2,000 Daltons, less than 1,800 Daltons, less than 1,400 Daltons, less than 1,200 Daltons, less than 1,000 Daltons, less than 800 Daltons, less than 700 Daltons, less than 600 Daltons, less than 500 Daltons, less than 400 Daltons, less than 300 Daltons, or less than 200 Daltons. For example, a polyfunctionalizing agent can have a calculated molecular weight from 100 Daltons to 2,000 Daltons, from 200 Daltons to 2,000 Daltons, from 200 Daltons to 1,800 Daltons, from 300 Daltons to 1,500 Daltons, or from 300 Daltons to 1,000 Daltons.

A polyfunctionalizing agent can have the structure of Formula (1):

$$B^1(-V)_z \qquad (1)$$

where $B^1$ is the core of the polyfunctionalizing agent, each V is a moiety terminated in a reactive functional group such as a thiol group, an alkenyl group, an epoxy group, an isocyanate group, or a Michael acceptor group, and z is an integer from 3 to 6, such as 3, 4, 5, or 6. In polyfunctionalizing agents of Formula (1), each —V can have the structure, for example, —R—SH or —R—CH=$CH_2$, where R can be, for example, $C_{2-10}$ alkanediyl, $C_{2-10}$ heteroalkanediyl, substituted $C_{2-10}$ alkanediyl, or substituted $C_{2-10}$ heteroalkanediyl.

When the moiety V is reacted with another compound the moiety —V'— results and is said to be derived from the reaction with the other compound. For example, when V is —R—CH=$CH_2$ and is reacted, for example, with a thiol group, the moiety $V^1$ is —R—$CH_2$—$CH_2$— is derived from the reaction.

In polyfunctionalizing agents of Formula (1), $B^1$ can be, for example $C_{2-8}$ alkane-triyl, $C_{2-8}$ heteroalkane-triyl, $C_{5-8}$ cycloalkane-triyl, $C_{5-8}$ heterocycloalkane-triyl, substituted $C_{5-8}$ cycloalkene-triyl, $C_{5-8}$ heterocycloalkane-triyl, $C_6$ arene-triyl, $C_{4-5}$ heteroarene-triyl, substituted $C_6$ arene-triyl, or substituted $C_{4-5}$ heteroarene-triyl.

In polyfunctionalizing agents of Formula (1), $B^1$ can be, for example, $C_{2-8}$ alkane-tetrayl, $C_{2-8}$ heteroalkane-tetrayl, $C_{5-10}$ cycloalkane-tetrayl, $C_{5-10}$ heterocycloalkane-tetrayl, $C_{6-10}$ arene-tetrayl, $C_4$ heteroarene-tetrayl, substituted $C_{2-8}$ alkane-tetrayl, substituted $C_{2-8}$ heteroalkane-tetrayl, substituted $C_{5-10}$ cycloalkane-tetrayl, substituted $C_{5-10}$ heterocycloalkane-tetrayl, substituted $C_{6-10}$ arene-tetrayl, and substituted $C_{4-10}$ heteroarene-tetrayl.

Examples of suitable alkenyl-terminated polyfunctionalizing agents include triallyl cyanurate (TAC), triallylisocyanurate (TAIC), 1,3,5-triallyl-1,3,5-triazinane-2,4,6-trione, 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

A polyfunctionalizing agent of Formula (1) can be thiol terminated.

Examples of suitable trifunctional thiol-terminated polyfunctionalizing agents include, for example, 1,2,3-propanetrithiol, 1,2,3-benzenetrithiol, 1,1,1-butanetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable mercapto-acetate polythiol polyfunctionalizing agents include pentaerythritol tetramercaptoacetate (PRTMA), trimethylolpropane trimercaptoacetate (TMPMA), glycol dimercaptoacetate (GDMA), ethyleneglycol dimercaptoacetate, di-trimethylolpropane tetramercaptoacetate, and combinations of any of the foregoing.

Examples of suitable mercapto-acrylates polythiol polyfunctionalizing agents include pentaerythritol tetraacrylate, tris[2-(3-mercaptopropionyloxy)ethyl]isocyanurate, 2,3-di(2-mercaptoethylthio)-1-propane-thiol, dimercaptodiethylsulfide (2,2'-thiodiethanethiol), dimercaptodioxaoctane (2,2'-(ethylenedioxy)diethanethiol, 1,8-dimercapto-3,6-dioxaoctane, and combinations of any of the foregoing.

Suitable polythiol polyfunctionalizing agents are commercially available, for example, from Bruno Bock Thiochemicals under the Thiocure® tradename.

"Derived from a polyfunctionalizing agent" refers to a moiety that results from the reaction of a polyfunctionalizing agent with a reactive functional group. For example, a moiety derived from the polyfunctionalizing agent triallyl cyanurate:

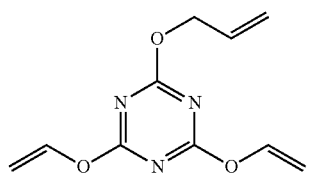 [SMILES: C=CCOc1nc(OC=C)nc(OC=C)n1]

results in a moiety having the structure:

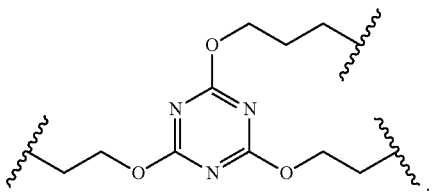 [SMILES: *CCCOc1nc(OCC*)nc(OCC*)n1]

where the segments are bonded to the other reactants.

"Polyol polyfunctionalizing agent" refers to a polyol having, for example, from 3 to 6 terminal hydroxyl groups. A polyol polyfunctionalizing agent can have a molecular weight, for example, less than 1,400 Daltons, less than 1,200 Daltons, less than 1,000 Daltons, less than 800 Daltons, less than 700 Daltons, less than 600 Daltons, less than 500 Daltons, less than 400 Daltons, less than 300 Daltons, less than 200 Daltons, or less than 100 Daltons. Polyol polyfunctionalizing agents can be represented by the formula $B^4(-V)_z$, where $B^4$ represents a core of a z-valent polyfunctionalizing agent $B^4(-V)_z$, z is an integer from 3 to 6; and each —V is a moiety comprising a terminal hydroxyl (—OH) group.

"Polythiol polyfunctionalizing agent" refers to a polythiol having, for example, from 3 to 6 terminal thiol groups. A polythiol polyfunctionalizing agent can have a molecular weight, for example, less than 1,400 Daltons, less than 1,200 Daltons, less than 1,000 Daltons, less than 800 Daltons, less than 700 Daltons, less than 600 Daltons, less than 500 Daltons, less than 400 Daltons, less than 300 Daltons, less than 200 Daltons, or less than 100 Daltons. Polythiol polyfunctionalizing agents can be represented by the formula $B^4(-V)_z$, where $B^4$ represents a core of a z-valent polyfunctionalizing agent $B^4(-V)_z$, z is an integer from 3 to 6; and each —V is a moiety comprising a terminal thiol (—SH) group.

"Composition" is intended to encompass a combination or mixture comprising the specified components in the specified amounts, as well as any product which results, directly or indirectly, from the combination of the specified ingredients in the specified amounts.

"A moiety derived from reaction with an isocyanate group" refers to a moiety produced by the reaction of a parent moiety with an isocyanate group. For example, a hydroxyl-terminated parent moiety having the structure —$R^1$—OH, upon reaction with a moiety having a terminal isocyanate group —$R^2$—N=C=O, will produce the moiety —$R^1$—O—C(O)—NH—$R^2$— and herein the moieties —$R^1$—O—, and the moiety —$R^2$—NH—C(O)—, and —$R^1$—O—C(O)—NH—$R^2$— are said to be derived from reaction of the moiety —$R^1$—OH with the moiety having a terminal isocyanate group —$R^2$—N=C=O.

"Derived from" as in "a moiety derived from a compound" refers to a moiety that is generated upon reaction of a parent compound with a reactant. For example, a bis (alkenyl) compound $CH_2$=CH—R—CH=$CH_2$ can react with another compound such as two compounds having thiol groups to produce the moiety—$(CH_2)_2$—R—$(CH_2)_2$— derived from the reaction.

As used herein, the term "cure" or "cured" as used in connection with a composition, e.g., "composition when cured" or a "cured composition", means that any curable or crosslinkable components of the composition are at least partially reacted or crosslinked.

"Molecular weight" refers to a theoretical molecular weight estimated from the chemical structure of a compound such as a monomeric compound, or a number average molecular weight as appropriate for a prepolymer determined, for example, using gel permeation chromatography using polystyrene standards, unless indicated otherwise.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

Isocyanate-terminated chain-extended polythioether prepolymers are disclosed. Sprayable compositions comprising the isocyanate-terminated chain-extended polythioether prepolymers can be used to prepare aerospace coatings and sealants.

Isocyanate-terminated chain-extended prepolymers provided by the present disclosure can include non-linear short chain diols incorporated into the polythioether backbone of the prepolymer. Isocyanate-terminated chain-extended prepolymers provided by the present disclosure includes diisocyanates, diisocyanate trimers, and combinations thereof incorporated into the polythioether backbone. Isocyanate-terminated chain-extended prepolymers provided by the present disclosure can include both non-linear short chain diols, diisocyanates, and diisocyanate trimers incorporated into the polythioether backbone.

Isocyanate-terminated chain-extended prepolymers provided by the present disclosure can comprise the reaction product of reactants comprising a polythioether prepolymer, wherein the polythioether prepolymer comprises a thiol-terminated prepolymer, a hydroxyl-terminated prepolymer, or a combination thereof; a diisocyanate; a diisocyanate trimer; and a non-linear short-chain diol. The reaction products can further comprise a linear short-chain diol, a polyfunctionalizing agent such as a polythiol polyfunctionalizing agent having a thiol functionality from 3 to 6 and/or a polyol polyfunctionalizing agent having a hydroxyl functionality from 3 to 6, or a combination of any of the foregoing.

A polythioether can comprise a thiol-terminated polythioether, a hydroxyl-terminated polythioether, or a combination thereof. A thiol-terminated polythioether, a hydroxyl-terminated polythioether, or both the thiol-terminated polythioether and the hydroxyl-terminated polythioether can comprise a moiety having the structure of Formula (2):

wherein, n is an integer from 1 to 60;

each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and —$[(CHR^3)_p$—X—$]_q$—$(CHR^3)_r$—, wherein, p is an integer from 2 to 6;

q is an integer from 1 to 5;

r is an integer from 2 to 10;

each $R^3$ is independently selected from hydrogen and methyl; and each X is independently selected from O, S, S—S, and NR, wherein R is selected from hydrogen and methyl; and each A is independently a moiety derived from a polyvinyl ether of Formula (3) or a polyalkenyl polyfunctionalizing agent of Formula (4):

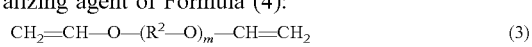

wherein, m is an integer from 0 to 50;

each $R^2$ is independently selected from $C_{1-10}$ alkanediyl, $C_{6-8}$ cycloalkanediyl, $C_{6-14}$ alkanecycloalkanediyl, and $—[(CHR^3)_p—X—]_q(CHR^3)_r—$, wherein p, q, r, $R^3$, and X are as defined as for $R^1$;

$B^2$ represents a core of a z-valent, polyalkenyl polyfunctionalizing agent $B^2(—R^{20}—CH=CH_2)_z$ wherein, z is an integer from 3 to 6; and each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

In moieties of Formula (2), $R^1$ can be $C_{2-10}$ alkanediyl.

In moieties of Formula (2), $R^1$ can be $—[(CHR^3)_p—X—]_q(CHR^3)_r—$.

In moieties of Formula (2), X can be selected from O and S, and thus $—[(CHR^3)_p—X—]_q(CHR^3)_r—$ in Formula (2) can be $—[(CHR^3)_p—O-]_q(CHR^3)_r—$ or $—[(CHR^3)_p—S—]_q(CHR^3)_r—$. P and r can be equal, such as where p and r can be both two.

In moieties of Formula (2), $R^1$ can be selected from $C_{2-6}$ alkanediyl and $—[(CHR^3)_p—X—]_q(CHR^3)_r—$.

In moieties of Formula (2), $R^1$ can be $—[(CHR^3)_p—X—]_q(CHR^3)_r—$, and X can be O, or X can be S.

In moieties of Formula (2) where $R^1$ can be $—[(CHR^3)_p—X—]_q(CHR^3)_r—$, p can be 2, r can be 2, q can be 1, and X can be S; or p can be 2, q can be 2, r can be 2, and X can be O; or p can be 2, r can be 2, q can be 1, and X can be O.

In moieties of Formula (2) where $R^1$ can be $—[(CHR^3)_p—X—]_q(CHR^3)_r—$, each $R^3$ can be hydrogen, or at least one $R^3$ can be methyl.

In moieties of Formula (2), $R^1$ can be $—[(CH_2)_p—X—]_q(CH_2)_r—$ wherein each X can independently be selected from O and S. In moieties of Formula (2), $R^1$ can be $—[(CH_2)_p—X—]_q(CH_2)_r—$ each X can be O or each X can be S.

In moieties of Formula (2), $R^1$ can be $—[(CH_2)_p—X—]_q(CH_2)_r—$, where p can be 2, X can be O, q can be 2, r can be 2, $R^2$ can be ethanediyl, m can be 2, and n can be 9.

In moieties of Formula (2), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis(ethan-1-thiol)), and combinations thereof.

In moieties of Formula (2), each p can independently be selected from 2, 3, 4, 5, and 6. Each p can be the same and can be 2, 3, 4, 5, or 6.

In moieties of Formula (2) each q independently be 1, 2, 3, 4, or 5. Each q can be the same and can be 1, 2, 3, 4, or 5.

In moieties of Formula (2), each r can independently be 2, 3, 4, 5, 6, 7, 8, 9, or 10. Each r can be the same and can be 2, 3, 4, 5, 6, 7, 8, 9, or 10.

In moieties of Formula (2), each r can independently be an integer from 2 to 4, from 2 to 6, or from 2 to 8.

In moieties of Formula (2), each A can be derived from a polyvinyl ether such as a divinyl ether. A divinyl ether can comprise a divinyl ether having the structure of Formula (3).

In divinyl ethers of Formula (3), m can be an integer from 0 to 50, such as from 0 to 40, from 0 to 20, from 0 to 10, from 1 to 50, from 1 to 40, from 1 to 20, from 1 to 10, from 2 to 50, from 2 to 40, from 2 to 20, or from 2 to 10.

In divinyl ethers of Formula (3), each $R^2$ can independently be selected from a $C_{2-10}$ n-alkanediyl group, a $C_{3-6}$ branched alkanediyl group, and a $—[(CH_2)_p—X—]_q(CH_2)_r—$ group.

In divinyl ethers of Formula (3), each $R^2$ can independently be a $C_{2-10}$ n-alkanediyl group, such as methanediyl, ethanediyl, n-propanediyl, or n-butanediyl.

In divinyl ethers of Formula (3), each $R^2$ can independently comprise a $—[(CH_2)_p—X—]_q(CH_2)_r—$ group, where each X can be O or S.

In divinyl ethers of Formula (3), each $R^2$ can independently comprise a $—[(CH_2)_p—X—]_q(CH_2)_r—$ group.

In divinyl ethers of Formula (3), each m can be independently an integer from 1 to 3. Each m can be the same and can be 1, 2, or 3.

In divinyl ethers of Formula (3), each $R^2$ can independently be selected from a $C_{2-10}$ n-alkanediyl group, a $C_{3-6}$ branched alkanediyl group, and a $—[(CH_2)_p—X—]_q(CH_2)_r—$ group.

In divinyl ethers of Formula (3), each $R^2$ can independently be a $C_{2-10}$ n-alkanediyl group.

In divinyl ethers of Formula (3), each $R^2$ can independently be a $—[(CH_2)_p—X—]_q(CH_2)_r—$ group, where each X can be O or S.

In divinyl ethers of Formula (3), each $R^2$ can independently be a $—[(CH_2)_p—X—]_q(CH_2)_r—$ group, where each X can be O or S, and each p can independently be 2, 3, 4, 5, and 6.

In divinyl ethers of Formula (3), each p can be the same and can be 2, 3, 4, 5, or 6.

In divinyl ethers of Formula (3), each $R^2$ can independently be a $—[(CH_2)_p—X—]_q(CH_2)_r—$ group, where each X can be O or S, and each q can independently be 1, 2, 3, 4, or 5.

In divinyl ethers of Formula (3), each q can be the same and can be 1, 2, 3, 4, or 5.

In divinyl ethers of Formula (3), each $R^2$ can independently be a $—[(CH_2)_p—X—]_q(CH_2)_r—$ group, where each X can be O or S, and each r can independently be 2, 3, 4, 5, 6, 7, 8, 9, or 10. In divinyl ethers of Formula (3), each r can be the same and can be 2, 3, 4, 5, 6, 7, 8, 9, or 10. In divinyl ethers of Formula (3), each r can independently be an integer from 2 to 4, from 2 to 6, or from 2 to 8.

Examples of suitable divinyl ethers include ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether, tetraethylene glycol divinyl ether, cyclohexanedimethanol divinyl ether, polytetrahydrofuryl divinyl ether; and combinations of any of the foregoing.

A divinyl ether can comprise a sulfur-containing divinyl ether. Examples of suitable sulfur-containing divinyl ethers are disclosed, for example, in PCT International Application No. PCT/US2017/59924 filed on Nov. 3, 2017, which is incorporated by reference in its entirety.

In polythioethers comprising a moiety of Formula (2) each A can independently be derived from a polyalkenyl polyfunctionalizing agents. A polyalkenyl polyfunctionalizing agent can have the structure of Formula (4), where z can be 3, 4, 5, or 6.

In polyalkenyl polyfunctionalizing agents of Formula (4), each $R^{20}$ can independently be selected from $C_{1-10}$ alkanediyl, each $R^{20}$ can independently be selected from $C_{1-10}$ heteroalkanediyl, each $R^{20}$ can independently be selected from substituted $C_{1-10}$ alkanediyl, or each $R^{20}$ can independently be selected from substituted $C_{1-10}$ heteroalkanediyl. The one or more substituent groups can be selected from, for example, —OH, =O, $C_{1-4}$ alkyl, and $C_{1-4}$ alkoxy. The one or more heteroatoms can be selected from, for example, O, S, and a combination thereof.

Examples of suitable polyalkenyl polyfunctionalizing agents include triallyl cyanurate (TAC), triallylisocyanurate (TAIC), 1,3,5-triallyl-1,3,5-triazinane-2,4,6-trione, 1,3-bis (2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris (prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

In polythioethers comprising a moiety of Formula (2) the molar ratio of moieties derived from a divinyl ether to moieties derived from a polyalkenyl polyfunctionalizing agent can be, for example, from 0.9:1 to 0.999:1 from 0.95:1 to 0.99:1, or from 0.96:1 to 0.99:1.

In polythioethers comprising a moiety of Formula (2), each $R^1$ can be —$(CH_2)_2$—O—$(CH_2)_2$—O—$(CH_2)_2$—; each $R^2$ can be —$(CH_2)_2$—; and m can be an integer from 1 to 4.

In polythioethers comprising a moiety of Formula (2), $R^2$ can be derived from a divinyl ether such a diethylene glycol divinyl ether, a polyalkenyl polyfunctionalizing agent such as triallyl cyanurate, or a combination thereof.

In polythioethers comprising a moiety of Formula (2), each A can independently be selected from a moiety of Formula (3a) and a moiety of Formula (4a):

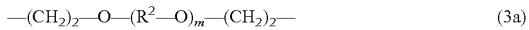

$$—(CH_2)_2—O—(R^2—O)_m—(CH_2)_2— \quad (3a)$$

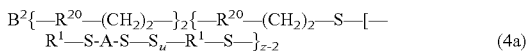

$$B^2\{—R^{20}—(CH_2)_2—\}_2\{—R^{20}—(CH_2)_2—S—[—R^1—S-A-S—S_u—R^1—S—]_{z-2} \quad (4a)$$

where m, $R^1$, $R^2$, $R^{20}$, A, $B^2$, and z are defined as in Formula (2)-(4).

In polythioethers comprising a moiety of Formula (2), each $R^1$ can be —$(CH_2)_2$—O—$(CH_2)_2$—O—$(CH_2)_2$—; each $R^2$ can be —$(CH_2)_2$—; m can be an integer from 1 to 4; and the polyfunctionalizing agent $B^2(—R^{20}—CH=CH_2)_z$ comprises triallyl cyanurate where z is 3 and each $R^{20}$ is —O—$CH_2$—.

Polythioethers comprising a moiety of Formula (2) can be thiol-terminated.

A thiol-terminated polythioether can comprise a thiol-terminated polythioether of Formula (2a):

$$HS—R^1—[S-A-S—R^1—]_n—SH \quad (2a)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and —$[(CHR^3)_p—X—]_q(CHR^3)_r$—, wherein,
p is an integer from 2 to 6;
q is an integer from 1 to 5;
r is an integer from 2 to 10;
each $R^3$ is independently selected from hydrogen and methyl; and
each X is independently selected from O, S, S—S, and NR, wherein R is selected from hydrogen and methyl; and
each A is independently a moiety derived from a polyvinyl ether of Formula (3) or a moiety derived from a polyalkenyl polyfunctionalizing agent of Formula (4):

$$CH_2=CH—O—(R^2—O)_m—CH=CH_2 \quad (3)$$

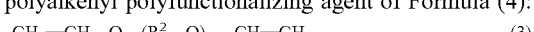

$$B^2(—R^{20}—CH=CH_2)_z \quad (4)$$

wherein,
each $R^2$ is independently selected from $C_{1-10}$ alkanediyl, $C_{6-8}$ cycloalkanediyl, $C_{6-14}$ alkanecycloalkanediyl, and —$[(CHR^3)_p—X—]_q(CHR^3)_r$—, wherein p, q, r, $R^3$, and X are as defined as for $R^1$;
m is an integer from 0 to 50;
$B^2$ represents a core of a z-valent, polyalkenyl polyfunctionalizing agent $B(—R^{20}—CH=CH_2)_z$ wherein,
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

In thiol-terminated polythioethers of Formula (2a), $R^1$ can be $C_{2-10}$ alkanediyl.

In thiol-terminated polythioethers of Formula (2a), $R^1$ can be —$[(CHR^3)_p—X—]_q(CHR^3)_r$—.

In thiol-terminated polythioethers of Formula (2a), X can be selected from O and S, and thus —$[(CHR^3)_p—X—]_q(CHR^3)_r$— in Formula (2a) can be —$[(CHR^3)_p—O-]_q(CHR^3)_r$— or —$[(CHR^3)_p—S—]_q(CHR^3)_r$—. P and r can be equal, such as where p and r can be both two.

In thiol-terminated polythioethers of Formula (2a), $R^1$ can be selected from $C_{2-6}$ alkanediyl and —$[(CHR^3)_p—X—]_q(CHR^3)_r$—.

In thiol-terminated polythioethers of Formula (2a), $R^1$ can be —$[(CHR^3)_p—X—]_q(CHR^3)_r$—, and X can be O, or X can be S.

In thiol-terminated polythioethers of Formula (2a), $R^1$ can be —$[(CHR^3)_p—X—]_q(CHR^3)_r$—, p can be 2, r can be 2, q can be 1, and X can be S; or p can be 2, q can be 2, r can be 2, and X can be O; or p can be 2, r can be 2, q can be 1, and X can be O.

In thiol-terminated polythioethers of Formula (2a), $R^1$ can be —$[(CHR^3)_p—X—]_q(CHR^3)_r$—, each $R^3$ can be hydrogen, or at least one $R^3$ can be methyl.

In thiol-terminated polythioethers of Formula (2a), $R^1$ can be —$[(CH_2)_p—X—]_q(CH_2)_r$— wherein each X can be independently be selected from O and S. In thiol-terminated polythioethers of Formula (2a), $R^1$ can be —$[(CH_2)_p—X—]_q(CH_2)_r$— each X can be O or each X can be S.

In thiol-terminated polythioethers of Formula (2a), $R^1$ can be —$[(CH_2)_p—X—]_q(CH_2)_r$—, where p can be 2, X can be O, q can be 2, r can be 2, $R^2$ can be ethanediyl, m can be 2, and n can be 9.

In thiol-terminated polythioethers of Formula (2a), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis(ethan-1-thiol)), and combinations thereof.

In thiol-terminated polythioethers of Formula (2a), each p can independently be selected from 2, 3, 4, 5, and 6. Each p can be the same and can be 2, 3, 4, 5, or 6.

In thiol-terminated polythioethers of Formula (2a), each q can independently be 1, 2, 3, 4, or 5. Each q can be the same and can be 1, 2, 3, 4, or 5.

In thiol-terminated polythioethers of Formula (2a), each r can independently be 2, 3, 4, 5, 6, 7, 8, 9, or 10. Each r can be the same and can be 2, 3, 4, 5, 6, 7, 8, 9, or 10.

In thiol-terminated polythioethers of Formula (2a), each r can independently be an integer from 2 to 4, from 2 to 6, or from 2 to 8.

In thiol-terminated polythioethers of Formula (2a), each A can independently be selected from a moiety of Formula (3a) and a moiety of Formula (4a):

$$—(CH_2)_2—O—(R^2—O)_m—(CH_2)_2— \quad (3a)$$

$$B^2\{—R^{20}—(CH_2)_2-\}_2\{—R^{20}—(CH_2)_2—S—[—R^1—S-A-S—]_n—R^1—S—\}_{z-2} \quad (4a)$$

where m, $R^1$, $R^2$, $R^{20}$, A, n, $B^2$, and z are defined as in Formula (2)-(4).

In thiol-terminated polythioethers of Formula (2a) the molar ratio of moieties derived from a polyvinyl ether, for example, a divinyl ether, to moieties derived from a polyalkenyl polyfunctionalizing agent can be, for example, of 200:1, 150:1, 100:1, 50:1, or 25:1.

Various methods can be used to prepare thiol-terminated polythioethers of Formula (2). Examples of suitable thiol-terminated polythioethers, and methods for their production, are described, for example, in Example 1 of U.S. Pat. No. 6,172,179. Such thiol-terminated polythioethers may be difunctional, that is, linear polythioethers having two terminal thiol groups, or can be polyfunctional, that is, branched polythioethers having three or more terminal thiol groups.

A thiol-terminated polythioether may comprise a mixture of different thiol-terminated polythioethers in which the thiol-terminated polythioethers may have the same or different functionality. A thiol-terminated polythioether or combination of thiol-terminated polythioethers can have an average functionality, for example, from 2 to 6, from 2 to 4, from 2 to 3, from 2.05 to 2.8, or from 2.05 to 2.5; or, for example, from 2.05 to 3, such as from 2.1 to 2.8, or from 2.1 to 2.6. For example, a thiol-terminated polythioether can comprise a difunctional thiol-terminated polythioether, a trifunctional thiol-terminated polythioether, or a combination thereof.

Thiol-terminated polythioethers can be prepared by reacting a polythiol and a diene such as a divinyl ether, and the respective amounts of the reactants used to prepare the polythioethers can be chosen to yield terminal thiol groups. Thus, in some cases, (n or >n, such as n+1) moles of a polythiol, such as a dithiol or a mixture of at least two different dithiols and 0.05×n moles to 1×n moles, such as from 0.1×n moles to 0.8×n moles, of a thiol-terminated polyfunctionalizing agent may be reacted with (n) moles of a diene, such as a divinyl ether, or a combination of at least two different dienes, such as a combination of two different divinyl ethers. A thiol-terminated polyfunctionalizing agent can be present in the reaction mixture in an amount sufficient to provide a thiol-terminated polythioether having an average thiol functionality, for example, from 2 to 6, from 2 to 4, from 2 to 3, from 2.05 to 2.8, or from 2.05 to 2.5; or, for example, from 2.05 to 3, such as from 2.1 to 2.8, or from 2.1 to 2.6.

A reaction used to prepare a thiol-terminated polythioether may be catalyzed by a free radical catalyst. Suitable free radical catalysts include azo compounds, for example, azobisnitrile compounds such as azo(bis)isobutyronitrile (AIBN); organic peroxides, such as benzoyl peroxide and tert-butyl peroxide; and inorganic peroxides, such as hydrogen peroxide. The reaction can also be effected by irradiation with ultraviolet light either with or without a radical initiator/photosensitizer. Ionic catalysis methods, using either inorganic or organic bases, e.g., triethylamine, may also be used.

Suitable thiol-terminated polythioethers may be produced by reacting a divinyl ether or combination of divinyl ethers with an excess of dithiol or combination of dithiols and/or polythiols.

Thiol-terminated polythioethers can comprise the reaction product of reactants comprising:

(a) a dithiol of Formula (5):

$$HS—R^1—SH \quad (5)$$

where, $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $—[(CHR^3)_p—X—]_q(CHR^3)_r—$;

each $R^3$ is independently selected from hydrogen and methyl;

each X is independently selected from O, S, S—S, and NR wherein R is selected from hydrogen and methyl;

p is an integer from 2 to 6;

q is an integer from 1 to 5; and r is an integer from 2 to 10; and (b) a divinyl ether of Formula (3):

$$CH_2=CH—O—(R^2—O—)_mCH=CH_2 \quad (3)$$

where, each $R^2$ is independently selected from $C_{1-10}$ alkanediyl, $C_{6-8}$ cycloalkanediyl, $C_{6-14}$ alkanecycloalkanediyl, and $—[(CHR^3)_p—X—]_q(CHR^3)_r—$, wherein p, q, r, $R^3$, and X are as defined herein; and m is an integer from 0 to 50.

The reactants can further comprise (c) a polyfunctional compound such as a polyfunctional compound $B^2(—R^{20}—CH=CH_2)_z$, where $B^2$, $R^{20}$, and z are as defined as in Formula 4.

In dithiols of Formula (5), $R^1$ can be $C_{2-10}$ alkanediyl.

In dithiols of Formula (5), $R^1$ can be $—[(CHR^3)_p—X—]_q(CHR^3)_r—$.

In dithiols of Formula (5), X can be selected from O and S, and thus $—[(CHR^3)_p—X—]_q(CHR^3)_r—$ in Formula (5) can be $—[(CHR^3)_p—O-]_q(CHR^3)_r—$ or $—[(CHR^3)_p—S—]_q(CHR^3)_r—$. P and r can be equal, such as where p and r can be both two.

In dithiols of Formula (5), $R^1$ can be selected from $C_{2-6}$ alkanediyl and $—[(CHR^3)_p—X—]_q(CHR^3)_r—$.

In dithiols of Formula (5), $R^1$ can be $—[(CHR^3)_p—X—]_q(CHR^3)_r—$, and X can be O, or X can be S.

In dithiols of Formula (5) where $R^1$ can be $—[(CHR^3)_p—X—]_q(CHR^3)_r—$, p can be 2, r can be 2, q can be 1, and X can be S; or p can be 2, q can be 2, r can be 2, and X can be O; or p can be 2, r can be 2, q can be 1, and X can be O.

In dithiols of Formula (5) where $R^1$ can be $—[(CHR^3)_p—X—]_q(CHR^3)_r—$, each $R^3$ can be hydrogen, or at least one $R^3$ can be methyl.

In dithiols of Formula (5), $R^1$ can be $—[(CH_2)_p—X—]_q(CH_2)_r—$ wherein each X can independently be selected from O and S. In dithiols of Formula (5), $R^1$ can be $—[(CH_2)_p—X—]_q(CH_2)_r—$, each X can be O or each X can be S.

In dithiols of Formula (5), $R^1$ can be $—[(CH_2)_p—X—]_q(CH_2)_r—$, where p can be 2, X can be O, q can be 2, r can be 2, $R^2$ can be ethanediyl, m can be 2, and n can be 9.

In dithiols of Formula (5), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis (ethan-1-thiol)), and combinations thereof.

In dithiols of Formula (5), each p can independently be selected from 2, 3, 4, 5, and 6. Each p can be the same and can be 2, 3, 4, 5, or 6.

In dithiols of Formula (5) each q can independently be 1, 2, 3, 4, or 5. Each q can be the same and can be 1, 2, 3, 4, or 5.

In dithiols of Formula (5), each r can independently be 2, 3, 4, 5, 6, 7, 8, 9, or 10. Each r can be the same and can be 2, 3, 4, 5, 6, 7, 8, 9, or 10.

In dithiols of Formula (5), each r can independently be an integer from 2 to 4, from 2 to 6, or from 2 to 8.

In divinyl ethers of Formula (3), m can be an integer from 0 to 50, such as from 0 to 40, from 0 to 20, from 0 to 10, from 1 to 50, from 1 to 40, from 1 to 20, from 1 to 10, from 2 to 50, from 2 to 40, from 2 to 20, or from 2 to 10.

In divinyl ethers of Formula (3), each $R^2$ can independently be selected from a $C_{2-10}$ n-alkanediyl group, a $C_{3-6}$ branched alkanediyl group, and a —[(CH$_2$)$_p$—X—]$_q$(CH$_2$)$_r$— group.

In divinyl ethers of Formula (3), each $R^2$ can independently be a $C_{1-10}$ n-alkanediyl group, such as methanediyl, ethanediyl, n-propanediyl, or n-butanediyl.

In divinyl ethers of Formula (3), each $R^2$ can independently be a $C_{2-10}$ n-alkanediyl group, such as ethanediyl, n-propanediyl, or n-butanediyl.

In divinyl ethers of Formula (3), each $R^2$ can independently comprise a —[(CH$_2$)$_p$—X—]$_q$(CH$_2$)$_r$— group where each X can be O or S.

In divinyl ethers of Formula (3), each $R^2$ can independently comprise a —[(CH$_2$)$_p$—X—]$_q$(CH$_2$)$_r$— group where each X is O.

In divinyl ethers of Formula (3), each m can be independently an integer from 1 to 3. Each m can be the same and is can be 1, 2, or 3.

In divinyl ethers of Formula (3), each $R^2$ can independently be selected from a $C_{2-10}$ n-alkanediyl group, a $C_{3-6}$ branched alkanediyl group, and a —[(CH$_2$)$_p$—X—]$_q$(CH$_2$)$_r$— group.

In divinyl ethers of Formula (3), each $R^2$ can independently be a —[(CH$_2$)$_p$—X—]$_q$(CH$_2$)$_r$— group, where each X can be O or S, and each p can independently be 2, 3, 4, 5, and 6.

In divinyl ethers of Formula (3), each p can be the same and can be 2, 3, 4, 5, or 6.

In divinyl ethers of Formula (3), each $R^2$ can independently be a —[(CH$_2$)$_p$—X—]$_q$(CH$_2$)$_r$— group, where each X can be O or S, and each q can independently be 1, 2, 3, 4, or 5.

In divinyl ethers of Formula (3), each q can be the same and can be 1, 2, 3, 4, or 5.

In divinyl ethers of Formula (3), each $R^2$ can independently be a —[(CH$_2$)$_p$—X—]$_q$(CH$_2$)$_r$— group, where each X can be O or S, and each r can independently be 2, 3, 4, 5, 6, 7, 8, 9, or 10. In divinyl ethers of Formula (3), each r can be the same and can be 2, 3, 4, 5, 6, 7, 8, 9, or 10. In divinyl ethers of Formula (3), each r can independently be an integer from 2 to 4, from 2 to 6, or from 2 to 8.

Examples of suitable divinyl ethers include ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether, tetraethylene glycol divinyl ether, cyclohexanedimethanol divinyl ether, polytetrahydrofuryl divinyl ether; and combinations of any of the foregoing.

Dithiols suitable for use in preparing thiol-terminated polythioethers include those having the structure of Formula (5):

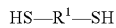 (5)

wherein, $R^1$ can be selected from $C_{2-6}$ alkanediyl, $C_{6-8}$ cycloalkanediyl, $C_{6-10}$ alkanecycloalkanediyl, $C_{5-8}$ heterocycloalkanediyl, and —[(CHR$^3$)$_p$—X—]$_q$(CHR$^3$)$_r$—; wherein, each $R^3$ can be independently selected from hydrogen and methyl; each X can be independently selected from O, S, S—S, and NR wherein R is selected from hydrogen and methyl; p is an integer from 2 to 6; q is an integer from 1 to 5; and r is an integer from 2 to 10.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

A dithiol may have one or more pendent groups comprising a $C_{1-6}$ alkyl, a $C_{1-6}$ alkoxy, or a hydroxyl group. Suitable alkyl pendent groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (5), $R^1$ is —[(CH$_2$)$_p$—X—]$_q$(CH$_2$)$_r$—, wherein p is 2, r is 2, q is 1, and X is S); dimercaptodioxaoctane (DMDO) (in Formula (5), $R^1$ is —[(CH$_2$)$_p$—X—]$_q$(CH$_2$)$_r$—, wherein p is 2, q is 2, r is 2, and X is O); and 1,5-dimercapto-3-oxapentane (in Formula (5), $R^1$ is —[(CH$_2$)$_p$—X—]$_q$(CH$_2$)$_r$—, wherein p is 2, r is 2, q is 1, and X is O). It is also possible to use dithiols that include both heteroatoms in the carbon backbone and pendent alkyl groups, such as methyl groups. Such dithiols include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CH(CH$_3$)CH$_2$—SH and HS—CH(CH$_3$)CH$_2$—S—CH$_2$CH(CH$_3$)—SH.

Examples of dithiols having a sulfide group S—S include 2-(sulfanylmethyldisulfanyl)ethanediol, bis(mercaptomethyl) persulfide, and 2-(2-sulfanylethyldisulfanyl)ethanethiol.

Suitable divinyl ethers for preparing thiol-terminated polythioether prepolymers include, for example, divinyl ethers of Formula (3):

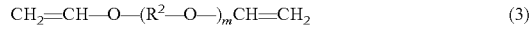 (3)

where each $R^2$ is independently selected from $C_{1-10}$ alkanediyl, $C_{6-8}$ cycloalkanediyl, $C_{6-14}$ alkanecycloalkanediyl, and —[(CHR$^3$)$_p$—X—]$_q$(CHR$^3$)$_r$—, where each $R^3$ can independently be selected from hydrogen and methyl; each X can independently be selected from O, S, S—S, and NR wherein R can be selected from hydrogen and methyl; p can be an integer from 2 to 6; q can be an integer from 1 to 5; and r can be an integer from 2 to 10.

Suitable divinyl ethers include, for example, compounds having at least one oxyalkanediyl group, —$R^2$—O—, such as from 1 to 4 oxyalkanediyl groups, for example, compounds in which m in Formula (3) is an integer from 1 to 4. The variable m in Formula (3) can be an integer ranging from 2 to 4. It is also possible to employ commercially available divinyl ether mixtures that are characterized by a non-integral average value for the number of oxyalkanediyl units per molecule. Thus, m in Formula (3) can also take on rational number values from 0 to 10.0, such as from 1.0 to 10.0, from 1.0 to 4.0, or from 2.0 to 4.0.

Examples of suitable vinyl ethers include ethylene glycol divinyl ether (EG-DVE) ($R^2$ in Formula (3) is ethanediyl and m is 1), butanediol divinyl ether (BD-DVE) ($R^2$ in Formula (4) is butanediyl and m is 1), hexanediol divinyl ether (HD-DVE) ($R^2$ in Formula (3) is hexanediyl and m is 1), diethylene glycol divinyl ether (DEG-DVE) ($R^2$ in Formula (3) is ethanediyl and m is 2), triethylene glycol divinyl ether ($R^2$ in Formula (3) is ethanediyl and m is 3), tetraethylene glycol divinyl ether ($R^2$ in Formula (3) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendent groups which can comprise alkyl groups, hydroxyl groups, alkoxy groups, or amine groups.

Divinyl ethers in which $R^2$ in Formula (3) is $C_{3-6}$ branched alkanediyl may be prepared by reacting a polyhydroxyl compound with acetylene. Examples of divinyl ethers of this type include compounds in which $R^2$ in Formula (3) is an alkyl-substituted methanediyl group such as —CH(—$CH_3$)—, or an alkyl-substituted ethanediyl.

Two or more types of divinyl ethers of Formula (3) may be used. Thus, two dithiols of Formula (5) and one divinyl ethers of Formula (3), one dithiol of Formula (5) and two divinyl ethers of Formula (3), two dithiols of Formula (5) and two divinyl ethers of Formula (3), and more than two compounds of one or both Formula (5) and Formula (3), may be used to produce a variety of thiol-terminated polythioethers.

The divinyl ether(s) can comprise, for example, from 20 mole percent to less than 50 mole percent of the reactants used to prepare a thiol-terminated polythioether prepolymer, or from 30 mole percent to less than 50 mole percent.

Relative amounts of dithiols and divinyl ethers can be selected to provide polythioether prepolymers having terminal thiol groups. Thus, a dithiol of Formula (5) or a mixture of at least two different dithiols of Formula (5), can be reacted with of a divinyl ether of Formula (3) or a mixture of at least two different divinyl ethers of Formula (3) in relative amounts such that the molar ratio of thiol groups to alkenyl groups is greater than 1:1, such as from 1.1:1.0 to 2.0:1.0.

The reaction between dithiols and divinyl ethers and/or polythiols and polyvinyl ethers may be catalyzed by a free radical catalyst, an ionic catalyst, or ultraviolet radiation. Suitable free radical catalysts include, for example, azo compounds, such as azobisnitriles including azo(bis)isobutyronitrile (AIBN); organic peroxides such as benzoyl peroxide and tert-butyl peroxide; and inorganic peroxides such as hydrogen peroxide. In certain reactions, the catalyst does not comprise acidic or basic compounds, and does not produce acidic or basic compounds upon decomposition. Examples of suitable free-radical catalysts include azo-type catalysts, such as substituted azonitrile compounds, which are commercially available, e.g., as Vazo®-57 (Du Pont), Vazo®-64 (Du Pont), Vazo®-67 (Du Pont), V-70® (Wako Specialty Chemicals), and V-65B® (Wako Specialty Chemicals). Examples of other suitable free-radical catalysts include alkyl peroxides, such as tert-butyl peroxide. The reaction may also be effected by irradiation with ultraviolet light either with or without a cationic photo-initiating moiety.

Thiol-terminated polythioethers may be prepared by combining at least one dithiol of Formula (5) and at least one divinyl ether of Formula (3) followed by addition of an appropriate catalyst, and carrying out the reaction at a temperature, for example, within a range from 30° C. to 120° C., such as from 70° C. to 90° C., for a duration, for example, from 2 hours to 24 hours, such as from 2 hours to 6 hours.

Thiol-terminated polythioether prepolymers may comprise a polyfunctional polythioether having an average thiol functionality greater than 2.0. In polythioethers having a thiol-functionality of two, each A can be derived from a divinyl ether. In polythioethers having a thiol-functionality greater than 2, at least some of the A moieties are derived from a moiety having an alkenyl functionality greater than 2 such as an alkenyl functionality from 3 to 6. In polythioethers having a thiol-functionality greater than 2, at least some of the A moieties are derived from a polyalkenyl polyfunctionalizing agent, such as a polyalkenyl polyfunctionalizing agent having the structure of Formula (4):

$$B^2(-R^{20}-CH=CH_2)_z \qquad (4)$$

where,
$B^2$ represents a core of a z-valent, polyalkenyl polyfunctionalizing agent $B^2\{-R^{20}-CH=CH_2\}_z$;
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

Thiol-terminated polythioether prepolymers can have an average thiol functionality greater than 2, such as an average value within a range from 2.05 and 3, an average thiol functionality within a range from 2.05 to 6, from 2.05 to 4, from 2.05 to 3, from 2.05 to 2.8, or from 2.05 to 2.5; or, for example, from 2.05 to 3, such as from 2.1 to 2.8, or from 2.1 to 2.6.

In thiol-terminated polythioethers of Formula (2a),
each $R^1$ can be —$(CH_2)_2$—O—$(CH_2)_2$—O—$(CH_2)_2$—;
each $R^2$ can be —$(CH_2)_2$—;
m can be an integer from 1 to 4; and
the polyfunctionalizing agent $B^2(-R^{20}-CH=CH_2)_z$ can comprise triallyl cyanurate where z is 3 and each $R^{20}$ is —O—$CH_2$—.

Polyfunctionalizing agents suitable for use in preparing such polyfunctional thiol-terminated prepolymers include tri-functionalizing agents, that is, compounds having the structure $B^1(-V)_z$ where z is 3, B is a core of a polyfunctionalizing agent, and V is an organic moiety, which can be terminated, for example, in a thiol or alkenyl group. Suitable tri-functionalizing agents include, for example, triallyl cyanurate (TAC), 1,2,3-propanetrithiol, isocyanurate-containing trithiols, and combinations thereof, as disclosed in U.S. Application Publication No. 2010/0010133, which is incorporated by reference in its entirety; and isocyanurates as disclosed, for example, in U.S. Pat. No. 7,858,703, which is incorporated by reference in its entirety. Other useful polyfunctionalizing agents include trimethylolpropane trivinyl ether, and the polythiols described in U.S. Pat. Nos. 4,366,307; 4,609,762; and 5,225,472, each of which is incorporated by reference in its entirety. Mixtures of polyfunctionalizing agents may also be used. As a result, polythioether prepolymers provided by the present disclosure may have a wide range of average functionality. For example, trifunctionalizing agents may afford average functionalities of groups capable of reacting with thiol groups from 2.05 to 2.9, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

Thiol-terminated polythioethers can be liquid at room temperature and can have a glass transition temperature $T_g$, for example, less than −20° C., less than −30° C., or less than −40° C., where the glass transition temperature $T_g$ is determined by dynamic mechanical analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

Thiol-terminated polythioethers can exhibit a viscosity, for example, within a range from 20 poise to 500 poise (2 Pa-sec to 50 Pa-sec), from 20 poise to 200 poise (2 Pa-sec to 20 Pa-sec) or from 40 poise to 120 poise 4 Pa-sec to 12 Pa-sec), measured using a Brookfield CAP 2000 viscometer, with a No. 6 spindle, at a speed of 300 rpm, and a temperature of 25° C.

The backbone of a thiol-terminated polythioether prepolymer provided by the present disclosure can be modified to improve the properties such as adhesion, tensile strength, elongation, UV resistance, hardness, and/or flexibility of sealants and coatings prepared using polythioether prepolymers. For example, adhesion promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl)alkanol-containing), U.S. Pat. No. 9,382,642 (metal-ligand containing), U.S. Application Publication No. 2017/0114208 (antioxidant-containing), PCT International Application No. PCT/US2017/59924 (sulfur-containing divinyl ether), and PCT International Application No. PCT/US2017/45871 filed on Aug. 8, 2017(urethane-containing), each of which is incorporated by reference in its entirety.

A thiol-terminated polythioether can be characterized by a number average molecular weight, for example, from 250 Daltons to 20,000 Daltons, from 250 Daltons to 10,000 Daltons, from 500 Daltons to 9,000 Daltons, from 1,000 Daltons to 8,000 Daltons, or from 2,000 Daltons to 6,000 Daltons. A thiol-terminated polythioether can have a number average molecular weight, for example, from 500 Daltons to 3,000 Daltons, from 500 Daltons to 2,000 Daltons, from 1,000 Daltons to 3,000 Daltons, from 1,250 Daltons to 2,750 Daltons, from 1,500 Daltons to 2,500 Daltons, or from 1,750 Daltons to 2,250 Daltons.

Thiol-terminated polythioethers can exhibit a polydispersity (Mw/Mn; weight average molecular weight/number average molecular weight), for example, from 1 to 20, or from 1 to 5.

Examples of suitable thiol-terminated polythioethers are disclosed, for example, in U.S. Pat. No. 6,172,179, which is incorporated by reference in its entirety. A thiol-terminated polythioether can comprise Permapol® P3.1E, Permapol® L56086, or a combination thereof, each of which is available from PPG Aerospace, Sylmar, Calif. Permapol® P3.1E, Permapol® L56086 are encompassed by the thiol-terminated polythioethers disclosed in U.S. Pat. No. 6,172,179, and the thiol-terminated polythioethers comprising a moiety of Formula (2), and by the thiol-terminated polythioethers of Formula (2a) and 2(b).

Polythioethers comprising moieties of Formula (2) can be hydroxyl-terminated.

A hydroxyl-terminated polythioether can comprise a hydroxyl-terminated polythioether of Formula (2b):

$$HO-R^{10}-S-R^1-[S-A-S-R^1-]_n-S-R^{10}-OH \quad (2b)$$

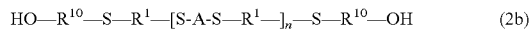

wherein, n is an integer from 1 to 60;

each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(CHR^3)_p—X—]_q(CHR^3)_r—$, wherein, p is an integer from 2 to 6;

q is an integer from 1 to 5;

r is an integer from 2 to 10;

each $R^3$ is independently selected from hydrogen and methyl; and each X is independently selected from O, S, S—S, and NR, wherein R is selected from hydrogen and methyl; and each A is independently a moiety derived from a polyvinyl ether of Formula (3) or a moiety derived from a polyalkenyl polyfunctionalizing agent of Formula (4):

$$CH_2=CH-O-(R^2-O)_m-CH=CH_2 \quad (3)$$

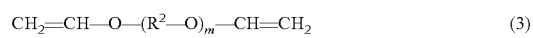

$$B^2(-R^{20}-CH=CH_2)_z \quad (4)$$

where, each $R^2$ is independently selected from $C_{1-10}$ alkanediyl, $C_{6-8}$ cycloalkanediyl, $C_{6-14}$ alkanecycloalkanediyl, and $—[(CHR^3)_p—X—]_q(CHR^3)_r—$, wherein p, q, r, $R^3$, and X are as defined as for $R^1$;

m is an integer from 0 to 50;

$B^2$ represents a core of a z-valent, polyalkenyl polyfunctionalizing agent $B^2(-R^{20}-CH=CH_2)_z$;

z is an integer from 3 to 6;

each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and $R^{10}$ is a moiety derived from the reaction of a compound comprising a hydroxyl group and a group reactive with a thiol group.

In hydroxyl-terminated polythioethers of Formula (2b), $R^1$ can be $C_{2-10}$ alkanediyl.

In hydroxyl-terminated polythioethers of Formula (2b), $R^1$ can be $—[(CHR^3)_p—X—]_q(CHR^3)_r—$.

In hydroxyl-terminated polythioethers of Formula (2b), X can be selected from O and S, and thus $—[(CHR^3)_p—X—]_q(CHR^3)_r—$ in Formula (2b) can be $—[(CHR^3)_p—O-]_q(CHR^3)_r—$ or $—[(CHR^3)_p—S-]_q(CHR^3)_r—$. P and r can be equal, such as where p and r can be both two.

In hydroxyl-terminated polythioethers of Formula (2b), $R^1$ can be selected from $C_{2-6}$ alkanediyl and $—[(CHR^3)_p—X—]_q(CHR^3)_r—$.

In hydroxyl-terminated polythioethers of Formula (2b), $R^1$ can be $—[(CHR^3)_p—X—]_q(CHR^3)_r—$, and X can be O, or X can be S.

In hydroxyl-terminated polythioethers of Formula (2b), where $R^1$ can be $—[(CHR^3)_p—X—]_q(CHR^3)_r—$, p can be 2, r can be 2, q can be 1, and X can be S; or p can be 2, q can be 2, r can be 2, and X can be O; or p can be 2, r can be 2, q can be 1, and X can be O.

In hydroxyl-terminated polythioethers of Formula (2b), where $R^1$ can be $—[(CHR^3)_p—X—]_q(CHR^3)_r—$, each $R^3$ can be hydrogen, or at least one $R^3$ can be methyl.

In hydroxyl-terminated polythioethers of Formula (2b), $R^1$ can be $—[(CH_2)_p—X—]_q(CH_2)_r—$ wherein each X can independently be selected from O and S. In hydroxyl-terminated polythioethers of Formula (2b), $R^1$ can be $—[(CH_2)_p—X—]_q(CH_2)_r—$, and each X can be O or each X can be S.

In hydroxyl-terminated polythioethers of Formula (2b), $R^1$ can be $-[(CH_2)_p-X-]_q(CH_2)_r-$, where p can be 2, X can be O, q can be 2, r can be 2, $R^2$ can be ethanediyl, m can be 2, and n can be 9.

In hydroxyl-terminated polythioethers of Formula (2b), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis(ethan-1-thiol)), and combinations thereof.

In hydroxyl-terminated polythioethers of Formula (2b), each p can independently be selected from 2, 3, 4, 5, and 6. Each p can be the same and can be 2, 3, 4, 5, or 6.

In hydroxyl-terminated polythioethers of Formula (2b), each q can independently be 1, 2, 3, 4, or 5. Each q can be the same and can be 1, 2, 3, 4, or 5.

In hydroxyl-terminated polythioethers of Formula (2b), each r can independently be 2, 3, 4, 5, 6, 7, 8, 9, or 10. Each r can be the same and can be 2, 3, 4, 5, 6, 7, 8, 9, or 10.

In hydroxyl-terminated polythioethers of Formula (2b), each r can independently be an integer from 2 to 4, from 2 to 6, or from 2 to 8.

In hydroxyl-terminated polythioethers of Formula (2b), each A can independently be selected from a moiety of Formula (3a) and a moiety Formula (4a):

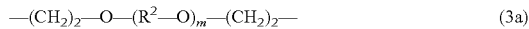

$$-(CH_2)_2-O-(R^2-O)_m-(CH_2)_2- \qquad (3a)$$

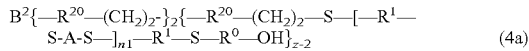

$$B^2\{-R^{20}-(CH_2)_2-\}_z\{-R^{20}-(CH_2)_2-S-[-R^1-S-A-S-]_{n1}-R^1-S-R^0-OH\}_{z-2} \qquad (4a)$$

where m, $R^1$, $R^2$, $R^{10}$, $R^{20}$, z, and $B^2$ are defined as for Formula (2)-(4), and n1 is an integer from 0 to 60, such as, for example, from 0 to 40, from 1 to 40, or from 1 to 20.

In hydroxyl-terminated polythioethers of Formula (2b), each $R^{10}$ is a moiety derived from the reaction of a compounds comprising a hydroxyl group and a group reactive with a thiol group. Examples of groups reactive with thiol groups include alkenyl groups, epoxy groups, isocyanate groups, and Michael acceptor groups. A compound can comprise a hydroxyl group and an alkenyl group.

A compound comprising a hydroxyl group and a group reactive with a thiol group can have the structure of Formula (6):

$$R^{60}-R^{70}-OH \qquad (6)$$

where, $R^{60}$ is selected from an alkenyl, epoxy, isocyanate, and a Michael acceptor group;

$R^{70}$ is selected from $C_{2-20}$ alkanediyl, $C_{2-20}$ heteroalkanediyl, substituted $C_{2-20}$ alkanediyl, and substituted $C_{2-20}$ heteroalkanediyl.

In compounds of Formula (6), $R^{70}$ can be $C_{2-20}$ alkanediyl, $C_{2-20}$ heteroalkanediyl, substituted $C_{2-20}$ alkanediyl, or substituted $C_{2-20}$ heteroalkanediyl. The one or more substituent groups can be selected from, for example, $-OH$, $=O$, $C_{1-4}$ alkyl, and $C_{1-4}$ alkoxy. The one or more heteroatoms can be selected from O and S.

In hydroxyl-terminated polythioethers of Formula (2b), each $-R^{10}-OH$ can independently be selected from a moiety of Formula (6a):

$$-R^{60a}-R^{70}-OH \qquad (6a)$$

where, $R^{60a}$ is selected from $-(CH_2)_2-$, $-CH_2-C(OH)-$, $-C(O)-NH-$, and residue of a Michael acceptor; and $R^{70}$ is selected from $C_{2-20}$ alkanediyl, $C_{2-20}$ heteroalkanediyl, substituted $C_{2-20}$ alkanediyl, and substituted $C_{2-20}$ heteroalkanediyl.

In moieties of Formula (6a), $R^{70}$ can be $C_{2-20}$ alkanediyl, $C_{2-20}$ heteroalkanediyl, substituted $C_{2-20}$ alkanediyl, or substituted $C_{2-20}$ heteroalkanediyl. The one or more substituent groups can be selected from, for example, $-OH$, $=O$, $C_{1-4}$ alkyl, and $C_{1-4}$ alkoxy. The one or more heteroatoms can be selected from O and S.

A compound having a hydroxyl group and a group reactive with a thiol group can comprise a hydroxyl-functional vinyl ether.

A compound having a hydroxyl group and a group reactive with a thiol group can comprise a hydroxyl-functional vinyl ether of Formula (7:

$$CH_2=CH-O-[C(R^5)_2]_t-OH \qquad (7)$$

where, t is an integer from 2 to 10; and each $R^5$ is independently selected from hydrogen and $C_{1-6}$ alkyl.

In hydroxyl-functional vinyl ethers of Formula (7), t can be, for example, an integer from 2 to 8, from 2 to 6, or from 2 to 4. In hydroxyl-functional vinyl ethers of Formula (7), t can be, for example, 2, 3, 4, 5, 6, 7, 8, 9, or 10.

In hydroxyl-functional vinyl ethers of Formula (7), each $R^5$ can be hydrogen.

In hydroxyl-functional vinyl ethers of Formula (7), at least one $R^5$ can be $C_{1-6}$ alkyl, such as methyl, ethyl, n-propyl, iso-propyl, n-butyl, iso-butyl or tert-butyl.

Examples of suitable hydroxyl-functional vinyl ethers include 1,4-cyclohexane dimethylol monovinyl ether, 1-methyl-3-hydroxypropyl vinyl ether, 4-hydroxybutyl vinyl ether, and a combination of any of the foregoing. A hydroxyl-functional vinyl ether can be 4-hydroxybutyl vinyl ether.

In hydroxyl-terminated polythioethers of Formula (2b), each $-R^{10}-OH$ can be a moiety of Formula (7a):

$$-(CH_2)_2-O-[C(R^5)_2]_t-OH \qquad (7a)$$

where t is an integer from 2 to 10; and each $R^5$ is independently selected from hydrogen and $C_{1-6}$ alkyl.

In hydroxyl-terminated polythioethers of Formula (2b), each $R^1$ can be $-(CH_2)_2-O-(CH_2)_2-O-(CH_2)_2-$;

each $R^2$ can be $-(CH_2)_2-$;

m can be an integer from 1 to 4;

the polyfunctionalizing agent $B^2(-R^{20}-CH=CH_2)_z$ can comprise triallyl cyanurate, where z is 3 and each $R^{20}$ is $-O-CH_2-$; and the compound having a hydroxyl group and a group reactive with a thiol group can be hydroxyl-butyl vinyl ether, where t is 4 and each $R^5$ is hydrogen, and $-R^{60a}-R^{70}-OH$ has the structure $-(CH_2)_2-O-(CH_2)_4-OH$.

Hydroxyl-functional polythioethers can be prepared, for example, by reacting a thiol-terminated polythioether such as a thiol-terminated polythioether of Formula (2a) with a compound comprising a hydroxyl group and a group reactive with a thiol group, such as a hydroxyl vinyl ether of Formula (7).

A hydroxyl-terminated polythioether can comprise reaction products of reactants comprising:

(a) a thiol-terminated polythioether of Formula (2a):

$$HS-R^1-[S-A-S-R^1-]_n-SH \qquad (2a)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$, wherein,
p is an integer from 2 to 6;
q is an integer from 1 to 5;
r is an integer from 2 to 10;
each $R^3$ is independently selected from hydrogen and methyl; and
each X is independently selected from O, S, S—S, and NR, wherein R is selected from hydrogen and methyl; and
each A is independently a moiety derived from a polyvinyl ether of Formula (3) or a moiety derived from a polyalkenyl polyfunctionalizing agent of Formula (4):

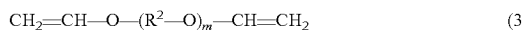   (3)

   (4)

wherein,
each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;
m is an integer from 0 to 50;
$B^2$ represents a core of a z-valent, polyalkenyl polyfunctionalizing agent $B^2(-R^{20}-CH=CH_2)_z$ wherein,
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and (b) a compound having a hydroxyl group and a group reactive with a thiol group.

Hydroxyl-terminated polythioethers can be prepared, for example, as described in Example 2 of U.S. Pat. No. 9,518,197.

Suitable hydroxyl-terminated polythioethers can be prepared by reacting a thiol-terminated polythioether such as Permapol® P3.1E, Permapol® L56086, or a combination thereof (available from PPG Aerospace, Sylmar, Calif.) with a hydroxyl-functional vinyl ether.

Thiol-terminated polythioethers and hydroxyl-terminated polythioethers can be characterized by:

a number average molecular weight within a range from 1,000 Daltons to 8,000 Daltons as determined using iodine titration;

a viscosity within a range from 20 poise to 200 poise (0.2 Pa-sec to 20 Pa-sec) as measured using a Brookfield CAP 2000 viscometer, spindle #6, at 25° C. and 300 rpm;

an average thiol functionality or an average hydroxyl functionality within a range from 2.1 to 2.85, such as from 2.1 to 2.6, or from 2.2 to 2.5; and a mercaptan number within a range from 20 to 50, from 25 to 45, or from 30 to 40 as determined by iodine titration, or a hydroxyl number within a range, for example, from 20 to 50, from 25 to 45, or from 30 to 40, as determined by the potassium hydroxyl neutralization method.

Thiol-terminated polythioethers and hydroxyl-terminated polythioethers can have a thiol or hydroxyl equivalent weight, for example, from 1,200 to 2,000, from 1,300 to 1,900, from 1,400 to 1,800, or from 1,500 to 1,700.

Suitable diisocyanates for preparing chain-extended polythioether prepolymers of the present disclosure include, for example, aliphatic diisocyanates, alicyclic aliphatic diisocyanates, aromatic diisocyanates, and combinations of any of the foregoing.

A diisocyanate can comprise a rigid diisocyanate, a flexible diisocyanate, or a combination thereof. The terms rigid diisocyanate and flexible diisocyanate refer to the relative conformational degrees of freedom of the molecule. A rigid or hard diisocyanate refers to a diisocyanate that has no or few conformational degrees of freedom. An example of a rigid diisocyanate is 4,4'-methylene dicyclohexyl diisocyanate ($H_{12}MDI$). A flexible diisocyanate has more conformational degrees of freedom than that of a rigid diisocyanate. An example of a flexible diisocyanate, compared to $H_{12}MDI$, is isophorone diisocyanate (IPDI). Tetramethyl xylene diisocyanate (TMXDI) is another example of a flexible diisocyanate.

Flexible diisocyanates can be characterized by diisocyanates having an at least partially linear structure. Flexible diisocyanates generally include aliphatic diisocyanates. Examples of suitable flexible aliphatic diisocyanates include 1,6-hexamethylene diisocyanate, 1,5-diisocyanato-2-methylpentane, 1,6-diisocyanato-2,2,4-trimethylhexane, 1,6-diisocyanato-2,4,4-trimethylhexane, 1,4-diisocyanatobutanone, tri-methyl-hexamethylene diisocyanate, 1,8-diisocyanatooctane, 1,12-diisocyanatododecane, 1,8-diiscyanto-2,4-dimethyloctane, and TMXDI. In TMXDI, the isocyanate is not bonded directly to the aromatic ring.

Flexible diisocyanates also include diisocyanates having a single aromatic or cycloaliphatic ring such as isophorone diisocyanate (IPDI), 1,3-bis(isocyanato methyl)cyclohexane, 1,4-bis(isocyanato methyl)cyclohexane, trans-1,4-cyclohexylene diisocyanate, and 2,4-diisocyanato-1-methyl cyclohexane.

A rigid diisocyanate can include two aromatic or cycloalkane rings. Examples of rigid diisocyanates include 4,4-methylene dicyclohexyl diisocyanate and bis(4-isocyanatocyclohexyl) methane.

Suitable aliphatic diisocyanates for preparing polyurethane prepolymers provided by the present disclosure include, for example, isophorone diisocyanate (IPDI), tetramethyl xylene diisocyanate (TMXDI), 4,4'-methylene dicyclohexyl diisocyanate ($H_{12}MDI$), methylene diphenyl diisocyanate (MDI), toluene diisocyanate (TDI), 1,6-hexamethylene diisocyanate (HDI), pentane, 1,5-diisocyanato-, and a combination of any of the foregoing.

Examples of other suitable aliphatic diisocyanates include 1,5-diisocyanato-2-methylpentane, methyl-2,6-diisocyanatohexanoate, bis(isocyanatomethyl)cyclohexane, 1,3-bis(isocyanatomethyl)cyclohexane, 2,2,4-trimethylhexane 1,6-diisocyanate, 2,4,4-trimethylhexane 1,6-diisocyanate, 2,5 (6)-bis(isocyanatomethyl)cyclo[2.2.1.]heptane, 1,3,3-trimethyl-1-(isocyanatomethyl)-5-isocyanatocyclohexane, 1,8-diisocyanato-2,4-dimethyloctane, octahydro-4,7-methano-1H-indenedimethyl diisocyanate, and 1,1'-methylenebis(4-isocyanatocyclohexane).

Examples of suitable alicyclic aliphatic diisocyanates include isophorone diisocyanate (IPDI), 1,4-cyclohexyl diisocyanate (CHDI), methylcyclohexane diisocyanate, bis(isocyanatomethyl)cyclohexane, bis(isocyanatocyclohexyl) methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]- heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo[2.2.1]-heptane.

Other examples of suitable alicyclic diisocyanates for preparing polyurethane prepolymers provided by the present disclosure include 2,2,4-trimethylhexamethylene diisocyanate (TMDI), 1,6-hexamethylene diisocyanate (HDI), 1,1'-methylene-bis-(4-isocyanatocyclohexane), 4,4'-methylene-bis-(cyclohexyl diisocyanate) (4,4-methylene dicyclohexyl diisocyanate ($H_{12}MDI$)), hydrogenated toluene diisocyanate, 4,4'-isopropylidene-bis-(cyclohexyl isocyanate), 1,4-cyclohexyl diisocyanate (CHDI), 4,4'-dicyclohexylmethane diisocyanate (Desmodur® W), and 3-isocyanato methyl-3,5,5-trimethylcyclohexyl diisocyanate (IPDI). Mixtures and combinations of these diisocyanates can also be employed.

Compositions prepared using acyclic and alicyclic aliphatic diisocyanates may exhibit greater stability relative to compositions prepared using other diisocyanates when exposed to ultraviolet (UV) light.

Examples of suitable aromatic diisocyanates in which the isocyanate groups are not bonded directly to the aromatic ring include bis(isocyanatoethyl)benzene, α,α,α',α'-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl)phthalate, and 2,5-di(isocyanatomethyl)furan.

Suitable aromatic diisocyanates having isocyanate groups bonded directly to the aromatic ring include, for example, phenylene diisocyanate, ethylphenylene diisocyanate, isopropylphenylene diisocyanate, dimethylphenylene diisocyanate, diethylphenylene diisocyanate, diisopropylphenylene diisocyanate, naphthalene diisocyanate, methylnaphthalene diisocyanate, biphenyl diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate, 4,4'-diphenylmethane diisocyanate, p-phenylene diisocyanate, 2,4-toluene diisocyanate, and 2,6-toluene diisocyanate.

Other examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanato naphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, 2,4,6-triisopropyl-m-phenylene diisocyanate, and a combination of any of the foregoing.

A suitable diisocyanate can have a molecular weight, for example, from 150 Daltons to 600 Daltons, from 100 Daltons to 1,000 Daltons, or from 300 Daltons to 1,000 Daltons. The reactants for preparing a chain-extended polythioether prepolymer can comprise a ratio of isocyanate functional groups to hydroxyl groups, for example, from 1.01 to 1.10, from 1.01 to 1.6, or from 1.2 to 1.5. A diisocyanate can comprise a single type of diisocyanate or can comprise a combination of different types of diisocyanates. A diisocyanate can comprise a combination of a single type of diisocyanate having diisocyanates with different molecular weights.

Isocyanate-terminated chain-extended polythioether prepolymers can be prepared, for example, from a combination of aliphatic diisocyanates having different molecular structures and/or functionalities. By including more than one type of aliphatic diisocyanate, a coating prepared from an isocyanate-terminated chain-extended polythioether prepolymer can have improved softness and/or flexibility. Additionally, a cured composition prepared from an isocyanate-terminated chain-extended polythioether prepolymer prepared from more than one diisocyanate such as one or more aliphatic diisocyanate may exhibit a low haze value even when the composition includes a high hard segment content. A cured composition prepared from an isocyanate-terminated chain-extended polythioether prepolymer including a combination of diisocyanates can also exhibit improved adhesion, such as improved adhesion to one or more substrates.

A chain-extended polythioether prepolymer provided by the present disclosure can comprise, for example, greater than 25 wt % of a moiety derived from a diisocyanate, greater than 30 wt %, greater than 35 wt %, greater than 40 wt %, or greater than 45 wt % of a diisocyanate, where wt % is based on the total weight of the chain-extended polythioether prepolymer. A chain-extended polythioether prepolymer provided by the present disclosure can comprise, for example, from 20 wt % to 45 wt % of a diisocyanate, from 20 wt % to 40 wt %, from 20 wt % to 35 wt %, or from 25 wt % to 30 wt % of a moiety derived from a diisocyanate, where wt % is based on the total weight of the chain-extended polythioether prepolymer.

A suitable diisocyanate can comprise a diisocyanate having the structure of Formula (8):

$$O{=}C{=}N{-}R^4{-}N{=}C{=}O \qquad (8)$$

wherein $R^4$ can independently be selected from $C_{1-10}$ alkane-diyl, $C_{5-8}$ cycloalkane-diyl, $C_{6-10}$ arenediyl, $C_{6-18}$ alkanecycloalkane-diyl, $C_{7-18}$ alkanearene-diyl, $C_{1-10}$ heteroalkane-diyl, $C_{5-8}$ heterocycloalkane-diyl, $C_{6-10}$ heteroarene-diyl, $C_{6-18}$ heteroalkanecycloalkane-diyl, $C_{7-18}$ heteroalkanearene-diyl, substituted $C_{1-10}$ alkane-diyl, substituted $C_{5-8}$ cycloalkane-diyl, substituted $C_{6-10}$ arene-diyl, substituted $C_{6-18}$ alkanecycloalkane-diyl, substituted $C_{7-18}$ alkanearene-diyl, substituted $C_{1-10}$ heteroalkane-diyl, substituted $C_{5-8}$ heterocycloalkane-diyl, and substituted $C_{6-10}$ heteroarene-diyl.

In diisocyanates of Formula (8), $R^4$ can be selected from $C_{1-10}$ alkane-diyl, $C_{5-8}$ cycloalkanediyl, $C_{6-18}$ alkanecycloalkane-diyl, substituted $C_{1-10}$ alkane-diyl, substituted $C_{5-8}$ cycloalkanediyl, substituted $C_{6-18}$ alkanecycloalkane-diyl, and substituted $C_{1-10}$ heteroalkane-diyl.

In diisocyanates of Formula (8), $R^4$ can be selected from $C_{1-10}$ alkane-diyl, $C_{5-8}$ cycloalkanediyl, and $C_{6-18}$ alkanecycloalkane-diyl.

In diisocyanates of Formula (8), $R^4$ can be $C_{6-18}$ alkanecycloalkane-diyl.

In diisocyanates of Formula (8), $R^4$ can be di(4-yl-cyclohexyl)methane.

In diisocyanates of Formula (8), $R^4$ can $C_{1-318}$ alkanecycloalkane-diyl.

A suitable diisocyanate can comprise an aliphatic diisocyanate.

A suitable diisocyanate can comprise, for example, isophorone diisocyanate, a hexamethylene diisocyanate, diphenylmethane diisocyanate, toluene diisocyanate, dicyclohexylmethane-4,4'-diisocyanate, or a combination of any of the foregoing.

A suitable diisocyanate can comprise dicyclohexylmethane-4,4'-diisocyanate.

The reactants for preparing a chain-extended polythioether prepolymer can comprise a diisocyanate trimer or a combination of diisocyanate trimers. A diisocyanate trimer can be prepared by reacting a diisocyanate in the presence of a diisocyanate trimerization catalyst. A diisocyanate trimer can be prepared from the diisocyanate or combination of diisocyanates as described herein. A diisocyanate trimer can comprise a reaction product of a diisocyanate, such as a reaction product of the same diisocyanate or different diisocyanates.

A diisocyanate trimer can comprise a diisocyanate trimer having the structure of Formula (9):

$$B^3\{-R^4-N=C=O\}_3 \quad (9)$$

where, each $R^4$ can independently be selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ heteroalkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl; and $B^3(-R^4-)_3$ has the structure:

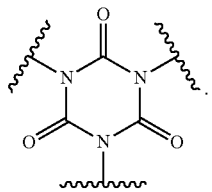 [SMILES: *n1c(=O)n(*)c(=O)n(*)c1=O]

For example, a diisocyanate trimer has the structure:

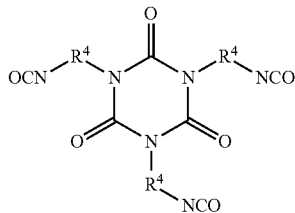

wherein each $R^4$ can independently be selected from $C_{1-10}$ alkane-diyl, $C_{5-8}$ cycloalkanediyl, $C_{6-10}$ arene-diyl, $C_{6-18}$ alkanecycloalkane-diyl, $C_{7-18}$ alkanearene-diyl, $C_{1-10}$ heteroalkane-diyl, $C_{5-8}$ heterocycloalkanediyl, $C_{6-10}$ heteroarene-diyl, $C_{6-18}$ heteroalkanecycloalkane-diyl, $C_{7-18}$ heteroalkanearene-diyl, substituted $C_{1-10}$ alkane-diyl, substituted $C_{5-8}$ cycloalkanediyl, substituted $C_{6-10}$ arene-diyl, substituted $C_{6-18}$ alkanecycloalkane-diyl, substituted $C_{7-18}$ alkanearene-diyl, substituted $C_{1-10}$ heteroalkane-diyl, substituted $C_{5-8}$ heterocycloalkanediyl, and substituted $C_{6-10}$ heteroarene-diyl.

In diisocyanate trimers of Formula (9), each $R^4$ can independently be selected from $C_{1-10}$ alkane-diyl, $C_{5-8}$ cycloalkanediyl, $C_{6-18}$ alkanecycloalkane-diyl, substituted $C_{1-10}$ alkane-diyl, substituted $C_{5-8}$ cycloalkanediyl, substituted $C_{6-18}$ alkanecycloalkane-diyl, and substituted $C_{1-10}$ heteroalkane-diyl.

In diisocyanate trimers of Formula (9), each $R^4$ can be independently selected from $C_{1-10}$ alkane-diyl, $C_{5-8}$ cycloalkanediyl, and $C_{6-18}$ alkanecycloalkane-diyl.

In diisocyanate trimers of Formula (9), each $R^4$ can independently be selected from $C_{6-18}$ alkanecycloalkane-diyl.

In diisocyanate trimers of Formula (9), each $R^4$ can be the same.

In diisocyanate trimers of Formula (9), each $R^4$ can be di(4-yl-cyclohexyl)methane.

In diisocyanate trimers of Formula (9), each $R^4$ can be independently selected from $C_{1-318}$ alkanecycloalkane-diyl.

In the reactants for preparing the chain-extended polythioether, the diisocyanate can comprise, for example, isophorone diisocyanate, hexamethylene diisocyanate, diphenylmethane diisocyanate, toluene diisocyanate, 4,4-dicyclohexylmethane diisocyanate, or a combination of any of the foregoing; and the diisocyanate trimer can comprise, for example, an isophorone diisocyanate trimer, a hexamethylene diisocyanate trimer, a diphenylmethane diisocyanate trimer, a toluene diisocyanate trimer, a 4,4-dicyclohexylmethane diisocyanate trimer, or a combination of any of the foregoing.

A diisocyanate trimer can comprise a trimer of dicyclohexylmethane-4,4'-diisocyanate.

A diisocyanate trimer can be prepared by reacting a diisocyanate or combination of diisocyanates in the presence of a trimerization catalyst such as a tertiary amine catalyst, such as N,N'-dimethylcyclohexylamine.

A diisocyanate can comprise isophorone diisocyanate, hexamethylene diisocyanate, diphenylmethane diisocyanate, toluene diisocyanate, 4,4-dicyclohexylmethane diisocyanate, or a combination of any of the foregoing; and the diisocyanate trimer can comprise isophorone diisocyanate trimer, a hexamethylene diisocyanate trimer, a diphenylmethane diisocyanate trimer, a toluene diisocyanate trimer, a 4,4-dicyclohexylmethane diisocyanate trimer, or a combination of any of the foregoing.

A diisocyanate trimer can be prepared by adding a diisocyanate trimerization catalyst to a mixture comprising a diisocyanate and co-reacting the diisocyanate to provide a diisocyanate trimer.

A diisocyanate trimer can be added to the reactants used to prepare an isocyanate-terminated chain-extended polythioether provided by the present disclosure.

In the reactants for preparing a chain-extended polythioether prepolymer, the molar ratio of a diisocyanate to a diisocyanate trimer can be, for example, from 4:1 to 10:1, from 5:1 to 9:1, from 6:1 to 8:1, or from 6.5:1 to 7.5:1.

The reactants for preparing a chain-extended polythioether prepolymer can comprise a non-linear short-chain diol or combination of non-linear short-chain diols.

Suitable non-linear short-chain diols can comprise moieties that reduce hydrogen bonding in the cured polymer and increase the entropy of the cured composition. Non-linear chain-short chain diols can include lower molecular weight non-linear diols and can have, for example, a molecular weight within a range from 100 Daltons to 500 Daltons, from 100 Daltons to 300 Daltons, or from 100 Daltons to 200 Daltons.

Non-linear short-chain diols can include groups or moieties that reduce hydrogen bonding within the cured polymer network in the cured polymer. Such groups or moieties include pendent groups such as pendent alkyl groups and cyclic groups. These non-linear short chain diols can be distinguished from linear short chain diols such as linear diols having only —CH$_2$— groups and/or heteroatoms without branching or pendent groups.

Suitable non-linear short-chain diols include branched short-chain diols, cyclic diols, and a combination thereof.

A branched short-chain diol can comprise, for example, from 2 to 10 carbon atoms in the chain connecting the two hydroxy groups and from 1 to 4 pendent groups attached thereto. Each of the pendent branching groups can comprise, for example, from 1 to 4 carbon atoms, so that in this example the branched short-chain diol can comprise from 3 to 24 carbon atoms in total. A branched short-chain diol can comprise a branched short-chain diol of Formula (10):

HO—[C(R$^5$)$_2$—]$_s$—OH      (10)

where s can be an integer from 1 to 10; each R$^5$ can be independently selected from hydrogen and C$_{1-6}$ alkyl, and at least one R$^5$ can be C$_{1-6}$ alkyl.

In non-linear short-chain diols of Formula (10), s can be an integer from 3 to 6, or can be 1, 2, 3, 4, 5, 6, 7, 8, 9, or 10. In branched short-chain diols of Formula (10), at least one R$^5$ can be C$_{1-6}$ alkyl, or at least two R$^5$ can be C$_{1-6}$ alkyl. In branched short-chain diols of Formula (10), each R$^5$ can be independently selected from hydrogen, methyl, ethyl, n-propyl, isopropyl, n-butyl, iso-butyl, and tert-butyl.

A non-linear branched short-chain diol can comprise, for example, 2,4-diethyl-1,5-pentanediol, 2-butyl-2-ethyl-1,3-propanediol, 2-ethyl-1,3-hexanediol, 2,2-dimethyl-1,3-propanediol, or a combination of any of the foregoing.

Suitable branched short chain diols can comprise at least one branching or pendent group and can have a molecular weight of, for example, less than 200 Daltons, less than 300 Daltons, less than 400 Daltons, or less than 500 Daltons, determined by gel permeation chromatography using a polystyrene standard.

Examples of suitable branched short-chain diols include branched chain alkane diols, such as propylene glycol, neopentyl glycol, 2-methyl-butanediol, 2,2,4-trimethyl-1,3-pentanediol, 2-methyl-1,3-pentanediol, 2-ethyl-1,3-hexanediol, 2-methyl-1,3-propanediol, 2,2-dimethyl-1,3-propanediol, dibutyl 1,3-propanediol, 2-ethyl-1,3-hexane diol, 2-butyl-2-ethyl-1,3-propanediol, 1,4-cyclohexane di-methanol, 2,4-diethyl-1,5-pentanediol, 3-methyl-1,5-pentanediol, 2-ethyl-1-methyl-1,5-pentanediol, 3-tert-butyl-1,5-pentanediol, 2-methyl-2,4-pentanediol, 2,2-diethyl-1,3-propanediol, 2,2,4-trimethyl-1,3-pentanediol, 2,2-dibutyl-1,3-propanediol, 2,2-methyl-2,3-pentanediol, 3,3-dimethyl-1,2-butanediol, 3-ethyl-1,3-pentanediol, 2-butyl-1,3-propanediol, 2-butyl-2-ethyl-1,3-propanediol, and combinations of any of the foregoing.

A non-linear short-chain diol can comprise a cyclic diol. A cyclic diol can comprise a cyclic diol of Formula (11):

HO—R$^6$—OH      (11)

where R$^6$ is selected from C$_{5-10}$ cycloalkanediyl, C$_{6-18}$ alkanecycloalkanediyl, C$_{5-10}$ heterocycloalkanediyl, C$_{6-18}$ heteroalkanecycloalkanediyl, substituted C$_{5-10}$ cycloalkanediyl, substituted C$_{6-18}$ alkanecycloalkanediyl, substituted C$_{5-10}$ heterocycloalkanediyl, and substituted C$_{6-18}$ heteroalkanecycloalkanediyl.

Examples of branched short-chain diols include branched propylene glycols such as dipropylene glycol, tripropylene glycol, and 3,3-dimethoxy-1,5-pentanediol. A branched propylene glycol can have the structure H—(—O—CH(—CH$_3$)—CH$_2$—)$_n$—OH where n can be, for example, from 1 to 20.

Examples of suitable cyclic diols include, 2,2'-(cyclohexane-1,1-diyl)-diethanol, 4,4'-bicyclohexanol, 4,8-bis(hydroxymethyl)tricyclo[5.2.1]decane, 2,2,4,4-tetramethyl-1,8-cyclobutanediol, cyclopentanediol, 1,4-cyclohexanediol, cyclohexanedimethanols (CHDM), such as 1,4-cyclohexane di-methanol, 1,2-cyclohexane di-methanol, and 1,3-cyclohexane di-methanol; cyclododecanediol, 4,4'-isopropylidene-bicyclohexanol, hydroxypropylcyclohexanol, cyclohexanediethanol, 1,2-bis(hydroxymethyl)-cyclohexane, 1,2-bis(hydroxyethyl)-cyclohexane, 4,4'-isopropylidene-biscyclohexanol, bis(4-hydroxycyclohexanol)methane, and combinations of any of the foregoing.

A chain-extended polythioether prepolymer provided by the present disclosure can comprise, for example, from 5 wt % to 30 wt % of a moiety derived from a non-linear short chain diol, including a branched short chain diol and/or cyclic diol, from 5 wt % to 25 wt %, from 5 wt % to 20 wt %, from 5 wt % to 20 wt %, or from 5 wt % to 15 wt % of a moiety derived from a non-linear short chain diol, where wt % is based on the total weight of the chain-extended polythioether prepolymer. A chain-extended polythioether prepolymer provided by the present disclosure can comprise, for example, greater than 2 wt % of a moiety derived from a non-linear diol, greater than 5 wt %, greater than 10 wt %, greater than 15 wt % or greater than 20 wt % of a moiety derived from a non-linear diol, where wt % is based on the total weight of the chain-extended polythioether prepolymer. A chain-extended polythioether prepolymer provided by the present disclosure can comprise, for example, from 2 wt % to 50 wt % of a moiety derived from a non-linear diol, from 5 wt % to 40 wt %, from 10 wt % to 30 wt %, or from 15 wt % to 25 wt % of a moiety derived from a non-linear diol, where wt % is based on the total weight of the chain-extended polythioether prepolymer.

The reactants for preparing a chain-extended polythioether prepolymer can further comprise a linear short-chain diol or combination of linear short-chain diols.

A linear short-chain diol such as an aliphatic linear diol can have a molecular weight, for example, less than 500 Daltons, less than 400 Daltons, less than 300 Daltons, less than 200 Daltons, or less than 100 Daltons, where molecular weight is determined by gel permeation chromatography using a polystyrene standard. A linear short-chain diol can have a molecular weight, for example, within a range from 50 Daltons to 500 Daltons, from 50 Daltons to 400 Daltons, from 50 Daltons to 300 Daltons or from 50 Daltons to 200 Daltons, where molecular weight is determined by gel permeation chromatography using a polystyrene standard.

Linear short chain diols can be used in combination with non-linear short-chain diols in preparing chain-extended polythioether prepolymers provided by the present disclosure.

A short-chain diol can comprise a non-linear short-chain diol or a combination of non-linear short-chain diols and a linear short-chain diol or a combination of linear short-chain diols. If present, the linear short-chain diol can comprise from 5 wt % to 60 wt %, from 10 wt % to 40 wt %, or from 10 wt % to 30 wt % of a short-chain diol, where wt % is based on the total weight of the short-chain diol used to form a chain-extended polythioether prepolymer, which can include both a non-linear short-chain diol and a linear short-chain diol.

The short-chain diol can comprise an excess mol % of a non-linear short-chain diol compared to the mol % of the linear short-chain diol.

The short-chain diol can comprise, for example, from 50 mol % to 95 mol %, from 60 mol % to 90 mol %, from 70 mol % to 90 mol %, from 80 mol % to 90 mol %, or from 60 mol % to 80 mol % of the non-linear short-chain diol, where mol % is based on the total moles of the short-chain diol including the non-linear short chain diol and the linear short chain diol.

A linear short-chain diol can comprise a linear short-chain diol of Formula (12):

$$HO—R^7—OH \qquad (12)$$

wherein $R^7$ is selected from $C_{1-10}$ n-alkanediyl and $C_{1-10}$ n-heteroalkanediyl.

In chain-extended polythioethers prepared using a linear short-chain diol, each A can comprise a moiety derived from a linear short-chain diol. For example, each A can further independently be selected from a moiety of Formula (12a):

$$—O—R^7—O— \qquad (12a)$$

where $R^7$ is selected from $C_{1-10}$ n-alkanediyl and $C_{1-10}$ n-heteroalkanediyl.

A linear short-chain diol can include a linear aliphatic diol, having, for example, from 1 to 8, such as from 1 to 6 carbon atoms. Examples of suitable aliphatic linear short-chain diols include ethylene glycol, propane diol, butane diol, pentane diol, hexane diol, and combinations of any of the foregoing. A linear short-chain diol can have an odd number of carbon atoms, such as 1,2-propanediol and 1,5-pentanediol.

Examples of suitable short-chain diols include straight chain alkane diols such as 1,2-ethanediol, propane diols such as 1,2-propanediol and 1,3-propanediol, butane diols such as 1,2-butanediol, 1,3-butanediol, and 1,4-butanediol, pentane diols such as 1,5-pentanediol, 1,3-pentanediol and 2,4-pentanediol, hexane diols such as 1,6-hexanediol and 2,5-hexanediol, heptane diols such as 2,4-heptanediol, octane diols such as 1,8-octanediol, nonane diols such as 1,9-nonanediol, decane diols such as 1,10-decanediol, dodecane diols such as 1,12-dodecanediol, octadecanediols such as 1,18-octadecanediol, and combinations of any of the foregoing. A linear short-chain diol can comprise, for example, a propane diol such as 1,2-propanediol and 1,3-propanediol, or butane diol such as 1,2-butanediol, 1,3-butanediol, and 1,4-butanediol. One or more carbon atoms in a short-chain diol can be replaced with a heteroatom, such as N, S, or O, for example diethylene glycol, triethylene glycol, tetraethylene glycol, and sulfur-containing polyols, such as thiodiethanol such as 2,2'-thiodiethanol, and 3,6-dithia-1,2-octanediol.

The reactants for preparing a chain-extended polythioether prepolymer can further comprise a polyfunctionalizing agent or combination of polyfunctionalizing agents. A polyfunctionalizing agent can have a functionality within a range from 3 to 6 such as 3, 4, 5 or 6. A polyfunctionalizing agent can comprise a polythiol, a polyol, or a combination thereof.

A polythiol polyfunctionalizing agent can comprise a polythiol polyfunctionalizing agent of Formula (13):

$$B^4\{—R^{40}—SH\}_z \qquad (13)$$

where, z is an integer from 3 to 6;

each $R^{40}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and $B^4$ is a core of the polyfunctionalizing agent.

A polyol polyfunctionalizing agent can comprise a polyol polyfunctionalizing of Formula (14):

$$B^5\{—R^{50}—OH\}_z \qquad (14)$$

where, z is an integer from 3 to 6;

each $R^{50}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and $B^5$ is a core of the polyfunctionalizing agent.

In polyfunctionalizing agents of Formula (13) and (14), z can be 3, 4, 5, or 6.

In polyfunctionalizing agents of Formula (13) and (14), each $R^{40}$ and $R^{50}$ can be the same.

In polyfunctionalizing agents of Formula (13) and (14), each $R^{40}$ and $R^{50}$ can be $C_{1-10}$ alkanediyl, $C_{1-10}$ heteroalkanediyl, substituted $C_{1-10}$ alkanediyl, or substituted $C_{1-10}$ heteroalkanediyl.

Examples of suitable trifunctional, tetrafunctional, or higher polyols include alkane polyols, such as glycerol, glycerin, tetramethylolmethane, trimethylolethane (for example 1,1,1-trimethylolethane), trimethylolpropane (TMP) (for example 1,1,1-trimethylolpropane), erythritol, pentaerythritol, dipentaerythritol, tripentaerythritol, sorbitan, alkoxylated derivatives thereof, and combinations of any of the foregoing.

A polyol can comprise a cycloalkane polyol, such as trimethylene bis(1,3,5-cyclohexanetriol).

A polyol can comprise an aromatic polyol, such as trimethylene bis(1,3,5-benzenetriol).

Polyol polyfunctionalizing agents include polycaprolactones, such as CAPA™ polycaprolactones such as CAPA™ 4101 (2-oxepanone, polymer with 2,2-bis(hydroxymethyl)-1,3-propanediol) and CAPA® 3031 (2-oxepanone, polymer with 2-ethyl-2-(hydroxymethyl)-1,3-propanediol) available from Perstorp Group. Such caprolactone polyols include tri- and tetra-functional polyols having a molecular weight from 300 Daltons to 8,000 Daltons.

A polyol polyfunctionalizing agent can comprise a polyol of Formula (14c), a polyol of Formula (14d), or a combination thereof:

(14c)

where each $R^2$ is independently $C_{1-6}$ alkanediyl;

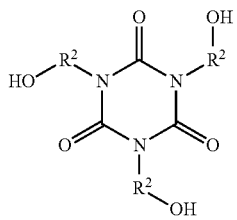
(14d)

where each $R^2$ is independently $C_{1-6}$ alkanediyl. Accordingly, in these polyols the core has the structure of Formula (14e) or Formula (14f), respectively:

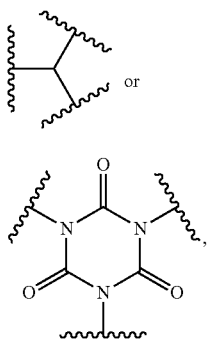
(14e)

or (14f)

where each $R^2$ is independently $C_{1-6}$ alkanediyl.

Combinations of any of the polyols disclosed herein can be used. A polyol polyfunctionalizing agent can have from 3 to 18 carbon atoms such as from 4 to 18 carbon atoms and can have a number average molecular weight of 50 Daltons to 500 Daltons such as from 100 Daltons to 500 Daltons. A polyol can have a number average molecular weight of less than 450 Daltons. A polyol can have a number average molecular weight of less than 200 Daltons. A polyol polyfunctionalizing agent can have, for example, a molecular weight from 200 Daltons to 3,000 Daltons, from 500 Daltons to 2,500 Daltons, or from 500 Daltons to 1,500 Daltons.

The reactants used to prepare a chain-extended polythioether prepolymer provided by the present disclosure may further include a triol or combination of triols, a tetrol or combination of tetrols, a pentol or combination of pentols, a hexol or combination of hexols, or a combination of any of the foregoing. For example, the reactants may contain less than 1 wt % of a polyol such as a triol such as from 0.1 wt % to 0.9 wt %, where wt % is based on the total weight of the components forming the chain-extended polythioether prepolymer. The reactants used to prepare the chain-extended polythioether prepolymer can comprise, for example from 1 wt % to 20 wt % of a polyol polyfunctionalizing agent, from 1 wt % to 15 wt %, from 1 wt % to 10 wt %, from 1 wt % to 5 wt %, from 0.5 wt % to 2 wt %, or from 3 wt % to 7 wt % of a polyol polyfunctionalizing agent, where wt % is based on the total weight of the reactants used to prepare a chain-extended polythioether prepolymer. The reactants used to prepare the chain-extended polythioether prepolymers provided by the present disclosure can comprise, for example, more than 0 wt % to less than 10 wt % of a polyol polyfunctionalizing agent, less than 8 wt %, less than 6 wt %, less than 4 wt %, or less than 2 wt % of a polyol polyfunctionalizing agent, where wt % is based on the total weight of the reactants used to prepare the chain-extended polythioether prepolymer.

The reactants use to prepare a chain-extended polythioether prepolymer can comprise a polythiol polyfunctionalizing agent. A polythioether used to prepare a chain-extended polythioether prepolymer may have an average thiol functionality greater than 2 and may be prepared as described herein using a polyfunctionalizing agent having terminal groups reactive with thiol groups such as alkenyl groups, epoxy groups, Michael acceptor groups, or isocyanate groups. A polythiol polyfunctionalizing agent used to prepare the chain-extended polythioether prepolymer is independent of the polyfunctionalizing agent used to prepare the polythioether.

A polythiol polyfunctionalizing agent used to prepare the chain-extended polythioether prepolymer can comprise a polythiol or a combination of polythiols. The polythiol polyfunctionalizing agent can have a thiol functionality from 3 to 6, from 3 to 5, from 3 to 4, or can be 3, 4, 5, or 6. A polythiol can be a polythiol polyfunctionalizing agent and can have a number average molecular weight, for example, from 90 Daltons to 500 Daltons such as from 100 Daltons to 500 Daltons. A polythiol can have a number average molecular weight of less than 450 Daltons, where number average molecular weight is determined using gel permeation chromatography with polystyrene standards. A polythiol can have a number average molecular weight of less than 200 Daltons.

Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris [2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable mercapto-acetate polythiol polyfunctionalizing agents include pentaerythritol tetramercaptoacetate (PRTMA), trimethylolpropane trimercaptoacetate (TMPMA), glycol dimercaptoacetate (GDMA), ethyleneglycol dimercaptoacetate, di-trimethylolpropane tetramercaptoacetate, and combinations of any of the foregoing.

Examples of suitable mercapto-acrylates polythiol polyfunctionalizing agents include pentaerythritol tetraacrylate, tris[2-(3-mercaptopropionyloxy)ethyl]isocyanurate, 2,3-di(2-mercaptoethylthio)-1-propane-thiol, dimercaptodiethylsulfide (2,2'-thiodiethanethiol), dimercaptodioxaoctane (2,2'-(ethylenedioxy)diethanethiol), 1,8-dimercapto-3,6-dioxaoctane, and combinations of any of the foregoing.

Suitable polythiol polyfunctionalizing agents are commercially available, for example, from Bruno Bock Thiochemicals under the Thiocure® tradename.

Examples of suitable trifunctional polythiols include, for example, 1,2,3-propanetrithiol, 1,2,3-benzenetrithiol, 1,1,1-butanetrithiol, heptane-1,3-7-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Mixtures of polythiols may also be used.

Other examples of suitable polythiol monomers are disclosed, for example, in U.S. Application Publication No.

2010/0010133, which is incorporated by reference in its entirety, and isocyanurates as disclosed, for example, in U.S. Application Publication No. 2011/0319559, which is incorporated by reference in its entirety.

A chain-extended polythioether prepolymer provided by the present disclosure can comprise a moiety of Formula (15):

-[-E-C(O)—NH-D-NH—C(O)—]$_n$-     (15)

wherein, n is an integer from 1 to 60;

each E is independently selected from a moiety selected from (i), (ii), and (iii), wherein,
  (i) is a moiety derived from a non-linear short-chain diol;
  (ii) is a moiety derived from a thiol-terminated polythioether; and
  (iii) is a moiety derived from a hydroxyl-terminated polythioether; and each D is independently selected from a moiety derived from a diisocyanate and a moiety derived from a diisocyanate trimer;

wherein at least 30 mol % of the E moieties are derived from the non-linear short-chain diol, and wherein the prepolymer comprises:
  at least one moiety of Formula (15) in which E is selected from (i); and at least one moiety of Formula (15) in which E is selected from (ii); or
  at least one moiety of Formula (15) in which E is selected from (i); and at least one moiety of Formula (15) in which E is selected from (iii).

In a chain-extended polythioether prepolymer provided by the present disclosure, for example, at least 30 mol % of the E moieties are derived from the non-linear short-chain diol, at least 40 mol %, at least 60 mol %, at least 80 mol %, at least 90 mol %, or 100 mol % of the E moieties can be derived from the non-linear short-chain diol, where mol % is based on the total moles of the E moieties in the prepolymer. In a chain-extended polythioether prepolymer provided by the present disclosure, for example, from 30 mol % to 90 mol % of the E moieties are derived from the non-linear short-chain diol, from 30 mol % to 80 mol %, from 40 mol % to 60 mol %, or from 60 mol % to 80 mol % of the E moieties can be derived from the non-linear short-chain diol, where mol % is based on the total moles of the E moieties in the prepolymer.

In moieties of Formula (15), n can be, for example, an integer from 2 to 20, from 2 to 16, from 2 to 12, or from 2 to 8.

In moieties of Formula (15), each E can independently be selected from a moiety derived from a non-linear short-chain diol and a moiety derived from a thiol-terminated polythioether.

In moieties of Formula (15), each E can independently be selected from a moiety derived from a non-linear short-chain diol and a moiety derived from a hydroxyl-terminated polythioether.

In moieties of Formula (15), each E can be derived from a thiol-terminated polythioether characterized by an average thiol functionality within a range, for example, from 2.1 to 2.8 such as from 2.1 to 2.5, or from 2.1 to 2.3; a hydroxyl-terminated polythioether characterized by an average hydroxyl functionality within a range, for example, from 2.1 to 2.8, such as from 2.1 to 2.5, or from 2.1 to 2.3, or a combination thereof.

In prepolymers comprising a moiety of Formula (15), each E can be a moiety derived from a non-linear short-chain diol of Formula (10) and the moiety E derived from the non-linear short-chain diol can have the structure of Formula (10a):

HO—[C(R$^5$)$_2$—]$_s$—OH     (10)

—O—[C(R$^5$)$_2$—]$_s$—O—     (10a)

where, s is an integer from 1 to 10;

each R$^5$ is independently selected from hydrogen and C$_{1-6}$ alkyl; and at least one R$^5$ is C$_{1-6}$ alkyl.

In Formula (10) and (10a), s can be, for example, an integer from 1 to 8, from 2 to 6, from 2 to 4; or can be 2, 3, 4, 5, 6, 7, 8, 9, or 10.

In Formula (10) and (10a), from one to ten R$^5$ can be C$_{1-6}$ alkyl, from one to eight R$^5$, from one to six R$^5$, or from one to four R$^5$ can be C$_{1-6}$ alkyl. In moieties of Formula (10) and (10a), one R$^5$ can be C$_{1-6}$ alkyl, or two R$^5$ can be C$_{1-6}$ alkyl.

In Formula (10) and (10a), at least one carbon atom can be a geminal carbon atom bonded to two C$_{1-6}$ alkyl groups, at least two carbon atoms, at least three carbon atoms, or at least one carbon atom can be a geminal carbon atom bonded to two C$_{1-6}$ alkyl groups.

In Formula (10) and (10a), each R$^5$ can independently be selected from hydrogen, methyl, ethyl, and propyl.

In prepolymers comprising a moiety of Formula (15), the thiol-terminated polythioether can have the structure of Formula (2a) and the moiety E derived from the thiol-terminated polythioether has the structure of Formula (2):

HS—R$^1$—[S-A-S—R$^1$—]$_n$—SH     (2a)

—S—R$^1$—[S-A-S—R$^1$—]$_n$—S—     (2)

where, n is an integer from 1 to 60;

each R$^1$ is independently selected from C$_{2-10}$ alkanediyl, C$_{6-8}$ cycloalkanediyl, C$_{6-14}$ alkanecycloalkanediyl, C$_{5-8}$ heterocycloalkanediyl, and —[(CHR$^3$)$_p$—X—]$_q$(CHR$^3$)$_r$—, wherein, p is an integer from 2 to 6;

q is an integer from 1 to 5;

r is an integer from 2 to 10;

each R$^3$ is independently selected from hydrogen and methyl; and each X is independently selected from O, S, S—S, and NR, wherein R is selected from hydrogen and methyl; and each A is independently derived from a polyalkenyl.

In thiol-terminated polythioethers of Formula (2) and moieties of Formula (2a), each A can independently be derived from a polyalkenyl wherein the polyalkenyl can comprise a divinyl ether of Formula (3), a polyalkenyl polyfunctionalizing agent of Formula (4), or a combination thereof:

CH$_2$=CH—O—(R$^2$—O)$_m$—CH=CH$_2$     (3)

B$^2$(—R$^{20}$—CH=CH$_2$)$_z$     (4)

where, each R$^2$ is independently selected from C$_{1-10}$ alkanediyl, C$_{6-8}$ cycloalkanediyl, C$_{6-14}$ alkanecycloalkanediyl, and —[(CHR$^3$)$_p$—X—]$_q$(CHR$^3$)$_r$—, wherein p, q, r, R$^3$, and X are as defined as for R$^1$;

m is an integer from 0 to 50; and

B$^2$ represents a core of a z-valent, polyalkenyl polyfunctionalizing agent B$^2$(—R$^{20}$—CH=CH$_2$)$_z$ wherein, z is an integer from 3 to 6; and each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

In thiol-terminated polythioether of Formula (2a) and moieties of Formula (2), each A can independently be selected from a moiety of Formula (3a) and a moiety of Formula (4a):

$$—(CH_2)_2—O—(R^2—O)_m—(CH_2)_2— \quad (3a)$$

$$B^2\{—R^{20}(CH_2)_2—\}_2\{—R^{20}—(CH_2)_2—S—[—R^1—S-A-S—]_{n1}—R^1—S\}_{z-2} \quad (4a)$$

where,
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(CHR^3)_p—X—]_q(CHR^3)_r—$, wherein,
p is an integer from 2 to 6;
q is an integer from 1 to 5;
r is an integer from 2 to 10;
each $R^2$ is independently selected from $C_{1-10}$ alkanediyl, $C_{6-8}$ cycloalkanediyl, $C_{6-14}$ alkanecycloalkanediyl, and $—[(CHR^3)_p—X—]_q(CHR^3)_r—$, wherein p, q, r, $R^3$, and X are as defined as for $R^1$;
m is an integer from 0 to 50; and
each n1 is independently selected from an integer from 0 to 60;
$B^2$ represents a core of a z-valent, polyalkenyl polyfunctionalizing agent $B^2(—R^{20}—CH=CH_2)_z$ wherein,
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

In compounds of Formula (4a), n1 can be an integer, for example, from 0 to 60, from 0 to 40, from 0 to 20, or from 0 to 10.

In prepolymers comprising a moiety of Formula (15), a hydroxyl-terminated polythioether can have the structure of Formula (2b) and the moiety E derived from the hydroxyl-terminated polythioether can have the structure of Formula (2c):

$$HO—R^{10}—S—R^1—[S-A-S—R^1—]_n—S—R^{10}—OH \quad (2b)$$

$$—O—R^{10}—S—R^1—[S-A-S—R^1—]_n—S—R^{10}—O— \quad (2c)$$

where,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(CHR^3)_p—X—]_q(CHR^3)_r—$, wherein,
p is an integer from 2 to 6;
q is an integer from 1 to 5;
r is an integer from 2 to 10;
each $R^3$ is independently selected from hydrogen and methyl; and
each X is independently selected from O, S, S—S, and NR, wherein R is selected from hydrogen and methyl;
each A is independently a moiety derived from a polyvinyl ether or a moiety derived from a polyalkenyl polyfunctionalizing agent; and
each $R^{10}$ is independently a moiety derived from the reaction of a compound comprising a hydroxyl group and a group reactive with a thiol group.

In hydroxyl-terminated polythioethers of Formula (2b) and moieties of Formula (2c), A can be derived from a polyalkenyl, wherein the polyalkenyl can comprise a divinyl ether of Formula (3) and the polyalkenyl polyfunctionalizing agent can comprise a polyalkenyl polyfunctionalizing agent of Formula (4):

$$CH_2=CH—O—(R^2—O)_m—CH=CH_2 \quad (3)$$

$$B^2(—R^{20}—CH=CH_2)_z \quad (4)$$

where,
m is an integer from 0 to 50;
each $R^2$ is independently selected from $C_{1-10}$ alkanediyl, $C_{6-8}$ cycloalkanediyl, $C_{6-14}$ alkanecycloalkanediyl, and $—[(CHR^3)_p—X—]_q(CHR^3)_r—$, wherein p, q, r, $R^3$, and X are as defined as for Formula (2b);
$B^2$ represents a core of a z-valent, polyalkenyl polyfunctionalizing agent $B^2(—R^{20}—CH=CH_2)_z$ wherein,
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

In hydroxyl-terminated polythioethers of Formula (2b) and moieties of Formula (2c), the compound comprising a hydroxyl group and a group reactive with a thiol group comprises a compound having the structure of Formula (6):

$$R^{60}—R^{70}—OH \quad (6)$$

where,
$R^{60}$ is selected from an alkenyl, epoxy, isocyanate, and a Michael acceptor group; and
$R^{70}$ is selected from $C_{2-20}$ alkanediyl, $C_{2-20}$ heteroalkanediyl, substituted $C_{2-20}$ alkanediyl, and substituted $C_{2-20}$ heteroalkanediyl.

In hydroxyl-terminated polythioethers of Formula (2b) and moieties of Formula (2c), each $—R^{10}—OH$ has the structure of Formula (6a):

$$—R^{60a}—R^{70}—OH \quad (6a)$$

where,
$R^{60a}$ is selected from $—(CH_2)_2—$, $—CH_2—C(OH)—$, $—O—C(O)—NH—$, and residue of a Michael acceptor; and
$R^{70}$ is selected from $C_{2-20}$ alkanediyl, $C_{2-20}$ heteroalkanediyl, substituted $C_{2-20}$ alkanediyl, and substituted $C_{2-20}$ heteroalkanediyl.

In hydroxyl-terminated polythioethers of Formula (2b) and moieties of Formula (2c), the compound comprising a hydroxyl group and a group reactive with a thiol can comprise a hydroxyl-functional vinyl ether of Formula (7:

$$CH_2=CH—O—[C(R^5)_2]_t—OH \quad (7)$$

where,
t is an integer from 2 to 10; and
each $R^5$ is independently selected from hydrogen and $C_{1-6}$ alkyl.

In hydroxyl-terminated polythioethers of Formula (2b) and moieties of Formula (2c), $—R^{10}—OH$ can have the structure of Formula (7a):

$$—(CH_2)_2—O—[C(R^5)_2]_t—OH \quad (7a)$$

where,
t is an integer from 2 to 10; and
each $R^5$ is independently selected from hydrogen and $C_{1-6}$ alkyl.

In prepolymers comprising a moiety of Formula (15), each E can independently be selected from a moiety of Formula (3a) and a moiety of Formula (4a):

$$-(CH_2)_2-O-(R^2-O)_m-(CH_2)_2- \quad (3a)$$

$$B^2\{-R^{20}-(CH_2)_2-\}_2\{-R^{20}-(CH_2)_2-S-[-R^1-S-A-S-]_{n1}-R^1-S-\}_{z-2} \quad (4a)$$

where,
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$, wherein,
  p is an integer from 2 to 6;
  q is an integer from 1 to 5;
  r is an integer from 2 to 10;
each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;
m is an integer from 0 to 50; and
each n1 is independently selected from an integer from 0 to 60;
$B^2$ represents a core of a z-valent, polyalkenyl polyfunctionalizing agent $B^2(-R^{20}-CH=CH_2)_z$ wherein,
  z is an integer from 3 to 6; and
  each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

In prepolymers comprising a moiety of Formula (15), the diisocyanate can have the structure of Formula (8) and the moiety D derived from the diisocyanate can have the structure of Formula (8a):

$$O=C=N-R^4-N=C=O \quad (8)$$

$$-R^4- \quad (8a)$$

wherein each $R^4$ can independently be selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ heteroalkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl.

In prepolymers comprising a moiety of Formula (15), the diisocyanate trimer can comprise a diisocyanate trimer of Formula (9) and the moiety D derived from the diisocyanate trimer can comprise a moiety of Formula (9a):

$$B^3\{-R^4-N=C=O\}_3 \quad (9)$$

$$B^3\{-R^4-NH-C(O)-\}_2\{-R^4-R^{41}\} \quad (9a)$$

where,
$R^{41}$ is selected from a moiety of Formula (17) and a moiety of Formula (18):

$$-N=C=O \quad (17)$$

$$-NH-C(O)-[-E-C(O)-NH-D-NH-C(O)-]_{n1}-E-C(O)-NH-D-N=C=O \quad (18)$$

$B^3$ represents a core of a tri-valent, diisocyanate trimer $B^3\{-R^4-N=C=O\}_3$;
each $R^4$ can independently be selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ hetero alkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl; and each E, D, and n1 are defined as for Formula (15).

In prepolymers comprising a moiety of Formula (9), the diisocyanate trimer can comprise a diisocyanate trimer of Formula (9b):

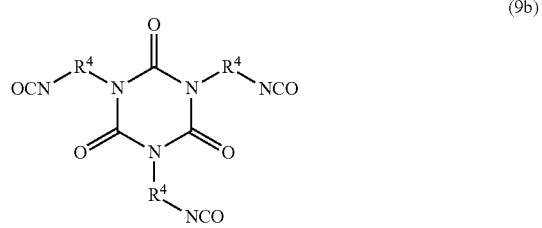

(9b)

where each $R^4$ can independently be selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ hetero alkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl.

In prepolymers comprising a moiety of Formula (15), the moiety D derived from a diisocyanate trimer comprises a moiety of Formula (16):

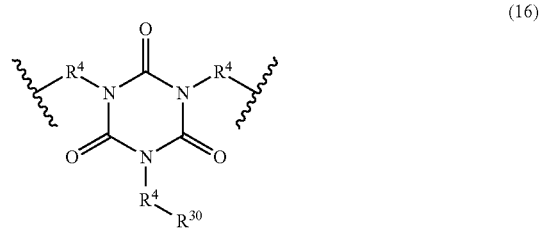

(16)

where,
each $R^4$ can independently be selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ hetero alkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl; and $R^{30}$ is selected from a moiety of Formula (17) and a moiety of Formula (18):

$$—N=C=O \quad (17)$$

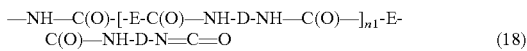

$$—NH—C(O)\text{-}[\text{-}E\text{-}C(O)—NH\text{-}D\text{-}NH—C(O)—]_{n1}\text{-}E\text{-}C(O)—NH\text{-}D\text{-}N=C=O \quad (18)$$

where E, D, and n1 are defined as for Formula (15).

In prepolymers comprising a moiety of Formula (15), some of the E moieties can further independently be selected from (iv) a moiety derived from a polyol polyfunctionalizing agent.

In prepolymers comprising a moiety of Formula (15), the moiety E can be derived from a polyol polyfunctionalizing agent of Formula (14), and the moiety E derived from a polyol polyfunctionalizing agent can have the structure of Formula (14b):

$$B^5\{—R^{50}—OH\}_z \quad (14)$$

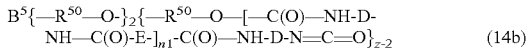

$$B^5\{—R^{50}—O\text{-}\}_2\{—R^{50}—O—[—C(O)—NH\text{-}D\text{-}NH—C(O)\text{-}E\text{-}]_{n1}\text{-}C(O)—NH\text{-}D\text{-}N=C=O\}_{z-2} \quad (14b)$$

where, each n1 is independently selected from an integer from 0 to 60;

$B^5$ represents a core of a z-valent, polyol polyfunctionalizing agent $B^5\{—R^{50}—OH\}_z$;

z is an integer from 3 to 6;

each $R^{50}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and E and D are defined as in Formula (15).

In prepolymers comprising a moiety of Formula (15), some of the E moieties can further comprise (v) a moiety derived from a polythiol polyfunctionalizing agent.

In prepolymers comprising a moiety of Formula (15), the moiety E can be derived from a polythiol polyfunctionalizing agent of Formula (13), and the moiety E derived from the polythiol polyfunctionalizing agent can have the structure of Formula (13b):

$$B^4\{—R^{40}—SH\}_z \quad (13)$$

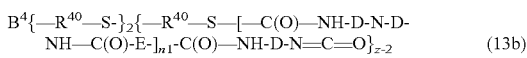

$$B^4\{—R^{40}—S\text{-}\}_2\{—R^{40}—S—[—C(O)—NH\text{-}D\text{-}N\text{-}D\text{-}NH—C(O)\text{-}E\text{-}]_{n1}\text{-}C(O)—NH\text{-}D\text{-}N=C=O\}_{z-2} \quad (13b)$$

where, each n1 is independently selected from an integer from 0 to 60;

$B^4$ represents a core of a z-valent, polythiol polyfunctionalizing agent $B^4\{—R^{40}—SH\}_z$;

z is an integer from 3 to 6;

each $R^{40}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and E and D are defined as for Formula (15).

In prepolymers comprising a moiety of Formula (15 some of the E moieties can further comprise (vi) a moiety derived from a linear short-chain diol.

In prepolymers comprising a moiety of Formula (15), the moiety E can be derived from a linear short-chain diol of Formula (12), and the moiety E derived from a linear short-chain diol has the structure of Formula (12a):

$$HO—R^7—OH \quad (12)$$

$$—O—R^7—O— \quad (12a)$$

wherein $R^7$ is selected from $C_{1-10}$ n-alkanediyl and $C_{1-10}$ n-heteroalkanediyl.

A chain-extended polythioether prepolymer provided by the present disclosure can be terminated in isocyanate groups. An isocyanate-terminated chain-extended polythioether prepolymer provided by the present disclosure can have an average isocyanate functionality within a range, for example, from 5 to 15, from 5 to 12, or from 5 to 9. An isocyanate-terminated chain-extended polythioether prepolymer provided by the present disclosure can have an average isocyanate equivalent weight within a range, for example, from 600 to 1,500, or from 600 to 1,200.

An isocyanate-terminated chain-extended polythioether prepolymer provided by the present disclosure can contain alternating segments derived from a polythioether or a non-linear short-chain diol, and a diisocyanate or a diisocyanate trimer, and the prepolymer can be terminated in either moieties derived from an diisocyanate or a moiety derived from a diisocyanate trimer. For example, referring to a moiety of Formula (15), some of the E moieties can be derived from a polythioether such as a thiol-terminated polythioether or a hydroxyl-functional polythioether, and a non-linear short-chain diol; and each —C(O)—NH-D-NH—C(O)— can be derived from a diisocyanate or can be derived from a diisocyanate trimer.

When a linear short-chain diol is also used to synthesize a prepolymer, an isocyanate-terminated chain-extended polythioether prepolymer provided by the present disclosure can contain alternating segments derived from a polythioether, a non-linear short-chain diol, or a linear short-chain diol, and a diisocyanate or a diisocyanate trimer, and the prepolymer can be terminated in moieties derived from a diisocyanate or a diisocyanate trimer. For example, referring to a moiety of Formula (15), some of the E moieties can be derived from a polythioether such as a thiol-terminated polythioether or a hydroxyl-functional polythioether, a non-linear short-chain diol, and a linear short-chain diol; and each —C(O)—NH-D-NH—C(O)— can be derived from a diisocyanate or from a diisocyanate trimer.

When a polyfunctionalizing agent is also used to synthesize a prepolymer, an isocyanate-terminated chain-extended prepolymer provided by the present disclosure can contain alternating segments derived from a polythioether, a non-linear short-chain diol, or a polyfunctionalizing agent, and from a diisocyanate or a diisocyanate trimer, and the prepolymer can be terminated in moieties derived from a diisocyanate or from a diisocyanate trimer. For example, referring to a moiety of Formula (15), each E can be derived from a polythioether such as a thiol-terminated polythioether or a hydroxyl-functional polythioether, a non-linear short-chain diol, and a polyfunctionalizing agent; and each —C(O)—NH-D-NH—C(O)— can be derived from a diisocyanate or from a diisocyanate trimer.

When a linear short-chain diol and a polyfunctionalizing agent is also used, an isocyanate-terminated chain-extended prepolymer provided by the present disclosure can contain alternating segments derived from a polythioether, a non-linear short-chain diol, a linear short-chain diol, or a polyfunctionalizing agent, and from a diisocyanate or a diisocyanate trimer, and the prepolymer can be terminated in either a diisocyanate or a diisocyanate trimer. For example, referring to a moiety of Formula (15), each E can be derived from a polythioether such as a thiol-terminated polythioether or a hydroxyl-functional polythioether, a non-linear short-chain diol, a linear short-chain diol, and a polyfunctionalizing agent; and each —C(O)—NH-D-NH—C(O)— can be derived from a diisocyanate or from a diisocyanate trimer.

In an isocyanate-terminated chain-extended polythioether prepolymer provided by the present disclosure, the molar ratio of moieties derived from a diisocyanate to moieties derived from a diisocyanate trimer can be, for example, from 1:1 to 2:1, from 1:1 to 1.8:1 from 1:1 to 1.6:1, from 1:1 to 1.4:1, or from 1:1 to 1.2:1.

In an isocyanate-terminated chain-extended polythioether prepolymer provided by the present disclosure, the molar ratio of moieties derived from a non-linear short-chain diol to moieties derived from a polythioether can be, for example, from 1:1, from 1:10, from 1:1 to 1:8, from 1:1 to 1:6, from 1:1 to 1:4, or from 1:1 to 1:2.

Isocyanate-terminated chain-extended polythioether prepolymers provided by the present disclosure can comprise a prepolymer having the structure of Formula (19):

$$O=C=N\text{-}D\text{-}NH\text{-}C(O)\text{-}[\text{-}E\text{-}C(O)\text{-}NH\text{-}D\text{-}NH\text{-}C(O)\text{-}]_n\text{-}E\text{-}C(O)\text{-}NH\text{-}D\text{-}N=C=O \quad (19)$$

where, n is an integer from 1 to 60;

each E comprises a moiety independently selected from (i); (ii), and (iii), wherein,
- (i) is a moiety derived from a non-linear short-chain diol;
- (ii) is a moiety derived from a thiol-terminated polythioether; and
- (iii) is a moiety derived from a hydroxyl-terminated polythioether; and each D is selected from a moiety derived from a diisocyanate and a moiety derived from a diisocyanate trimer, wherein the prepolymer comprises:
at least one E is selected from (i); and at least one E is selected from (ii); or
at least one E is selected from (i); and at least one E is selected from (iii).

In isocyanate-terminated chain-extended polythioether prepolymers of Formula (19), the non-linear short-chain diol can have the structure of Formula (10), and the moiety E derived from the non-linear short-chain diol has the structure of Formula (10a):

$$HO\text{—}[C(R^5)_2\text{—}]_s\text{—}OH \quad (10)$$

$$\text{—}O\text{—}[C(R^5)_2\text{—}]_s\text{—}O\text{—} \quad (10a)$$

where, s is an integer from 1 to 10;

each $R^5$ is independently selected from hydrogen and $C_{1-6}$ alkyl; and at least one $R^5$ is $C_{1-6}$ alkyl.

Isocyanate-terminated chain-extended polythioether prepolymers of Formula (19) are terminated with isocyanate groups.

In isocyanate-terminated chain-extended polythioether prepolymers of Formula (19), the thiol-terminated polythioether can have the structure of Formula (2a), and the moiety E derived from the thiol-terminated polythioether can have the structure of Formula (2):

$$HS\text{—}R^1\text{—}[S\text{-}A\text{-}S\text{—}R^1\text{—}]_n\text{—}SH \quad (2a)$$

$$\text{—}S\text{—}R^1\text{—}[S\text{-}A\text{-}S\text{—}R^1\text{—}]_n\text{—}S\text{—} \quad (2)$$

where, n is an integer from 1 to 60;

each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $\text{—}[(CHR^3)_p\text{—}X\text{—}]_q(CHR^3)_r\text{—}$, wherein,
p is an integer from 2 to 6;
q is an integer from 1 to 5;
r is an integer from 2 to 10;

each $R^3$ is independently selected from hydrogen and methyl; and each X is independently selected from O, S, S—S, and NR, wherein R is selected from hydrogen and methyl; and each A is independently a moiety derived from a polyvinyl ether of Formula (3) or a moiety derived from a polyalkenyl polyfunctionalizing agent of Formula (4):

$$CH_2=CH\text{—}O\text{—}(R^2\text{—}O)_m\text{—}CH=CH_2 \quad (3)$$

$$B^2(\text{—}R^{20}\text{—}CH=CH_2)_z \quad (4)$$

where, each $R^2$ is independently selected from $C_{1-10}$ alkanediyl, $C_{6-8}$ cycloalkanediyl, $C_{6-14}$ alkanecycloalkanediyl, and $\text{—}[(CHR^3)_p\text{—}X\text{—}]_q(CHR^3)_r\text{—}$, wherein p, q, r, $R^3$, and X are as defined as for $R^1$;

m is an integer from 0 to 50;

$B^2$ represents a core of a z-valent, polyalkenyl polyfunctionalizing agent $B^2(\text{—}R^{20}\text{—}CH=CH_2)_z$ wherein, z is an integer from 3 to 6; and each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

In isocyanate-terminated chain-extended polythioether prepolymers of Formula (19), the hydroxyl-terminated polythioether can have the structure of Formula (2b), and the moiety E derived from the hydroxyl-terminated polythioether can have the structure of Formula (2c):

$$HO\text{—}R^{10}\text{—}S\text{—}R^1\text{—}[S\text{-}A\text{-}S\text{—}R^1\text{—}]_n\text{—}S\text{—}R^{10}\text{—}OH \quad (2b)$$

$$\text{—}O\text{—}R^{10}\text{—}S\text{—}R^1\text{—}[S\text{-}A\text{-}S\text{—}R^1\text{—}]_n\text{—}S\text{—}R^{10}\text{—}O\text{—} \quad (2c)$$

where, n is an integer from 1 to 60;

each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $\text{—}[(CHR^3)_p\text{—}X\text{—}]_q(CHR^3)_r\text{—}$, wherein,
p is an integer from 2 to 6;
q is an integer from 1 to 5;
r is an integer from 2 to 10;

each $R^3$ is independently selected from hydrogen and methyl; and each X is independently selected from O, S, S—S, and NR, wherein R is selected from hydrogen and methyl; and each A is independently a moiety derived from a polyvinyl ether of Formula (3) or a moiety derived from a polyalkenyl polyfunctionalizing agent of Formula (4):

$$CH_2=CH\text{—}O\text{—}(R^2\text{—}O)_m\text{—}CH=CH_2 \quad (3)$$

$$B^2(\text{—}R^{20}\text{—}CH=CH_2)_z \quad (4)$$

where, each $R^2$ is independently selected from $C_{1-10}$ alkanediyl, $C_{6-8}$ cycloalkanediyl, $C_{6-14}$ alkanecycloalkanediyl, and $\text{—}[(CHR^3)_p\text{—}X\text{—}]_q(CHR^3)_r\text{—}$, wherein p, q, r, $R^3$, and X are as defined as for $R^1$;

m is an integer from 0 to 50;

$B^2$ represents a core of a z-valent, polyalkenyl polyfunctionalizing agent $B^2(\text{—}R^{20}\text{—}CH=CH_2)_z$ wherein, z is an integer from 3 to 6; and each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and $R^{10}$ is a moiety derived from the reaction of a compound comprising a hydroxyl group and a group reactive with a thiol group.

In isocyanate-terminated chain-extended polythioether prepolymers of Formula (19), the diisocyanate can have the structure of Formula (8), and the moiety D derived from the diisocyanate can have the structure of Formula (8a):

$$O\!=\!C\!=\!N\!-\!R^4\!-\!N\!=\!C\!=\!O \quad (8)$$

$$-\!R^4\!- \quad (8a)$$

where $R^4$ can be independently selected from $C_{1-10}$ alkane-diyl, $C_{5-8}$ cycloalkanediyl, $C_{6-10}$ arene-diyl, $C_{6-18}$ alkanecycloalkane-diyl, $C_{7-18}$ alkanearene-diyl, $C_{1-10}$ heteroalkane-diyl, $C_{5-8}$ heterocycloalkanediyl, $C_{6-10}$ heteroarene-diyl, $C_{6-18}$ heteroalkanecycloalkane-diyl, $C_{7-18}$ hetero alkanearene-diyl, substituted $C_{1-10}$ alkane-diyl, substituted $C_{5-8}$ cycloalkanediyl, substituted $C_{6-10}$ arene-diyl, substituted $C_{6-18}$ alkanecycloalkane-diyl, substituted $C_{7-18}$ alkanearene-diyl, substituted $C_{1-10}$ heteroalkane-diyl, substituted $C_{5-8}$ heterocycloalkanediyl, and substituted $C_{6-10}$ heteroarenediyl.

In isocyanate-terminated chain-extended polythioether prepolymers of Formula (19), the diisocyanate trimer can have the structure of Formula (9), and the moiety D derived from the diisocyanate trimer can have the structure of Formula (9a):

$$B^2\{-\!R^4\!-\!N\!=\!C\!=\!O\}_3 \quad (9)$$

$$B^2\{-\!R^4\!-\!NH\!-\!C(O)\!-\!\}_2\{-\!R^4\!-\!R^{41}\} \quad (9a)$$

where,
$R^{41}$ is selected from a moiety of Formula (17) and a moiety of Formula (18):

$$-\!N\!=\!C\!=\!O \quad (17)$$

$$-\!NH\!-\!C(O)\!-\![-\!E\!-\!C(O)\!-\!NH\!-\!D\!-\!NH\!-\!C(O)\!-\!]_{n1}\!-\!E\!-\!C(O)\!-\!NH\!-\!D\!-\!N\!=\!C\!=\!O \quad (18)$$

each n1 is independently selected from an integer from 0 to 60;
$B^2$ represents a core of a tri-valent, diisocyanate trimer $B^2\{-\!R^4\!-\!N\!=\!C\!=\!O\}_3$;
each $R^4$ can independently be selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ hetero alkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl; and
each E and D are defined as for Formula (15).

In isocyanate-terminated chain-extended polythioether prepolymers of Formula (19), the moiety E can further comprise (iv) a moiety derived from a polyol polyfunctionalizing agent.

In isocyanate-terminated chain-extended polythioether prepolymers of Formula (19), the polyol polyfunctionalizing agent can have the structure of Formula (14), and the moiety E derived from the polyol polyfunctionalizing agent can have the structure of Formula (14a):

$$B^5\{-\!R^{50}\!-\!OH\}_z \quad (14)$$

$$B^5\{-\!R^{50}\!-\!O\!-\!\}_2\{-\!R^{50}\!-\!O\!-\![-\!C(O)\!-\!NH\!-\!D\!-\!NH\!-\!C(O)\!-\!E\!-\!]_{n1}\!-\!C(O)\!-\!NH\!-\!D\!-\!N\!=\!C\!=\!O\}_{z-2} \quad (14a)$$

where,
each n1 is independently selected from an integer from 0 to 60;
$B^5$ represents a core of a z-valent, polyol polyfunctionalizing agent $B^5\{-\!R^{50}\!-\!OH\}_z$ wherein,
z is an integer from 3 to 6;
each $R^{50}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and
E and D are defined as for Formula (15).

In isocyanate-terminated chain-extended polythioether prepolymers of Formula (19), the moiety E can further comprise (v) a moiety derived from a polythiol polyfunctionalizing agent.

In isocyanate-terminated chain-extended polythioether prepolymers of Formula (19), the polythiol polyfunctionalizing agent can have the structure of Formula (13), and the moiety E derived from the polythiol polyfunctionalizing agent can have the structure of Formula (13a):

$$B^4\{-\!R^{40}\!-\!SH\}_z \quad (13)$$

$$B^4\{-\!R^{40}\!-\!S\!-\!\}_2\{-\!R^{40}\!-\!S\!-\![-\!C(O)\!-\!NH\!-\!D\!-\!N\!-\!D\!-\!NH\!-\!C(O)\!-\!E\!-\!]_{n1}\!-\!C(O)\!-\!NH\!-\!D\!-\!N\!=\!C\!=\!O\}_{z-2} \quad (13a)$$

where,
each n1 is independently selected from an integer from 0 to 60;
$B^4$ represents a core of a z-valent, polythiol polyfunctionalizing agent $B^4\{-\!R^{40}\!-\!SH\}_z$;
z is an integer from 3 to 6;
each $R^{40}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and
E and D are defined as for Formula (15).

In isocyanate-terminated chain-extended polythioether prepolymers of Formula (19), the moiety E can further comprise (vi) a moiety derived from a linear short-chain diol.

In isocyanate-terminated chain-extended polythioether prepolymers of Formula (19), the linear short-chain diol can have structure of Formula (12), and the moiety E derived from the linear short-chain diol can have the structure of Formula (12a):

$$HO\!-\!R^7\!-\!OH \quad (12)$$

$$-\!O\!-\!R^7\!-\!O\!- \quad (12a)$$

wherein $R^7$ is selected from $C_{1-10}$ n-alkanediyl and $C_{1-10}$ n-heteroalkanediyl.

In compounds of Formula (4a), (13a), (13b), (14a), 14(b), and (18), n1 can be an integer, for example, from 0 to 60, from 0 to 40, from 0 to 20, from 0 to 10, from 1 to 60, from 1 to 40, from 1 to 20, from 5 to 30, or from 5 to 20.

An isocyanate-terminated chain-extended polythioether prepolymer provided by the present disclosure can have a number average molecular weight, for example, within a range from 4,000 Daltons to 24,000 Daltons, from 4,000 Daltons to 20,000 Daltons, from 4,000 to 15,000 Daltons, from 4,000 Daltons to 10,000 Daltons, or from 5,000 Daltons to 9,000 Daltons, where the number average molecular weight is determined using gel permeation chromatography and a polystyrene standard.

An isocyanate-terminated chain-extended polythioether prepolymer provided by the present disclosure can have an isocyanate content within a range, for example, from 2% to 10%, from 2% to 8%, from 3% to 7%, or from 4% to 6%, where the isocyanate content is determined according to indirect titration.

A chain-extended polythioether prepolymer provided by the present disclosure can have an isocyanate content greater than 3%, greater than 5%, greater than 7%, or greater than 9%, where the isocyanate content is determined according to indirect titration.

A chain-extended polythioether prepolymer provided by the present disclosure can have a viscosity, for example, within a range from 100 cps to 600 cps, from 100 cps to 500 cps, or from 100 cps to 400 cps, where the viscosity is measured using a Brookfield CAP 2000 viscometer, spindle #6, at 25° C., and 300 rpm.

Isocyanate-terminated chain-extended polythioether prepolymers provided by the present disclosure can be prepared by combining (1) a thiol-terminated polythioether, a hydroxyl-terminated polythioether, or a combination thereof; (2) a non-linear short-chain diol; (3) a diisocyanate; and (4) a diisocyanate trimer; and reacting the reactants in the presence of a catalyst to provide a chain-extended polythioether prepolymer.

The reactants can comprise an excess of isocyanate equivalents, compared to the total hydroxyl and thiol equivalents of the reactants. For example, the reactants can comprise an excess of isocyanate equivalents greater than 200, greater than 300, or greater than 400. The reactants can comprise, for example, an excess of isocyanate equivalents within a range from 200 to 500, from 200 to 400, or from 250 to 350. The large isocyanate excess results in a highly cross-linked prepolymer with a high reactive isocyanate content.

The reactants can comprise a molar ratio of diisocyanate to diisocyanate trimer, for example, within a range from 4:1 to 9:1, from 5:1 to 9:1, from 6:1 to 8:1, or from 7:1 to 8:1.

A suitable catalyst can promote the reaction of isocyanate groups of a diisocyanate with the hydroxyl groups and/or thiol groups. Examples of suitable catalysts include tertiary amines, metal compound catalysts, and combinations thereof. Examples of suitable tertiary amine catalysts include triethylamine, N-methylmorpholine, triethylenediamine, pyridine, and picoline. Examples of suitable metal compound catalysts include compounds of lead, zinc, cobalt, titanate, iron, copper, and tin. For example, a metal compound catalyst can be lead 2-ethylhexoate, zinc 2-ethylhexoate, cobalt naphthenate, tetraisopropyl titanate, iron naphthenate, copper naphthenate, dibutyl tin diacetate, dibutyl tin dioctate, and dibutyl tin dilaurate. A catalyst can be included in an amount effective to promote the reaction of isocyanate groups with hydroxyl groups and/or thiol groups. For example, a catalyst can be included in an amount in a range of 0.01 wt % to 0.2 wt %, from 0.01 wt % to 0.1 wt %, from 0.01 wt % to 0.05 wt %, or from 0.01 wt % to 0.02 wt %, based on the total weight of the reactants for forming the polyurethane prepolymer. Examples of suitable catalysts include organo-tin catalysts such as dibutyl tin dilaurate.

The reactants can further comprise a linear short-chain diol, a polyfunctionalizing agent, or a combination thereof. The polyfunctionalizing agent can comprise, for example, a polythiol having a thiol-functionality from 3 to 6, a polyol having a hydroxyl-functionality from 3 to 6, or a combination thereof. Examples of suitable polyol polyfunctionalizing agents include polyether polyols (oxyalkylene adducts of glycerine), trimethylolpropane, and 1,2,6-hexanetriol.

A chain-extended polythioether prepolymer can be prepared in a two-step synthetic process. In a first step, the polythioether, the diisocyanate, and the non-linear short-chain diol are combined. Optionally, a linear short-chain diol and/or polyfunctionalizing agent can also be included. A diisocyanate trimerization catalyst can then be added and the mixture heated to provide a diisocyanate trimer. During this first reaction, from 15 mol % to 35 mol % such as 20 mol % to 30 mol %, of the diisocyanate is reacted to form the diisocyanate trimer.

Examples of suitable diisocyanate trimerization catalysts include strong bases such as potassium octoate, quaternary ammonium, phosphines, and tertiary amines. Examples of suitable tertiary amine diisocyanate trimerization catalysts include N,N-dimethylethanolamine (DMEA), diaminobicyclooctane (DABCO), triethylene diamine (TEDA), bis(2-dimethyaminoethyl)ether (BDMAEE), N-ethylmorpholine, N',N'-dimethylpiperizine, N,N,N',N',N"-pentamethyl-diethylene-triamine (PMDETA), N,N-dimethylcyclohexylamine (DMCHA), N,N-dimethylcethylamine, N,N,N',N",N"-pentamethyl-dipropylene-triamine, triethylamine, 1-(2-hydroxypropyl)imidazole, or a combination of any of the foregoing.

In a second step, the polythioether, the unreacted diisocyanate, the diisocyanate trimer, the non-linear short-chain diol, and the optional linear short-chain diol and/or polyfunctionalizing agent; are reacted in the presence of a catalyst to provide the isocyanate-terminated chain-extended polythioether prepolymer.

In an alternative synthetic method, the diisocyanate-trimer can be prepared separately and added to the other reactants. In other words, the first step in the above-method can be eliminated. For example, an isocyanate-terminated chain-extended polythioether prepolymers provided by the present disclosure can be prepared by combining (1) a thiol-terminated polythioether, a hydroxyl-terminated polythioether, or a combination thereof; (2) a non-linear short-chain diol; (3) a diisocyanate; and (4) a diisocyanate trimer; and reacting the reactants in the presence of a catalyst to provide a chain-extended polythioether prepolymer.

Compositions such as coating and sealant compositions can comprise an isocyanate-terminated chain-extended polythioether prepolymer or combination of isocyanate-terminated chain-extended polythioether prepolymers provided by the present disclosure. For example, a composition can comprise from 10 wt % to 80 wt %, from 10 wt % to 60 wt %, from 10 wt % to 50 wt %, from 10 wt % to 40 wt %, or from 20 wt % to 40 wt % of an isocyanate-terminated chain-extended polythioether prepolymer, wherein wt % is based on the total weight of the composition.

Curable compositions provided by the present disclosure can comprise a filler or a combination of filler. A filler can comprise, for example, an inorganic filler, an organic filler, a low-density filler, an electrically conductive filler, or a combination of any of the foregoing. A filler can comprise an organic filler, an inorganic filler, an electrically conductive filler, a low-density filler, or a combination of any of the foregoing.

Fillers can be added to a coating composition, for example, to improve the physical properties of a cured coating, to reduce the weight of a cured coating, and/or to impart electrical conductivity to the coating.

Skydrol®- and fuel-resistant organic fillers can also be used with sealant compositions comprising perfluoroether prepolymers, perfluorosilicone prepolymers, and combinations thereof.

Compositions and sealants provided by the present disclosure can comprise an organic filler or a combination of organic fillers. Organic fillers can be selected to have a low specific gravity and to be resistant to aviation solvents and/or fluids such as JRF Type I and Skydrol®, such as Skydrol® LD-4.

An organic filler can be selected to be resistant to Skydrol®. For example, an organic filler that is resistant to Skydrol®, such as Skydrol® LD-4, will exhibit a swelling of less than 1 vol % following immersion in Skydrol® at a temperature of less than 50° C. for 1,000 hours, or less than 1.2 vol % following immersion in Skydrol® at a temperature of less than 70° C. for 1,000 hours, where the percent swelling is determined according to EN ISO 10563. Suitable organic fillers can also have acceptable adhesion to the sulfur-containing polymer matrix. An organic filler can include solid particles, hollow particles, or a combination thereof. The particles can be generally spherical (referred to as powders), generally non-spherical (referred to as particulates), or a combination thereof. The particles can have a mean particle diameter less than, for example, 100 µm, 50 µm, 40 µm, 30 µm, or less than 25 µm, as determined according to ASTM E-2651-13. A powder can comprise particles having a mean particle diameter with a range from 0.25 µm to 100 µm, 0.5 µm to 50 µm, from 0.5 µm to 40 µm, from 0.5 µm to 30 µm, from 0.5 µm to 20 µm, or from 0.1 µm to 10 µm. Filler particles can comprise nano-powders, comprising particles characterized by a mean particle size, for example, from 1 nm to 100 nm.

An organic filler can have a specific gravity, for example, less than 1.6, less than 1.4, less than 1.15, less than 1.1, less than 1.05, less than 1, less than 0.95, less than 0.9, less than 0.8, or less than 0.7, where specific gravity is determined according to ISO 787 (Part 10). Organic fillers can have a specific gravity, for example, within a range from 0.85 to 1.6, within a range from 0.85 to 1.4, within a range from 0.85 to 1.1, within a range from 0.9 to 1.05, or from 0.9 to 1.05, where specific gravity is determined according to ISO 787 (Part 10).

Organic fillers can comprise thermoplastics, thermosets, or a combination thereof. Examples of suitable organic fillers include epoxies, epoxy-amides, ETFE copolymers, polyethylenes, polypropylenes, polyvinylidene chlorides, polyvinylfluorides, TFE, polyamides, polyimides, ethylene propylenes, perfluorohydrocarbons, fluoroethylenes, polycarbonates, polyetheretherketones, polyetherketones, polyphenylene oxides, polyphenylene sulfides, polyether sulfones, thermoplastic copolyesters, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing.

Examples of suitable organic fillers include polyamides such as polyamide 6 and polyamide 12, polyimides, polyethylene, polyphenylene sulfides, polyether sulfones, thermoplastic copolyesters, and combinations of any of the foregoing.

Examples of suitable polyamide 6 and polyamide 12 particles are available from Toray Plastics as grades SP-500, SP-10, TR-1, and TR-2. Suitable polyamides are also available from the Arkema Group under the tradename Orgasol®, and from Evonik Industries under the tradename Vestosin®. For example, Ganzpearl® polyamides such as Ganzpearl® GPA-550 and GPA-700 are available from Persperse Sakai Trading, New York, N.Y.

Examples of suitable polyimide fillers are available from Evonik Industries under the tradename P84® NT.

An organic filler can include a polyethylene, such as an oxidized polyethylene powder. Suitable polyethylenes are available, for example, from Honeywell International, Inc. under the tradename ACumist®, from INEOS under the tradename Eltrex®, and Mitsui Chemicals America, Inc. under the tradename Mipelon™.

The use of organic fillers such as polyphenylene sulfide in aerospace sealants is disclosed in U.S. Pat. No. 9,422,451, which is incorporated by reference in its entirety. Polyphenylene sulfide is a thermoplastic engineering resin that exhibits dimensional stability, chemical resistance, and resistance to corrosive and high temperature environments. Polyphenylene sulfide engineering resins are commercially available, for example, under the tradenames Ryton® (Chevron), Techtron® (Quadrant), Fortron® (Celanese), and Torelina® (Toray). Polyphenylene sulfide resins are generally characterized by a specific gravity from about 1.3 to about 1.4, where specific gravity is determined according to ISO 787 (Part 10). Polyphenylene sulfide particles having a density of 1.34 g/cm$^3$ and a mean particle diameter of 0.2 µm to 0.25 µm (in water, or from 0.4 µm to 0.5 µm in isopropanol) are available from Toray Industries, Inc.

Polyether sulfone particles are available from Toray Industries, Inc., which have a density of 1.37 g/cm$^3$ and a mean particle diameter from 5 µm to 60 µm.

Thermoplastic copolyester particles can be obtained from Toray Industries, Inc.

An organic filler can have any suitable shape. For example, an organic filler can comprise fractions of crushed polymer that has been filtered to a desired size range. An organic filler can comprise substantially spherical particles. Particles can be non-porous or can be porous. A porous particle can have a network of open channels that define internal surfaces.

An organic filler can have a mean or median particle size, for example, within a range from 1 µm to 100 µm, 2 µm to 40 µm, from 2 µm to 30 µm, from 4 µm to 25 µm, from 4 µm to 20 µm, from 2 µm to 15 µm, or from 5 µm to 12 µm. An organic filler can have an average particle size, for example, less than 100 µm, less than 75 µm, less than 50 µm, less than 40 µm, or less than 20 µm. Particle size distribution can be determined using a Fischer Sub-Sieve Sizer or by optical inspection.

Compositions and sealants provided by the present disclosure can comprise, for example, from 10 wt % to 35 wt % of an organic filler, from 15 wt % to 35 wt %, from 10 wt % to 30 wt %, from 15 wt % to 30 wt %, from 18 wt % to 32 wt %, from 15 wt % to 25 wt %, from 17 wt % to 23 wt %, from 20 wt % to 30 wt %, or from 22 wt % to 28 wt % of an organic filler, where wt % is based on the total weight of the composition. Compositions and sealants can comprise an organic filler comprising a polyamide, an oxidized polyethylene, aminoplast-coated microcapsules, or a combination of any of the foregoing. Compositions and sealants can comprise an organic filler comprising a polyamide, aminoplast-coated microcapsules, or a combination thereof.

An organic filler can include a low-density filler such as an expanded thermoplastic microcapsule and/or a modified expanded thermoplastic microcapsule. Suitable modified expanded thermoplastic microcapsules can include an exterior coating of a melamine or urea/formaldehyde resin.

A thermally expandable microcapsule refers to a hollow shell comprising a volatile material that expands at a predetermined temperature. Thermally expandable thermoplastic microcapsules can have an average initial particle size of 5 μm to 70 μm, in some cases 10 μm to 24 μm, or from 10 μm to 17 μm. The term "average initial particle size" refers to the average particle size (numerical weighted average of the particle size distribution) of the microcapsules prior to any expansion. The particle size distribution can be determined using a Fischer Sub-Sieve Sizer.

A thermally expandable thermoplastic microcapsule can comprise a volatile hydrocarbon or volatile halogenated hydrocarbon within a wall of a thermoplastic resin. Examples of hydrocarbons suitable for use in such microcapsules are include methyl chloride, methyl bromide, trichloroethane, dichloroethane, n-butane, n-heptane, n-propane, n-hexane, n-pentane, isobutane, isopentane, iso-octane, neopentane, petroleum ether, and aliphatic hydrocarbons containing fluorine, such as Freon™, and combinations of any of the foregoing.

Examples of materials suitable for forming the wall of a thermally expandable microcapsule include polymers of vinylidene chloride, acrylonitrile, styrene, polycarbonate, methyl methacrylate, ethyl acrylate, and vinyl acetate, copolymers of these monomers, and combinations of the polymers and copolymers. A crosslinking agent may be included with the materials forming the wall of a thermally expandable microcapsule.

Examples of suitable thermoplastic microcapsules include Expancel™ microcapsules such as Expancel™ DE microspheres available from AkzoNobel. Examples of suitable Expancel™ DE microspheres include Expancel™ 920 DE 40 and Expancel™ 920 DE 80. Suitable low-density microcapsules are also available from Kureha Corporation.

Low-density microcapsules can be characterized by a specific gravity within a range, for example, from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ISO 787 (Part 10). Low density microcapsules can be characterized by a specific gravity, for example, less than 0.1, less than 0.09, less than 0.08, less than 0.07, less than 0.06, less than 0.05, less than 0.04, less than 0.03, or less than 0.02, wherein the specific gravity is determined according to ISO 787 (Part 10).

Low-density microcapsules can be characterized by a mean particle diameter from 1 μm to 100 μm and can have a substantially spherical shape. Low density microcapsules can be characterized, for example, by a mean particle diameter from 10 μm to 100 μm, from 10 μm to 60 μm, from 10 μm to 40 μm, or from 10 μm to 30 μm, as determined according to ASTM E-2651-13.

Low-density filler can comprise uncoated microcapsules, coated microcapsules, or combinations thereof.

Low-density filler such as low-density microcapsules can comprise expanded microcapsules having a coating of an aminoplast resin such as a melamine resin. Aminoplast resin-coated particles are described, for example, in U.S. Pat. No. 8,993,691, which is incorporated by reference in its entirety. Such microcapsules can be formed by heating a microcapsule comprising a blowing agent surrounded by a thermoplastic shell. Uncoated low-density microcapsules can be reacted with an aminoplast resin such as a urea/formaldehyde resin to provide a coating of a thermoset resin on the outer surface of the particle.

Low density filler such as low-density microcapsules can comprise thermally expandable thermoplastic microcapsules having an exterior coating of an aminoplast resin, such as a melamine resin. The coated low-density microcapsules can have an exterior coating of a melamine resin, where the coating can have a thickness, for example, less than 2 μm, less than 1 μm, or less than 0.5 μm. The melamine coating on the light weight microcapsules is believed to render the microcapsules reactive with the thiol-terminated polythioether prepolymer and/or the curing agent, which enhances the fuel resistance, and renders the microcapsules resistant to pressure.

The thin coating of an aminoplast resin can have a film thickness of less than 25 μm, less than 20 μm, less than 15 μm, or less than 5 μm. The thin coating of an aminoplast resin can have a film thickness of at least 0.1 nm, such as at least 10 nm, or at least 100 nm, or, in some cases, at least 500 nm.

Aminoplast resins can be based on the condensation products of formaldehyde, with an amino- or amido-group carrying substance. Condensation products can be obtained from the reaction of alcohols and formaldehyde with melamine, urea or benzoguanamine. Condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Examples of such compounds include N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris(ethylamino)-1,3,5 triazine. Suitable aminoplast resins can also be based on the condensation products of other aldehydes such as acetaldehyde, crotonaldehyde, acrolein, benzaldehyde, furfural, and glyoxal.

An aminoplast resin can comprise a highly alkylated, low-imino aminoplast resin which has a degree of polymerization less than 3.75, such as less than 3.0, or less than 2.0. The number average degree of polymerization can be defined as the average number of structural units per polymer chain. For example, a degree of polymerization of 1.0 indicates a completely monomeric triazine structure, while a degree of polymerization of 2.0 indicates two triazine rings joined by a methylene or methylene-oxy bridge. Degree of polymerization represents an average degree of polymerization value as determined by gel permeation chromatography using polystyrene standards.

An aminoplast resin can contain methylol or other alkylol groups, and at least a portion of the alkylol groups can be etherified by reaction with an alcohol. Examples of suitable monohydric alcohols include alcohols such as methanol, ethanol, propanol, butanol, pentanol, hexanol, heptanol, benzyl alcohol, other aromatic alcohols, cyclic alcohols such as cyclohexanol, monoethers of glycols, and halogen-substituted or other substituted alcohols, such as 3-chloropropanol and butoxyethanol. Aminoplast resins can be substantially alkylated with methanol or butanol.

An aminoplast resin can comprise a melamine resin. Examples of suitable melamine resins include methylated melamine resins (hexamethoxymethylmelamine), mixed ether melamine resins, butylated melamine resins, urea resins, butylated urea resins, benzoguanamine and glycoluril resins, and formaldehyde free resins. Such resins are available, for example, from Allnex Group and Hexion. Examples of suitable melamine resins include methylated melamine resins such as Cymel™ 300, Cymel™ 301, Cymel™ 303LF, Cymel™ 303ULF, Cymel™ 304, Cymel™ 350, Cymel™ 3745, Cymel™ XW-3106, Cymel™

MM-100, Cymel™ 370, Cymel™ 373, Cymel™ 380, ASTRO MEL™601, ASTRO MEL™ 601ULF, ASTRO MEL™400, ASTRO MEL™ NVV-3A, Aricel PC-6A, ASTRO MEL™ CR-1, and ASTRO SET™ 90. A suitable aminoplast resin can comprise a urea-formaldehyde resin.

Low-density microcapsules can be prepared by any suitable technique, including, for example, as described U.S. Pat. Nos. 8,816,023 and 8,993,691, each of which is incorporated by reference in its entirety. Coated low density microcapsules can be obtained, for example, by preparing an aqueous dispersion of microcapsules in water with a melamine resin, under stirring. A catalyst may then be added and the dispersion heated to, for example, a temperature from 50° C. to 80° C. Low density microcapsules such as thermally expanded microcapsules having a polyacrylonitrile shell, de-ionized water and an aminoplast resin such as a melamine resin can be combined and mixed. A 10% w/w solution of para-toluene sulfuric acid in distilled water can then be added and the mixture reacted at 60° C. for about 2 hours. Saturated sodium bicarbonate can then be added and the mixture stirred for 10 minutes. The solids can be filtered, rinsed with distilled water, and dried overnight at room temperature. The resulting powder of aminoplast resin-coated microcapsules can then be sifted through a 250 μm sieve to remove and separate agglomerates.

Prior to application of an aminoplast resin coating, a thermally-expanded thermoplastic microcapsule can be characterized by a specific gravity, for example, within a range from 0.01 to 0.05, within a range from 0.015 to 0.045, within a range from 0.02 to 0.04, or within a range from 0.025 to 0.035, wherein the specific gravity is determined according to ISO 787 (Part 10). For example, Expancel™ 920 DE 40 and Expancel™ 920 DE 80 can be characterized by a specific gravity of about 0.03, wherein the specific gravity is determined according to ISO 787 (Part 10).

Following coating with an aminoplast resin, an aminoplast-coated microcapsule can be characterized by a specific gravity, for example, within a range from 0.02 to 0.08, within a range from 0.02 to 0.07, within a range from 0.02 to 0.06, within a range from 0.03 to 0.07, within a range from 0.03 to 0.065, within a range from 0.04 to 0.065, within a range from 0.045 to 0.06, or within a range from 0.05 to 0.06, wherein the specific gravity is determined according to ISO 787 (Part 10).

Aminoplast-coated microcapsules and method of making aminoplast-coated microcapsules are disclosed, for example in U.S. Application Publication No. 2016/0083619, which is incorporated by reference in its entirety.

Compositions provided by the present disclosure can comprise, for example, from 0.1 wt % to 6 wt %, from 0.5 wt % to 5 wt %, from 1 wt % to 4 wt %, or from 2 wt % to 4 wt % of a lightweight filler or combination of lightweight fillers, where wt % is based on the total weight of the composition. Compositions provided by the present disclosure can comprise, for example, from 1 vol % to 80 vol %, from 2 vol % to 60 vol %, from 5 vol % to 50 vol %, from 10 vol % to 40 vol %, or from 20 vol % to 40 vol %, of a lightweight filler or combination of lightweight fillers, where vol % is based on the total volume of the composition.

Compositions and sealants provided by the present disclosure can comprise an inorganic filler or combination of inorganic fillers. An inorganic filler can be included to provide mechanical reinforcement and to control the rheological properties of the composition. Inorganic fillers may be added to compositions to impart desirable physical properties such as, for example, to increase the impact strength, to control the viscosity, or to modify the electrical properties of a cured composition. Inorganic fillers useful in compositions provided by the present disclosure and useful for aviation and aerospace applications include carbon black, calcium carbonate, precipitated calcium carbonate, calcium hydroxide, hydrated alumina (aluminum hydroxide), fumed silica, silica, precipitated silica, silica gel, and combinations of any of the foregoing. For example, an inorganic filler can include a combination calcium carbonate and fumed silica, and the calcium carbonate and fumed silica can be treated and/or untreated. An inorganic filler can comprise calcium carbonate and fumed silica.

An inorganic filler can be coated or uncoated. For example, an inorganic filler can be coated with a hydrophobic coating, such as a coating of polydimethylsiloxane.

Suitable calcium carbonate fillers include products such as Socal® 31, Socal® 312, Socal® U1S1, Socal® UaS2, Socal® N2R, Winnofil® SPM, and Winnofil® SPT available from Solvay Special Chemicals. A calcium carbonate filler can include a combination of precipitated calcium carbonates.

A filler can include an electrically conductive filler or combination of electrically conductive fillers. Examples of suitable electrically conductive fillers include nickel powder, graphite, nickel-coated graphite, stainless steel, or a combination of any of the foregoing.

Compositions provided by the present disclosure can comprise an electrically conductive filler. Electrical conductivity and EMI/RFI shielding effectiveness can be imparted to composition by incorporating conductive materials within the polymer. The conductive elements can include, for example, metal or metal-plated particles, fabrics, meshes, fibers, and combinations thereof. The metal can be in the form of, for example, filaments, particles, flakes, or spheres. Examples of metals include copper, nickel, silver, aluminum, tin, and steel. Other conductive materials that can be used to impart electrical conductivity and EMI/RFI shielding effectiveness to polymer compositions include conductive particles or fibers comprising carbon or graphite. Conductive polymers such as polythiophenes, polypyrroles, polyaniline, poly(p-phenylene) vinylene, polyphenylene sulfide, polyphenylene, and polyacetylene can also be used. Electrically conductive fillers also include high band gap materials such as zinc sulfide and inorganic barium compounds.

Other examples of electrically conductive fillers include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be used and include, for example, non-noble metal-plated non-noble metals such as copper-coated iron particles or nickel-plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive fillers can also be used to meet the desired conductivity, EMI/RFI shielding effectiveness, hardness, and other properties suitable for a particular application.

The shape and size of the electrically conductive fillers used in the compositions of the present disclosure can be any appropriate shape and size to impart electrical conductivity and EMI/RFI shielding effectiveness to the cured composition. For example, fillers can be of any shape generally used in the manufacture of electrically conductive fillers, including spherical, flake, platelet, particle, powder, irregular, fiber, and the like. In certain sealant compositions of the disclosure, a base composition can comprise Ni-coated graphite as a particle, powder or flake. The amount of Ni-coated graphite in a base composition can range from 40 wt % to 80 wt %, or can range from 50 wt % to 70 wt %, based on the total weight of the base composition. An electrically conductive filler can comprise Ni fiber. Ni fiber can have a diameter ranging from 10 µm to 50 µm and have a length ranging from 250 µm to 750 µm. A base composition can comprise, for example, an amount of Ni fiber ranging from 2 wt % to 10 wt %, or from 4 wt % to 8 wt %, based on the total weight of the base composition.

Carbon fibers, particularly graphitized carbon fibers, can also be used to impart electrical conductivity to compositions of the present disclosure. Carbon fibers formed by vapor phase pyrolysis methods and graphitized by heat treatment and which are hollow or solid with a fiber diameter ranging from 0.1 micron to several microns, have high electrical conductivity. As disclosed in U.S. Pat. No. 6,184,280, carbon microfibers, nanotubes or carbon fibrils having an outer diameter of less than 0.1 µm to tens of nanometers can be used as electrically conductive fillers. An example of graphitized carbon fiber suitable for conductive compositions of the present disclosure include Panex® 3OMF (Zoltek Companies, Inc., St. Louis, Mo.), a 0.921 µm diameter round fiber having an electrical resistivity of 0.00055 Ω-cm.

The average particle size of an electrically conductive filler can be within a range useful for imparting electrical conductivity to a polymer-based composition. For example, the particle size of the one or more fillers can range from 0.25 µm to 250 µm, can range from 0.25 µm to 75 µm, or can range from 0.25 µm to 60 µm. Composition provided by the present disclosure can comprise Ketjenblack® EC-600 JD (AkzoNobel, Inc., Chicago, Ill.), an electrically conductive carbon black characterized by an iodine absorption of 1,000 mg/g to 11,500 mg/g (J0/84-5 test method), and a pore volume of 480 cm$^3$/100 g to 510 cm$^3$/100 g (DBP absorption, KTM 81-3504). An electrically conductive carbon black filler is Black Pearls® 2000 (Cabot Corporation, Boston, Mass.).

Compositions of the present disclosure can comprise more than one electrically conductive filler and the more than one electrically conductive filler can be of the same or different materials and/or shapes. For example, a sealant composition can comprise electrically conductive Ni fibers, and electrically conductive Ni-coated graphite in the form of powder, particles or flakes. The amount and type of electrically conductive filler can be selected to produce a sealant composition which, when cured, exhibits a sheet resistance (four-point resistance) of less than 0.50 Ω/cm$^2$, or a sheet resistance less than 0.15 Ω/cm$^2$. The amount and type of filler can also be selected to provide effective EMI/RFI shielding over a frequency range of from 1 MHz to 18 GHz for an aperture sealed using a sealant composition of the present disclosure.

A composition can comprise, for example, from 0 wt % to 80 wt % of an electrically conductive filler or combination of electrically conductive fillers, such as from 10 wt % to 80 wt %, 20 wt % to 80 wt %, 30 wt % to 80 wt %, 40 wt % to 80 wt %, 50 wt % to 80 wt % or from 50 wt % to 70 wt %, where wt % is based on the total wt % of the sprayable composition.

A filler can be an electrically-conductive filler and can be used to impart electrically conductivity and/or EMI/RFI shielding effectiveness to a three-dimensional printed object. For example, an electrically conductive printed object can be characterized by a sheet resistance less than 0.5 Ω/cm$^2$ or less 0.15 Ω/cm$^2$. For example, an electrically conductive printed object can provide effective EMI/RFI over a frequency range from 1 MHz to 18 GHz, or a subrange between 1 MHz to 18 GHz.

Compositions provided by the present disclosure can contain, for example, from 0.1 wt % to 90 wt %, from 0.1 wt % to 80 wt %, from 0.1 wt % to 70 wt %, from 1 wt % to 70 wt %, from 5 wt % to 60 wt %, from 10 wt % to 50 wt %, from 10 wt % to 40 w %, or from 20 wt % to 60 wt % of a filler or combination of fillers, where wt % is based on the total weight of the composition.

Sprayable compositions provided by the present disclosure can contain, for example, from 0.1 wt % to 90 wt %, from 1 wt % to 90 wt %, from 5 wt % to 90 wt %, from 10 wt % to 85 wt %, from 20 wt % to 80 w %, or from 30 wt % to 80 wt %, from 40 wt % to 80 wt %, from 50 wt % to 80 wt %, or from 60 wt % to 80 wt % of a filler or combination of fillers, where wt % is based on the total dry solids weight of the sprayable composition.

Cured compositions provided by the present disclosure can contain, for example, from 0.1 wt % to 90 wt %, from 1 wt % to 90 wt %, from 5 wt % to 90 wt %, from 10 wt % to 85 wt %, from 20 wt % to 80 w %, or from 30 wt % to 80 wt %, from 40 wt % to 80 wt %, from 50 wt % to 80 wt %, or from 60 wt % to 80 wt % of a filler or combination of fillers, where wt % is based on the total weight of the cured composition.

Compositions such as sprayable coatings provided by the present disclosure can comprise a curing agent, such as a polyamine curing agent or a polyol curing agent. The curing agent can be a blocked curing agent such as a blocked polyamine curing agent or a blocked polyol curing agent. A blocked curing agent can be unblocked in the presence of moisture, such as during spray coating.

Examples of suitable polyamine curing agents include aliphatic polyamines, cycloaliphatic polyamines, aromatic polyamines and combinations thereof. A polyamine curing agent can have at least two amine groups selected from a primary amine group (—NH$_2$), a secondary amine group (—NH—), and combinations thereof. A polyamine curing agent can have at least two primary amine groups.

A polyamine curing agent can be a blocked, moisture-activated polyamine curing agent such as, for example, Vestamin® A-139. Examples of suitable blocked, moisture-activated polyamine curing agents include ketimines, enamines, oxazolidines, aldimines, and imidazolidines. In the presence of moisture, the blocking group, e.g., the ketamine, enamine, oxazolidine, aldimine, or imidazolidine blocking group or groups reacts with water to provide a catalytic amine catalyst and a ketone or alcohol. Suitable blocked reactive polyamines are disclosed, for example, in U.S. Pat. No. 5,206,200.

The equivalent ratio of isocyanate to amine in a curable composition can be, for example, from 1.0 to 0.6 from 1.0 to 0.7 from 1.0 to 0.8, from 1.0 to 0.9. A curable composition can have, for example, a 10 mol % excess of isocyanate to amine groups, an excess of 15 mol %, an excess of 20 mol %, and excess of 25 mol %, an excess of 30 mol %, an excess of 40 mol %, or an excess of 50 mol % isocyanate to amine groups.

Compositions such as sprayable coatings provided by the present disclosure can comprise an isocyanate-terminated chain-extended polythioether prepolymer provided by the present disclosure and a curing agent.

Examples of suitable curing agents include polyamines.

A polyamine curing agent can be a blocked, moisture-activated polyamine.

A composition can comprise, for example, from 1 wt % to 15 wt %, from 1 wt % to 12 wt %, from 1 wt % to 10 wt %, from 2 wt %, to 8 wt %, or from 2 wt % to 6 wt % of a curing agent such as moisture-activated blocked curing agent, where wt % is based on the total weight of the composition.

A composition provided by the present disclosure can comprise a combination of a blocked polyamine and an un-blocked amine.

Examples of suitable unblocked polyamines include Vestamine® TMD and isophorone diamine.

A composition can comprise, for example from 70 mol % to 100 mol %, from 80 mol % to 100 mol %, or from 90 mol % to 100 mol % of a blocked amine, where mol % is based on the total moles of the polyamine curing agent, where the remainder of the polyamine curing agent comprises an unblocked polyamine.

Compositions provided by the present disclosure can comprise a solvent or combination of solvents.

Examples of suitable solvents include acetone, methylethyl ketone (MEK), methyl n-amyl ketone (MAK), methyl iso-amyl ketone, diisobutyl ketone, methyl isobutyl ketone, methyl isopropyl ketone, methyl propyl ketone, and combinations of any of the foregoing.

A sprayable composition can contain, for example, from 15 wt % to 40 wt % solvent or combination of solvents, from 20 wt % to 35 wt %, or from 25 wt % to 30 wt % solvent or combination of solvents, where wt % is based on the total weight of the sprayable composition.

Compositions provided by the present disclosure can contain a UV stabilizer or combination of UV stabilizers.

A UV stabilizer can include a UV absorber, a hindered amine light stabilizer, a benzoate or a combination of any of the foregoing.

Examples of suitable UV absorbers include benzotriazoles, triazines, and benzophenones.

A sprayable composition can contain, for example, from 0.1 wt % to 3 wt %, from 0.2 wt % to 2.5 wt %, from 0.4 wt % to 2 wt %, or from 0.5 wt % to 1.5 wt % of a UV stabilizer or combination of UV stabilizers, where wt % is based on the total weight of the composition.

A cured composition can contain, for example, from 0.1 wt % to 3 wt %, from 0.2 wt % to 2.5 wt %, from 0.4 wt % to 2 wt %, or from 0.5 wt % to 1.5 wt % of a UV stabilizer or combination of UV stabilizers, where wt % is based on the total weight of the cured composition.

Compositions provided by the present disclosure can contain an antioxidant or combination of antioxidants.

An antioxidant can include phenolic antioxidants and phosphite antioxidants.

A sprayable composition can contain, for example, from 0.1 wt % to 3 wt %, from 0.2 wt % to 2.5 wt %, from 0.4 wt % to 2 wt %, or from 0.5 wt % to 1.5 wt % of an antioxidant or combination of antioxidants, where wt % is based on the total weight of the composition.

A cured composition can contain, for example, from 0.1 wt % to 3 wt %, from 0.2 wt % to 2.5 wt %, from 0.4 wt % to 2 wt %, or from 0.5 wt % to 1.5 wt % of an antioxidant or combination of antioxidants, where wt % is based on the total weight of the cured composition.

Isocyanate-terminated chain-extended polythioether prepolymers provided by the present disclosure can be used to prepare sprayable coatings such as polyurethane coatings and polyurea coatings. A coating composition can comprise an isocyanate-terminated chain-extended polythioether prepolymer, a curing agent, fillers, solvents, and additives.

Compositions provided by the present disclosure can be formulated, for example, as sprayable compositions, as paintable compositions, as brush-on compositions, or as roller-coated compositions.

Compositions provided by the present disclosure can comprise, for example, from 5 wt % to 50 wt %, from 10 wt % to 45 wt %, from 15 wt % to 40 wt %, or from 20 wt % to 30 wt %, of an isocyanate-terminated chain-extended polythioether provided by the present disclosure; from 50 wt % to 90 wt %, from 55 wt % to 85 wt %, or from 60 wt % to 80 wt % filler; and from 1 wt % to 6 wt %, from 1.5 wt % to 5 wt %, or from 2 wt % to 4 wt % of a curing agent, where wt % is based on the total weight of a composition.

A sprayable composition can comprise, for example, from 15 wt % to 40 wt %, from 20 wt % to 35 wt %, or from 25 wt % to 30 wt % solvent; from 5 wt % to 35 wt %, from 10 wt % to 30 wt %, from 15 wt % to 25 wt % of an isocyanate-terminated chain-extended polythioether provided by the present disclosure, and from 30 wt % to 70 wt %, from 35 wt % to 65 wt %, or from 40 wt % to 60 wt % of filler, wherein wt % is based on the total weight of the composition.

Coating and sealant systems provided by the present disclosure can include a one-part, a two-part, or a three-part system. In a one-part system the components can be combined and stored prior to use. In a two-part system, a first part and a second part can be stored separately and combined prior to use. For example, a first part can comprise primarily the solid content including, for example, the isocyanate-terminated chain-extended polythioether, filler, UV package, blocked catalyst, and optionally some solvent; and the second part can comprise solvent that is combined with the first part prior to use. In a three-part system, the first part can comprise, for example, the isocyanate-terminated chain-extended polythioether, filler, and UV package; and a second part comprising solvent, and a third part comprising a catalyst can be combined prior to use.

Compositions provided by the present disclosure can comprise, for example, from 10 wt % to 90 wt % of an isocyanate-terminated chain-extended polythioether prepolymer provided by the present disclosure, from 0 wt % to 70 wt % of a filler, from 1 wt % to 10 wt % or a catalyst, and from 5 wt % to 40 wt % solvent, where wt % is based on the total weight of the composition.

Compositions provided by the present disclosure can comprise, for example, from 20 wt % to 90 wt % of an isocyanate-terminated chain-extended polythioether prepolymer provided by the present disclosure, from 10 wt % to 70 wt % of a filler, from 1 wt % to 10 wt % or a catalyst, and from 5 wt % to 40 wt % solvent, where wt % is based on the total weight of the composition.

Compositions provided by the present disclosure can comprise, for example, from 30 wt % to 90 wt % of an isocyanate-terminated chain-extended polythioether prepolymer provided by the present disclosure, from 20 wt % to 70 wt % of a filler, from 1 wt % to 10 wt % or a catalyst, and from 5 wt % to 40 wt % solvent, where wt % is based on the total weight of the composition.

Compositions provided by the present disclosure can be used as coatings or as sealant.

A coating can be single coating or can be a layer of a multi-layer coating. As a coating layer of a multi-layer coating, a coating layer can be an inner layer coating, or can be a top coat.

As sprayable coatings, the high isocyanate content of the sprayable composition facilitates the ability of the exterior of the coating to rapidly cure to provide a tack-free surface. Rapid curing can prevent coating sag and facilitate handling of the part while the coating is being fully cured. The high cross-linking density of the cured polymer can facilitate the incorporation of a high filler content with high tensile strength and % elongation.

Cured coatings provided by the present disclosure can exhibit, for example, a tensile strength greater than 1,000 psi, greater than 1,500 psi, greater than 2,000 psi, or greater than 2,500 psi, where tensile strength is determined according to ASTM D-412.

Cured coatings provided by the present disclosure can exhibit, for example, a tensile strength within a range from 1,000 psi to 3,000 psi (6.89 MPa to 20.68 MPa), from 1,250 psi to 2,750 psi (8.62 MPa to 18.96 MPa), from 1,500 psi to 2,500 psi (10.34 MPa to 17.24 MPa), or from 1,750 psi to 2,250 psi (12.06 MPa to 15.51 MPa), where tensile strength is determined according to ASTM D-412.

Cured coatings provided by the present disclosure can exhibit, for example, a % elongation greater than 50%, greater than 100%, greater than 150%, greater than 200%, or greater than 250%, where % elongation is determined according to ASTM D-412.

Cured coatings provided by the present disclosure can exhibit, for example, a % elongation from 50% to 300%, from 75% to 275%, from 100% to 250%, or from 125% to 225%, where % elongation is determined according to ASTM D-412.

Cured coatings, following immersion in aerospace fluids can exhibit a % volume swell less than 12.5%, less than 10%, less than 7.5%, less than 5%, less than 2.5%, or less than 1.5%, where % volume swell is determined according to methods as described in the present examples.

Cured coatings, following immersion in aerospace fluids can exhibit, for example, a % volume swell from 1% to 12.5%, from 1% to 10%, from 1% to 7.5%, from 1% to 5%, or from 1% to 2.5%, where % volume swell is determined according to methods as described in the present examples.

Cured coatings, following immersion in aerospace fluids can exhibit, for example, a % weight gain less than 12.5%, less than 10%, less than 7.5%, less than 5%, less than 2.5%, or less than 1.5%, where % weight gain is determined as described in the present examples.

Cured coatings, following immersion in aerospace fluids can exhibit, for example, a % weight gain from 1% to 12.5%, from 1% to 10%, from 1% to 7.5%, from 1% to 5%, or from 1% to 2.5%, where % weight gain is determined according to methods as described in the present examples.

Examples of aerospace fluids include JP-8, JRF Type I, lubrication oil, hydraulic fluid such as Skydrol® LD-4.

Cured coatings, following immersion in aerospace fluids, can exhibit, for example, a % volume swell less than 10%, less than 7.5%, or less than 5%; and a % weight gain less than 7.5%, less than 5%, or less than 2.5%, where % volume swell is determined according to methods as described in the present examples, and % weight gain is determined according to methods as described in the present examples.

Cured coatings, following immersion in aerospace fluids, can exhibit, for example, a tensile strength greater than 1,000 psi, greater than 1,500 psi, or greater than 2,000 psi; a % elongation greater than 75%, greater than 100%, greater than 200%, or greater than 300%; a % volume swell less than 10%, less than 7.5%, or less than 5%; and a % weight gain less than 7.5%, less than 5%, or less than 2.5%, where % volume swell is determined according to methods as described in the present examples and % weight gain is determined according to methods as described in the present examples.

Chain-extended polythioether prepolymers can be liquid at room temperature such as at 25° C. and 100 kpa.

Chain-extended polythioether prepolymers provided by the present disclosure can comprise, for example, a hard segment content greater than 30 wt %, greater than 35 wt %, greater than 40 wt %, greater than 45 wt %, greater than 50 wt %, greater than 55 wt %, greater than 60 wt %, greater than 65 wt %, greater than 65 wt %, or greater than 70 wt %. Chain-extended polythioether prepolymers provided by the present disclosure can comprise a hard segment content, for example, from 30 wt % to 75 wt %, from 30 wt % to 70 wt %, or from 30 wt % to 60 wt %.

Chain-extended polythioether prepolymers can be terminated in a suitable functional group as appropriate for a particular curing chemistry. For example, chain-extended polythioether prepolymers can comprise terminal isocyanate groups, and the isocyanate-terminated chain-extended polythioether prepolymers can be reacted with a polyamine curing agent to provide cured polyurea coatings that exhibit low haze and meet the demanding performance requirements of aerospace coating applications. Chain-extended polythioether prepolymers can comprise terminal isocyanate groups, and the isocyanate-terminated chain-extended polythioether prepolymers can be reacted with a polyol curing agent to provide cured polyurethane coatings that exhibit low haze and meet the demanding performance requirements of aerospace coating applications. Chain-extended polythioether prepolymers can be terminated in other reactive groups such as hydroxyl groups, thiol groups, amine groups, epoxy groups, Michael acceptor groups, or other reactive group suitable for a particular curing chemistry. Such chain-extended polythioether prepolymers can be prepared, for example, by reacting an isocyanate-terminated prepolymer provided by the present disclosure with a compound having a group reactive with isocyanate groups and a desired reactive group.

A thiol-terminated polythioether can be reacted with a diisocyanate and a non-linear short chain diol to form an isocyanate-terminated chain-extended polythioether prepolymer of the present disclosure.

Isocyanate-terminated chain-extended polythioether prepolymers provided by the present disclosure can comprise, for example, from 25 wt % to 50 wt % of a moiety derived from thiol-terminated polythioether, from 30 wt % to 50 wt %, from 35 wt % to 50 wt %, or from 40 wt % to 50 wt % of a moiety derived from a thiol-terminated polythioether, where wt % is based on the total weight of the isocyanate-terminated chain-extended polythioether prepolymer.

More than one type of thiol-terminated polythioether can be used. A thiol-terminated polythioether can comprise a combination of thiol-terminated polythioethers having several different weight average molecular weights. A composition can comprise a mixture of thiol-terminated polythioethers having several different glass transition temperatures. A thiol-terminated polythioether can include a combination of different types of thiol-terminated.

Isocyanate-terminated chain-extended polythioether prepolymers provided by the present disclosure can also comprise, in addition to moieties derived from a non-linear short chain diol, moieties derived from a linear short chain diol, such as an aliphatic linear short chain diol or a combination of aliphatic linear short chain diols. Thus, reactants used to prepare an isocyanate-terminated chain-extended polythioether prepolymer can also comprise a linear short chain diol.

The reactants used to prepare an isocyanate-terminated chain-extended polythioether prepolymer provided by the present disclosure can further include a polyol polyfunctionalizing agent. A polyol polyfunctionalizing agent can have, for example, from 3 to 6 terminal hydroxyl groups. Suitable polyol polyfunctionalizing agents include any of those typically used in polyurethane formulations.

In isocyanate-terminated chain-extended polythioether prepolymers of Formula (13a) and Formula (13b), A can further be derived from a linear short chain diol.

In isocyanate-terminated chain-extended polythioether prepolymers of Formula (13a) and Formula (13b), from 5% to 50%, from 5% to 40%, from 10% to 30%, from 10% to 20%, or from 5% to 15% of the -A- groups can be derived from a short chain diol, which can comprise a combination of a non-linear short chain diol and a linear short chain diol. Thus, -A- can be derived from a thiol-terminated polythioether, a non-linear short chain diol, and a linear short chain diol. isocyanate-terminated chain-extended polythioether prepolymers of Formula (13a) and Formula (13b) at least one -A- is derived from a non-linear short chain diol.

Compositions provided by the present disclosure can include other additives such as, for example, UV stabilizers, thermal stabilizers, corrosion inhibitors, adhesion promoters, and combinations of any of the foregoing.

Compositions and sealants provided by the present disclosure can comprise an adhesion promoter or combination of adhesion promoters. Adhesion promoters can be included in a composition to increase the adhesion of the polymeric matrix to organic filler, inorganic filler, and to surfaces such as titanium composite surfaces, stainless steel surfaces, compositions, aluminum, and other coated and uncoated aerospace surfaces.

An adhesion promoter can include a phenolic adhesion promoter, a combination of phenolic adhesion promoters, an organo-functional silane, a combination of organo-functional silanes, hydrolyzed silanes, a combination of hydrolyzed silanes, or a combination of any of the foregoing. An organo-functional silane can be an amine-functional silane.

Compositions provided by the present disclosure can comprise an organo-functional silane, a phenolic adhesion promoter, and a hydrolyzed organo-functional silane. Examples of suitable adhesion promoters include phenolic resins such as Methylon® phenolic resin, organo-functional silanes, such as epoxy-, mercapto- or amine-functional silanes, such as Silquest® organo-functional silanes, and hydrolyzed silanes.

Compositions and sealants provided by the present disclosure can comprise a phenolic adhesion promoter, an organo-functional silane, or a combination thereof. A phenolic adhesion promoter can comprise a cooked phenolic resin, an un-cooked phenolic resin, or a combination thereof. Phenolic adhesion promoters can comprise the reaction product of a condensation reaction of a phenolic resin with one or more thiol-terminated polysulfides. Phenolic adhesion promoters can be thiol-terminated.

Examples of suitable cooked phenolic resins include T-3920 and T-3921, available from PPG Aerospace.

Examples of suitable phenolics that can be used to provide phenolic resins include 2-(hydroxymethyl)phenol, (4-hydroxy-1,3-phenylene)dimethanol, (2-hydroxybenzene-1,3,4-triyl) trimethanol, 2-benzyl-6-(hydorxymethyl)phenol, (4-hydroxy-5-((2-hydroxy-5-(hydroxymethyl)cyclohexa-2,4-dien-1-yl)methyl)-1,3-phenylene)dimethanol, (4-hydroxy-5-((2-hydroxy-3,5-bis(hydroxymethyl)cyclohexa-2,4-dien-1-yl)methyl)-1,3-phenylene)dimethanol, and a combination of any of the foregoing.

Suitable phenolic resins can be synthesized by the base-catalyzed reaction of phenol with formaldehyde.

Phenolic adhesion promoters can comprise the reaction product of a condensation reaction of a Methylon® resin, a Varcum® resin, or a Durez® resin, available from Durez Corporation, and/or a Bakelite® phenolic resin, with a thiol-terminated polysulfide such as a Thioplast® resin or a Thiokol® resin.

Examples of Methylon® resins include Methylon® 75108 (allyl ether of methylol phenol, see U.S. Pat. No. 3,517,082) and Methylon® 75202.

Examples of Varcum® resins include Varcum® 29101, Varcum® 29108, Varcum® 29112, Varcum® 29116, Varcum® 29008, Varcum® 29202, Varcum® 29401, Varcum® 29159, Varcum® 29181, Varcum® 92600, Varcum® 94635, Varcum® 94879, and Varcum® 94917.

An example of a Durez® resin is Durez® 34071. Bakelite® phenolic resins are available from Hexion.

Compositions provided by the present disclosure can comprise an organo-functional adhesion promoter such as an organo-functional silane. An organo-functional silane can comprise hydrolysable groups bonded to a silicon atom and at least one organo-functional group. An organo-functional silane can have the structure $R^a$—$(CH_2)_n$—$Si(—OR)_{3-n}R_n$, where $R^a$ comprises an organo-functional group, n is 0, 1, or 2, and R is alkyl such as methyl or ethyl. Examples of suitable organo-functional groups include epoxy, amino, methacryloxy, or sulfide groups. An organo-functional silane can be a dipodal organo-functional silane having two or more silane groups. An organo-functional silane can be a combination of a monosilane and a dipodal silane.

An amine-functional silane can comprise a primary amine-functional silane, a secondary amine-functional silane, or a combination thereof. A primary amine-functional silane refers to a silane having primary amino group. A secondary amine-functional silane refers to a silane having a secondary amine group.

A secondary amine-functional silane can be a sterically hindered amine-functional silane. In a sterically hindered amine-functional silane the secondary amine can be proximate a large group or moiety that limits or restricts the degrees of freedom of the secondary amine compared to the degrees of freedom for a non-sterically hindered secondary amine. For example, in a sterically hindered secondary amine, the secondary amine can be proximate a phenyl group, a cyclohexyl group, or a branched alkyl group.

Amine-functional silanes can be monomeric amine-functional silanes having a molecular weight, for example, from 100 Daltons to 1000 Daltons, from 100 Daltons to 800 Daltons, from 100 Daltons to 600 Daltons, or from 200 Daltons to 500 Daltons.

Examples of suitable primary amine-functional silanes include 4-aminobutyltriethoxysilane, 4-amino-3,3-dimethylbutyltrimethoxysilane, N-(2-aminoethyl)-3-aminopropyltriethoxysilane, 3-(m-aminophenoxy)propyltrimethoxysilane, m-aminophenyltrimethoxysilane, p-aminophenyltrimethoxysilane, 3-aminopropyltriethoxysilane, 3-aminopropyltrimethoxysilane, 3-aminopropyltris(methoxyethoxyethoxy)silane, 11-aminoundecyltriethoxysilane, 2-(4-pyridylethyl)triethoxysilane, 2-(2-pyridylethyl)trimethoxysilane, N-(3-trimethoxysilylpropyl)pyrrole, 3-aminopropylsilanetriol, 4-amino-3,3-dimethylbutylmethyldimethoxysilane, 3-aminopropylmethyldiethoxysilane, 1-amino-2-(dimethylethoxysilyl)propane, 3-aminopropyldiisopropylene ethoxysilane, and 3-aminopropyldimethylethoxysilane.

Examples of suitable diamine-functional silanes include (aminoethyl)(aminomethyl)phenethyltrimethoxysilane and N-(2-aminoethyl)-3-aminopropyltrimethoxysilane.

Examples of suitable secondary amine-functional silanes include 3-(N-allylamino)propyltrimethoxysilane, n-butylaminopropyltrimethoxysilane, tert-butylaminopropyltrimethoxysilane, (N,N-cylohexylaminomethyl)methyldiethoxysilane, (N-cyclohexylaminomethyl)triethoxysilane, (N-cyclohexylaminopropyl)trimethoxysilane, (3-(n-ethylamino)isobutyl)methyldiethoxysilane, (3-(N-ethylamino)isobutyl)trimethoxysilane, N-methylaminopropylmethyldimethoxysilane, N-methylaminopropyltrimethoxysilane, (phenylaminomethyl)methyldimethoxysilane, N-phenylaminomethyltriethoxysilane, and N-phenylaminopropyltrimethoxysilane.

Suitable amine-functional silanes are commercially available, for example, from Gelest Inc. and from Dow Corning Corporation.

Examples of suitable amino-functional silanes include Silquest® A-187, Silquest® A-1100, and Silquest® A-1110, available from Momentive Performance Materials.

Suitable adhesion promoters also include sulfur-containing adhesion promoters such as those disclosed in U.S. Pat. Nos. 8,513,339; 8,952,124; and 9,056,949; and U.S. Application Publication No. 2014/0051789, each of which is incorporated by reference in its entirety.

Examples of suitable phenolic adhesion promoters include T-3920 and T-3921, available from PPG Aerospace.

An example of a suitable hydrolyzed silanes include T-1601 available from PPG Aerospace.

Compositions and sealants provided by the present disclosure can comprise from 0.5 wt % to 4 wt %, from 0.5 wt % to 3.5 wt %, from 0.8 wt % to 3.2 wt %, from 1.0 wt % to 4.0 wt %, from 1.0 wt % to 3.0 wt %, from 1.5 wt % to 3.0 wt %, or from 1.7 wt % to 2.8 wt %, of an adhesion promoter or combination of adhesion promoters, where wt % is based on the total weight of the composition. For example, an adhesion promoter can comprise a combination of cooked phenolics, amino-functional silanes, and hydrolyzed silanes.

Compositions provided by the present disclosure can comprise an adhesion promoter comprising a phenolic adhesion promoter or combination of phenolic adhesion promoters, and an amine-functional silane or combination of amine-functional silanes.

An adhesion promoter can comprise, for example, from 70 wt % to 95 wt % of a phenolic adhesion promoter; and from 5 wt % to 30 wt % of an amine-functional silane, where wt % is based on the total weight of the adhesion promoter in a composition.

An adhesion promoter can comprise, for example, from 75 wt % to 92 wt % of a phenolic adhesion promoter, and from 8 wt % to 25 wt % of an organo-functional silane, where wt % is based on the total weight of the adhesion promoter in a composition.

Compositions provided by the present disclosure may comprise one or more additional components suitable for use in aerospace sealants and the selection can depend at least in part on the desired performance characteristics of the cured sealant under conditions of use. Compositions such as sealants provided by the present disclosure may further comprise one or more additives such as a plasticizer, a reactive diluent, a pigment, a solvent, or a combination of any of the foregoing.

Compositions provided by the present disclosure may be formulated as sealants. By formulated is meant that in addition to the reactive species forming the cured polymer network, additional material can be added to a composition to impart desired properties to the uncured sealant and/or to the cured sealant. For the uncured sealant these properties can include viscosity, pH, and/or rheology. For cured sealants, these properties can include weight, adhesion, corrosion resistance, color, glass transition temperature, electrical conductivity, cohesion, and/or physical properties such as tensile strength, elongation, and hardness. Compositions provided by the present disclosure may comprise one or more additional components suitable for use in aerospace sealants and depend at least in part on the desired performance characteristics of the cured sealant under conditions of use.

Compositions and curable sealants provided by the present disclosure can have a density equal to or less than 1.0 $g/cm^3$, equal to or less than 1.2 $g/cm^3$, equal to or less than 1.4 $g/cm^3$, or equal to or less than 1.65 $g/cm^3$, where density is determined according to ISO 2781.

Uncured sealants provided by the present disclosure can be provided as a two-part system comprising a first part and a second part which can be prepared and stored separately, combined, and mixed at the time of use.

Curable sealant systems of the present disclosure can be provided as two-part sealant compositions. The two-parts can be maintained separately and can be combined prior to use. A first part can comprise, for example, thiol-terminated polythioether prepolymers, organic filler, inorganic filler, adhesion promoter, catalyst, and other optional additives. A second part can comprise, for example, a polyepoxide curing agent, inorganic filler, adhesion promoter, plasticizer, and other optional additives. The optional additives can include plasticizers, pigments, solvents, reactive diluents, surfactants, thixotropic agents, fire retardants, and a combination of any of the foregoing.

Compositions, such as sealants, may be provided as multi-part compositions, such as two-part compositions, wherein one part comprises one or more thiol-terminated polythioether prepolymers and a second part comprises one or more polyepoxide curing agents. Additives and/or other materials may be added to either part as desired or necessary. The two parts may be combined and mixed prior to use.

The first part and the second part can be formulated to be rendered compatible when combined such that the constituents of the base and accelerator components can intermix and be homogeneously dispersed to provide a sealant or coating composition for application to a substrate. Factors affecting the compatibility of the first and second parts include, for example, viscosity, pH, density, and temperature.

A first part can comprise, for example, from 40 wt % to 80 wt % of a thiol-terminated sulfur-containing prepolymer, from 50 wt % to 70 wt %, or from 55 wt % to 65 wt %, of a thiol-terminated sulfur-containing prepolymer, where wt % is based on the total weight of the first part.

A first part can comprise from 10 wt % to 40 wt % of an organic filler, from 15 wt % to 35 wt %, from 20 wt % to 30 wt %, or from 22 wt % to 28 wt %, of an organic filler, where wt % is based on the total weight of the first part.

A first part can comprise from 5 wt % to 20 wt % of an inorganic filler, from 7 wt % to 18 wt %, or from 9 wt % to 16 wt % of an inorganic filler, where wt % is based on the total weight of the first part.

A first part can comprise, for example, from 40 wt % to 80 wt % of a thiol-terminated sulfur-containing prepolymer, from 10 wt % to 40 wt % of an organic filler, and from 5 wt % to 20 wt % of an inorganic filler, where wt % is based on the total weight of the first part.

A first part can comprise, for example, from 50 wt % to 70 wt % of a thiol-terminated sulfur-containing prepolymer, from 15 wt % to 35 wt % of an organic filler, and from 7 wt % to 18 wt % of an inorganic filler, where wt % is based on the total weight of the first part.

A first part can comprise, for example, from 55 wt % to 65 wt %, of a thiol-terminated sulfur-containing prepolymer, from 20 wt % to 30 wt % of an organic filler, and from 9 wt % to 16 wt % of an inorganic filler, where wt % is based on the total weight of the first part.

A second part can comprise, for example, from 30 wt % to 80 wt % of a polyepoxide, from 35 wt % to 80 wt %, or from 40 wt % to 80 wt %, where wt % is based on the total weight of the second part.

A second part can comprise, for example, from 5 wt % to 50 wt % of an inorganic filler, from 10 wt % to 50 wt %, or from 10 wt % to 45 wt % of an inorganic filler, where wt % is based on the total weight of the second part.

A second part can comprise, for example, from 1 wt % to 20 wt % of a plasticizer, from 5 wt % to 15 wt %, or from 7 wt % to 13 wt % of a plasticizer, where wt % is based on the total weight of the second part A second part can comprise, for example, from 30 wt % to 80 wt % of a polyepoxide, and from 5 wt % to 50 wt % of an inorganic filler, where wt % is based on the total weight of the second part.

A second part can comprise, for example, from 35 wt % to 80 wt % of a polyepoxide, and from 10 wt % to 50 wt % of an inorganic filler, where wt % is based on the total weight of the second part.

A second part can comprise, for example, from 40 wt % to 80 wt % of a polyepoxide, and from 15 wt % to 45 wt % of an inorganic filler, where wt % is based on the total weight of the second part.

The first part and second part can be combined a wt % ratio within a range, for example, from 100:10 to 100:25, within a range from 100:12 to 100:23, or within a range from 100:14 to 100:21.

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquids and gases. A coating can comprise a covering that is applied to the surface of a substrate to, for example, improve the properties of the substrate such as the appearance, adhesion, wettability, corrosion resistance, wear resistance, fuel resistance, and/or abrasion resistance. A sealant can be used to seal surfaces, smooth surfaces, fill gaps, seal joints, seal apertures, and other features. A potting composition can comprise a material useful in an electronic assembly to provide resistance to shock and vibration and to exclude moisture and corrosive agents. Sealant compositions provided by the present disclosure are useful, e.g., to seal parts on aerospace vehicles that can come into contact with phosphate ester hydraulic fluids such as Skydrol®.

Compositions and sealants provided by the present disclosure can be used with any suitable curing chemistry useful in aerospace coating and sealants. Compositions provided by the present disclosure include thiol-terminated sulfur-containing prepolymers cured with polyepoxides. These compositions comprise a high content of Skydrol®- and fuel-resistant organic filler in combination with inorganic filler. The incorporation of Skydrol®- and fuel-resistant organic filler into an aerospace coating or sealant is expected to impart improved Skydrol®- and fuel-resistance to the cured coating or sealant, regardless of the curing chemistry. For example, Skydrol®- and fuel-resistant organic filler can be used with Mn-cured polysulfides, and Michael acceptor cured thiol-terminated sulfur-containing prepolymers, and moisture-curable sulfur-containing prepolymers. Sulfur-containing prepolymers can be terminal-modified to include other reactive groups such as, for example, amine groups, hydroxyl groups, isocyanate groups, or polyalkoxysilyl groups. These terminal-modified sulfur-containing prepolymers can be used with polyurea, polyurethane, or moisture-curable chemistries in combination with Skydrol®- and fuel-resistant organic fillers to provide Skydrol®- and fuel-resistant coatings and sealants.

Curable compositions provided by the present disclosure can be used as aerospace sealants or coatings, and in particular, as sealants or coatings where resistance to hydraulic fluid is desired. A sealant refers to a curable composition that has the ability when cured to resist atmospheric conditions such as moisture and temperature and at least partially block the transmission of materials such as water, water vapor, fuel, solvents, and/or liquids and gases.

Compositions provided by the present disclosure may be applied directly onto the surface of a substrate or over an underlayer such as a primer by any suitable coating process. Compositions, including sealants, provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy; urethane; graphite; fiberglass composite; Kevlar®; acrylics; and polycarbonates. Compositions provided by the present disclosure may be applied to a substrate such as aluminum and aluminum alloy.

Furthermore, methods are provided for sealing an aperture utilizing a composition provided by the present disclosure. These methods comprise, for example, applying the curable composition to at least one surface of a part; and curing the applied composition to provide a sealed part.

Sealant compositions provided by the present disclosure may be formulated as Class A, Class B, or Class C sealants. A Class A sealant refers to a brushable sealant having a viscosity of 1 poise to 500 poise (0.1 Pa-sec to 50 Pa-sec and is designed for brush application. A Class B sealant refers to an extrudable sealant having a viscosity from 4,500 poise to 20,000 poise (450 Pa-sec to 2,000 Pa-sec) and is designed for application by extrusion via a pneumatic gun. A Class B sealant can be used to form fillets and sealing on vertical surfaces or edges where low slump/slag is required. A Class C sealant has a viscosity from 500 poise to 4,500 poise (50 pa-sec to 450 Pa-sec) and is designed for application by a roller or combed tooth spreader. A Class C sealant can be used for fay surface sealing. Viscosity can be measured according to Section 5.3 of SAE Aerospace Standard AS5127/1C published by SAE International Group.

Furthermore, methods are provided for sealing an aperture utilizing a composition provided by the present disclosure. These methods comprise, for example, providing the curable composition of the present disclosure; applying the curable composition to at least one surface of a part; and curing the applied composition to provide a sealed part.

A composition provided by the present disclosure may be cured under ambient conditions, where ambient conditions refers to a temperature from 20° C. to 25° C., and atmospheric humidity. A composition may be cured under conditions encompassing a temperature from a 0° C. to 100° C.

and humidity from 0% relative humidity to 100% relative humidity. A composition may be cured at a higher temperature such as at least 30° C., at least 40° C., or at least 50° C. A composition may be cured at room temperature, e.g., 25° C. The methods may be used to seal apertures on aerospace vehicles including aircraft and aerospace vehicles.

Apertures, surfaces, joints, fillets, fay surfaces including apertures, surfaces, fillets, joints, and fay surfaces of aerospace vehicles, sealed with compositions provided by the present disclosure are also disclosed. The compositions and sealants can also be used to seal fasteners.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within about 3 days to about 7 days following mixing and application to a surface at a temperature of 25° C. In general, full adhesion strength as well as other properties of cured compositions of the present disclosure become fully developed within 7 days at a temperature of 25° C. following mixing and application of a curable composition to a surface.

A cured composition can have a thickness, for example, from 5 mils to 25 mils (127 μm to 635 μm) such as from 10 mils to 20 mils (254 μm to 508 μm).

Prior to environmental exposure a cured sealant provided by the present disclosure can exhibit a density less than 1.2 g/cm$^3$ (specific gravity less than 1.2) as determined according to ISO 2781, a tensile strength greater than 1 MPa determined according to ISO 37, a tensile elongation greater than 150% determined according to ISO 37, and a hardness greater than Shore 40A determined according to ISO 868, where the tests are performed at a temperature within a range of 21° C. to 25° C., and a humidity from 45% RH to 55% RH.

Following exposure to aviation fuel (JRF Type 1) according to ISO 1817 for 168 hours at 60° C., a cured sealant provided by the present disclosure can exhibit a tensile strength greater than 1.4 MPa determined according to ISO 37, a tensile elongation greater than 150% determined according to ISO 37, and a hardness greater than Shore 30A determined according to ISO 868, where the tests are performed at a temperature within a range of 21° C. to 25° C., and a humidity from 45% RH to 55% RH.

Following exposure to 3% aqueous NaCl for 168 hours at 60° C., a cured sealant provided by the present disclosure can exhibit a tensile strength greater than 1.4 MPa determined according to ISO 37, a tensile elongation greater than 150% determined according to ISO 37, and a hardness greater than Shore 30A determined according to ISO 868, where the tests are performed at a temperature within a range of 21° C. to 25° C., and a humidity from 45% RH to 55% RH.

Following exposure to de-icing fluid according to ISO 11075 Type 1 for 168 hours at 60° C., a cured sealant provided by the present disclosure can exhibit a tensile strength greater than 1 MPa determined according to ISO 37, and a tensile elongation greater than 150% determined according to ISO 37, where the tests are performed at a temperature within a range of 21° C. to 25° C., and a humidity from 45% RH to 55% RH.

Following exposure to phosphate ester hydraulic fluid (Skydrol® LD-4) for 1,000 hours at 70° C., a cured sealant provided by the present disclosure can exhibit a tensile strength greater than 1 MPa determined according to ISO 37, a tensile elongation greater than 150% determined according to ISO 37, and a hardness greater than Shore 30A determined according to ISO 868, where the tests are performed at a temperature within a range of 21° C. to 25° C., and a humidity from 45% RH to 55% RH.

Apertures, surfaces, joints, fillets, fay surfaces including apertures, surfaces, fillets, joints, and fay surfaces of aerospace vehicles, sealed with compositions provided by the present disclosure are also disclosed. A composition provided by the present disclosure can be used to seal a part. A part can include multiple surfaces and joints. A part can include a portion of a larger part, assembly, or apparatus. A portion of a part can be sealed with a composition provided by the present disclosure or the entire part can be sealed.

Compositions provided by the present disclosure can be used to seal parts exposed or potentially exposed to fluids such as solvents, hydraulic fluids, and/or fuel.

Compositions provided by the present disclosure can be used to seal a part including a surface of a vehicle.

The term "vehicle" is used in its broadest sense and includes all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft.

A composition provided by the present disclosure can be used in a F/A-18 jet or related aircraft such as the F/A-18E Super Hornet and F/A-18F (produced by McDonnell Douglas/Boeing and Northrop); in the Boeing 787 Dreamliner, 737, 747, 717 passenger jet aircraft, an related aircraft (produced by Boeing Commercial Airplanes); in the V-22 Osprey; VH-92, S-92, and related aircraft (produced by NAVAIR and Sikorsky); in the G650, G600, G550, G500, G450, and related aircraft (produced by Gulfstream); and in the A350, A320, A330, and related aircraft (produced by Airbus). Compositions provided by the present disclosure can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

Compositions provided by the present disclosure can be used to seal parts and surfaces of vehicles such as fuel tank surfaces and other surfaces exposed to or potentially exposed to aerospace solvents, aerospace hydraulic fluids, and aerospace fuels.

The present invention includes parts sealed with a composition provided by the present disclosure, and assemblies and apparatus comprising a part sealed with a composition provided by the present disclosure.

The present invention includes vehicles comprising a part such as a surface sealed with a composition provided by the present disclosure. For example, an aircraft comprising a fuel tank or portion of a fuel tank sealed with a sealant provided by the present disclosure is included within the scope of the invention.

Compositions can be as coatings or sealants, and in particular sprayable coatings and sealants having a high filler content such as, for example, a filler content from 1 wt % to 90 wt % and/or a filler content from 1 vol % to 80 vol %. The coatings and sealants can be applied to any suitable surface including for example, surfaces of vehicles, architectural surfaces, consumer products, electronic products, marine equipment, and industrial equipment.

EXAMPLES

Embodiments provided by the present disclosure are further illustrated by reference to the following examples, which describe the compositions provided by the present disclosure and uses of such compositions. It will be apparent to those skilled in the art that many modifications, both to materials, and methods, may be practiced without departing from the scope of the disclosure.

Example 1

Synthesis of Thiol-Terminated Polythioether

A thiol-terminated polythioether was synthesized according to the method described in Example 1 of U.S. Pat. No. 6,172,179.

In a 2 L flask, 524.8 g (3.32 mol) of diethylene glycol divinyl ether (DEG-DVE) and 706.7 g (3.87 mol) of dimercaptodioxaoctane (DMDO) were mixed with 19.7 g (0.08 mol) of triallylcyanurate (TAC) and heated to 77° C. To the heated reaction mixture was added 4.6 g (0.024 mol) of an azobisnitrile free radical catalyst (Vazo® 67, 2,2'-azobis-2-methylbutyronitrile). The reaction proceeded substantially to completion after 2 h to afford 1,250 g (0.39 mol, yield 100%) of a liquid polythioether resin having a $T_g$ of −68° C. and a viscosity of 65 poise (6.5 Pa-sec). The resin was water white clear.

Example 2

Synthesis of Hydroxyl-Terminated Polythioether Prepolymer

A hydroxyl-terminated polythioether was synthesized according to the method described in Example 2 of U.S. Pat. No. 9,518,197.

A 1-L, 4-neck round-bottomed flask was fitted with a mantle, thermocouple, temperature controller, nitrogen line, mechanical stirrer and dropping funnel. The flask was charged with a thiol-terminated polythioether (1) (652.30 g) prepared according to Example 1. The flask was heated to 71° C. under nitrogen and stirred at 300 rpm. A mixture of 4-hydroxybutyl vinyl ether (47.40 g) and Vazo®-67 (1.19 g) was added to the flask in 1 h via a dropping funnel. The reaction mixture was maintained at 71° C. for 41 h, at which time the reaction was complete. After this, the reaction apparatus was then fitted with a vacuum line and the product heated to 94° C. Heating was continued for 1.3 hours under vacuum. Following vacuum treatment, a pale yellow, viscous polythioether polyol (678.80 g) was obtained. The polythioether polyol had a hydroxyl number of 31.8 using the potassium hydroxyl neutralization method, and a viscosity of 77 poise (7.7 Pa-sec), measured using a Brookfield CAP 2000 viscometer, spindle #6, at 25° C., and 300 rpm.

Example 3

Synthesis of Isocyanate-Terminated Chain-Extended Polythioether Prepolymer (3)

A 1-liter, 4-neck round bottom flask was fitted with a mantle, thermocouple, nitrogen line and mechanical stirrer. The flask was charged with a thiol-terminated polythioether (1) (345.13 g, 0.1077 mol) prepared according to Example 1. The flask was then charged with (14.0 g, 0.9875 mol) of 2-butyl-2-ethyl-1,3-propanediol (BEPD, Perstorp and KH NeoChem Inc.) followed by the addition of Desmodur® W ($H_{12}$MDI from Covestro) or Vestanat® $H_{12}$MDI (from Evonik Industries) (152.41 g, 0.58 mol) (300 mol % excess isocyanate to thiol and hydroxyl groups). The solvent content (methyl amyl ketone) at was about 18-20%. The reactor contents were stirred and heated to about 60° C. At 60° C. a trimerization catalyst, a solution of 50% N,N'-dimethylcyclohexylamine (DMCHA, Polycat® 8 from Evonik Industries, Jeffcat® from Huntsman, or Niax® Catalyst C-8 from Momentive) in methyl amyl ketone (0.08 g) was added and mixed for 60 minutes. The batch temperature was kept about 68-74° C. After one hour, a sample was taken from the batch and the isocyanate content determined by indirect titration. At this stage of the reaction about 20% to 25% of the diisocyanates were converted into trimers. The temperature of the batch was then increased to 85-90° C. and the reactor contents was mixed for another 150 min. At the end of this time period the isocyanate value remained unchanged.

The temperature of the batch was then decreased to about 74-75° C. and a solution of 50% dibutyltin dilaurate in methyl amyl ketone (0.03 g) (Sigma Aldrich) was added. The temperature of the reaction was maintained at 75-80° C. and mixed for about 100 min. The resulting $H_{12}$MDI-terminated chain-extended polythioether prepolymer had an isocyanate content/value of 5.0%, measured using indirect titration, and a viscosity of about 200 cps (0.2 Pa-sec) at room temperature (23-25° C.), measured using a Brookfield CAP 2000 viscometer, spindle #6, at 25° C., and 300 rpm.

Example 4

Synthesis of Isocyanate-Terminated Chain-Extended Polythioether Prepolymer (4)

Isocyanate-terminated polythioether prepolymer (4) was prepared as described in Example 3, except 2,4-diethyl-1,5-pentanediol (PD-9 from KH NeoChem Inc.) (Mw 160) was used instead of 2-butyl-2-ethyl-1,3-propanediol and the reaction time with a N,N-dimethylcyclohexanamine catalyst (DMCHA, Niax® Catalyst C-8, Momentive Performance Materials, Inc.) was 1 h.

The $H_{12}$MDI-terminated chain-extended polythioether prepolymer had an isocyanate content/value of 4.94% and a viscosity of about 250 cps at room temperature, determined according to indirect titration or measured using a Brookfield CAP 2000 viscometer, spindle #6, at 25° C., and 300 rpm, respectively.

Example 5

Synthesis of Isocyanate-Terminated Chain-Extended Polythioether Prepolymer (5)

Step A. Preparation of Hydroxyl-Terminated Polythioether (5a).

A hydroxyl-terminated polythioether was synthesized according to the method described in Example 2 of U.S. Pat. No. 9,518,197.

A 1-liter, 4-neck round-bottom flask was fitted with a mantle, thermocouple, nitrogen inlet, mechanical stirrer and dropping funnel. The flask was charged with the thiol-terminated polythioether (1) (652.30 g) prepared according to Example 1. The flask was heated to about 71° C. A mixture of 4-hydroxybutyl vinyl ether (47.40 g) and Vazo™ 67 (1.19 g) was added to the flask over a period of 1 h via a dropping funnel. The temperature of the reaction was maintained at 71° C. for 41 h, at which time the reaction was complete. The reaction apparatus was then fitted with a vacuum line and the reactor content was heated to about 94° C. Heating was continued for about 80 min under vacuum.

Following vacuum treatment, a pale-yellow, viscous polythioether polyol (678.80 g, 0.40 mol) was obtained. The polythioether polyol (5a) had a hydroxyl number of 35.88, determined using by the potassium hydroxyl neutralization method.

Step B. Preparation of Isocyanate-Terminated Polythioether Prepolymer (5).

The polythioether polyol (5a) (382.0 g) and Desmodur® W (H$_{12}$MDI from Covestro) or Vestanat® H$_{12}$MDI (from Evonik Industries) (131.47 g) were charged into a 1-L, 4-neck, round-bottom flask. The solvent content (methyl amyl ketone) was about 16.0%. The flask was equipped with a heating mantle, thermocouple, temperature controller, an inlet for providing positive nitrogen pressure and a mechanical stirrer. Under agitation, the reactor content was heated to about 60° C. and then a 50% solution of dibutyltin dilaurate in methyl amyl ketone (0.02 g) was added and the contents mixed for another 70 min.

The resulting H$_{12}$MDI-terminated chain-extended polythioether prepolymer (5) had a number average molecular weight of 8,500 Daltons, an isocyanate content/value of 4.98% measured using indirect titration, and a viscosity of about 250 cps (0.25 Pa-sec) at room temperature (23-25° C.), measured using a Brookfield CAP 2000 viscometer, spindle #6, at 25° C., and 300 rpm.

Example 6

Synthesis of Isocyanate-Terminated Polythioether Prepolymer (6)

The polythioether polyol (5a) of Example 5 (382.0 g, 0.22 mol), CAPA™ 4101 (5.20 g, 0.0052 mol) (tetrafunctional polycaprolactone polyol from Perstorp) and Desmodur® W (dicyclohexylmethane diisocyanate, H$_{12}$MDI from Covestro) or Vestanat® H$_{12}$MDI (from Evonik Industries) (135.69 g, 0.518 mol) were charged into a 1-L, 4-neck, round-bottom flask. The flask was equipped with a heating mantle, thermocouple, temperature controller, an inlet for providing nitrogen positive pressure and a mechanical stirrer. The solvent content (methyl amyl ketone) was about 16.0 wt % based on the total weight of the mixture. Under agitation, the reactor contents were heated to about 60° C. and a 50% solution of dibutyltin dilaurate in methyl amyl ketone (0.02 g) was added and the contents mixed for another 70 min.

The resulting H$_{12}$MDI-terminated polythioether prepolymer (6) had a number average molecular weight of about 8,500 Daltons, an isocyanate content/value of 4.99%, measured using indirect titration, and a viscosity of about 250 cps (0.25 Pa-sec) at room temperature (23-25° C.), measured using a Brookfield CAP 2000 viscometer, spindle #6, at 25° C., and 300 rpm.

Example 7

Synthesis of Isocyanate-Terminated Chain-Extended Polythioether Prepolymer (7)

A 1-L, 4-neck round bottom flask was fitted with a mantle, thermocouple, nitrogen line and mechanical stirrer. The flask was charged with a thiol-terminated polythioether (1) (345.13 g, 0.1077 mol) prepared according to Example 1. The flask was then charged with 28.0 g (0.175 mol) of 2,4-diethyl-1,5-pentanediol (PD-9 from KH NeoChem Inc.) and 151.28 g (0.58 mol) of Desmodur® W (H$_{12}$MDI from Covestro) or Vestanat® H$_{12}$MDI (from Evonik Industries). The solvent content (methyl amyl ketone) was about 18%-20%. The contents of the flask were stirred and heated to about 60° C. At 60° C., a 50% solution of N,N'-dimethylcyclohexylamine (DMCHA, from Huntsman) or Niax® Catalyst C-8 (from Momentive) in methyl amyl ketone (0.08 g) was added and mixed for 60 min. The batch temperature was maintained at about 68-74° C. After one hour, a 50% solution of dibutyltin dilaurate in methyl amyl ketone (0.03 g) was added and the contents mixed for another 150 min. The temperature of the batch was maintained about 85-90° C.

The resulting H$_{12}$MDI-terminated chain-extended polythioether prepolymer (7) had a number average molecular weight of about 8,500 Daltons, an isocyanate content/value of 3.21%, measured using indirect titration, and a viscosity of about 350 cps (0.35 Pa-sec) at room temperature (23-25° C.), measured using a Brookfield CAP 2000 viscometer, spindle #6, at 25° C., and 300 rpm.

Example 8

Sprayable Isocyanate-Terminated Polythioether Prepolymer Component

The of isocyanate-terminated chain-extended polythioether (3) (100 g) of Example 3 or the isocyanate-terminated chain-extended polythioether (4) of Example 4 was mixed with filler (207 g), methyl-n-amylketone (6.0 g) and a UV stabilization package (4.0 g). The composition was mixed at room temperature (23-25° C.) and stored under a nitrogen atmosphere.

Example 9

Sprayable Sealant

Methyl-n-amylketone (20.0 g, MAK), acetone (80.0 g), and a polyamine curing agent (13.27 g, 0.0477 mol, Vestamine® A-139, isophorone diamine isobutyraldiamine) were added to the compositions of Example 6. The composition was mixed for 5 min at room temperature (23-25° C.). After an induction time, the mixture was sprayed onto a substrate to a thickness of 40 mils to 60 mils (1.02 mm to 1.52 mm) and cured for 7 days at room temperature (23-25° C.).

The sprayable composition was a combination of three parts, which were combined and mixed prior to application. Part A included a blocked polyamine curing agent, Vestamine® A-139. Part B included the isocyanate-terminated chain-extended prepolymer, filler, solvent, and a UV stabilizer package in the amounts shown in Table 1.

TABLE 1

| Components of Part B | |
| --- | --- |
| Materials | Weight (%) |
| Isocyanate-terminated chain-extended polythioether prepolymer | 25.24 |
| Filler | 65.30 |
| Solvent | 8.20 |
| UV Package | 1.26 |
| Total | 100.00 |

Part C included solvent. The contents of the sprayable composition are provided in Table 2.

TABLE 2

| Sprayable composition. | | | |
| --- | --- | --- | --- |
| Component | Type | Weight (kg) | Weight (%) |
| Part B | Isocyanate-Terminated Chain Extended Polythioether Prepolymer | 25.24 | 18.6 |
| | Filler(s) | 65.30 | 48.1 |

TABLE 2-continued

Sprayable composition.

| Component | Type | Weight (kg) | Weight (%) |
|---|---|---|---|
|  | Solvent(s) | 8.20 | 6.0 |
|  | UV Package | 1.26 | 0.9 |
| Part C | Methyl-n-amylketone | 6.31 | 4.6 |
|  | Acetone | 25.23 | 18.6 |
| Part A | Amine Curative | 4.18 | 3.1 |
| Total |  | 135.72 | 100.0 |

Test samples were prepared by spraying multiple layers, such as from 20 to 30 layers, of the coating to build up a coating layer from 20 mils to 40 mils thick (0.51 mm to 1.02 mm). The solvent was allowed to evaporate at room temperature between each layer application. The coating was then cured for 7 days at 20° C. to 25° C.

Tensile strength and elongation measurements were performed according to ASTM method D412.4554. For aerospace coatings it is desirable that the tensile strength be at least 1,500 psi, and the elongation be, for example, greater than 75%, greater than 100%, or greater than 125%.

Example 10

Tensile Strength and % Elongation

Test samples were prepared according to the methods described in Example 9. Each sample included a different isocyanate-terminated chain-extended polythioether prepolymer, but otherwise the samples were similar.

The isocyanate-terminated chain-extended polythioether prepolymers are described in Table 3.

TABLE 3

Isocyanate-terminated chain-extended polythioether prepolymers.

|  | Prepolymer | | | | |
|---|---|---|---|---|---|
|  | A | B | C | D | E |
| Thiol-terminated Prepolymer, wt % | 50-65 | 50-65 | 50-65 | 0 | 0 |
| Hydroxyl-terminated Prepolymer, wt % | 0 | 0 | 0 | 50-65 | 50-65 |
| Hard Segment Content (diisocyanate and short-chain diol), wt % | 20-25 | 20-25 | 20-25 | 20-25 | 20-25 |
| NCO/(SH + OH) Equivalent Ratio | 2.0 | 2.9 | 4.0 | 4.1 | 3.9 |
| Trimerization Catalyst | + | + | + | − | − |
| NCO, wt % | 3.6 | 4.9 | 5.1 | 5.0 | 5.0 |
| Reaction Catalyst | + | + | − | + | + |
| Cross-linker, wt % | 0 | 0 | 0 | 0 | 0.8 |
| NCO Equivalent Weight | 1,000-1,300 | 800-900 | 800-900 | 800-900 | 800-900 |
| Non-linear Diol, wt % | 4.3 | 2.2 | 0 | 0 | 0 |

The amount, in terms of wt %, of thiol-terminated/hydroxyl-terminated prepolymer, the hard segment components comprising the diisocyanate and short-chain diol, non-linear diol, and cross-linker used to synthesize the isocyanate-terminated chain-extended polythioether prepolymers are shown in Table 3, where wt % is based on the total weight of the reactants. Prepolymers A-B were prepared using a two-step reaction in which a trimer catalyst was used to form diisocyanate trimers. Then, for prepolymers A and B a reaction catalyst was used to synthesize the prepolymer, and for prepolymer C, the trimerization catalyst was used to catalyze the synthesis of the prepolymer at elevated temperature (70° C. to 80° C.). Prepolymers D and E did not contain a diisocyanate trimer, but prepolymer E was prepared using a tetrafunctional polyol crosslinker (CAPA® 4101).

The NCO/(SH+OH) equivalents ratio represents the ratio of the number of equivalents of isocyanate group to the number of equivalents of thiol groups and hydroxyl groups in the composition prior to reaction. The hydroxyl groups can be provided by the short-chain diol and/or the hydroxyl-terminated polythioether.

The NCO, wt %, represents the wt % of isocyanate groups free to react in the second step, if used.

The tensile strength and % elongation for cured coatings prepared using prepolymers A-E is shown in Tables 4 and 5. The filled coatings had a filler content from 50 wt % to 70 wt % (filled), based on the total weight of the composition. It is desirable that the tensile strength be greater than 1,500 psi and the % elongation be greater than 75%, and preferably greater than 100%.

TABLE 4

Tensile strength and % elongation of filled coatings.

| | Prepolymer | | | | | | | | | |
|---|---|---|---|---|---|---|---|---|---|---|
| | A | | B | | C | | D | | E | |
| | Loading | | | | | | | | | |
| | Filled | | Filled | | Filled | | Filled | | Filled | |
| | TS[1] (psi) | E %[2] | TS (psi) | E % | TS (psi) | E % | TS (psi) | E % | TS (psi) | E % |
| Mean | 1398 | 123 | 2033 | 240 | 1885 | 195 | 1234 | 197 | 1452 | 218 |
| SD[3] | 82 | 14 | 25 | 11 | 37 | 22 | 32 | 8 | 17 | 23 |

[1]Tensile strength determined according to ASTM method D412.4554.
[2]% Elongation determined according to ASTM method D412.4554.
[3]Standard deviation.

TABLE 5

Tensile strength and % elongation of un-filled coatings.

| | Prepolymer | | | | | |
|---|---|---|---|---|---|---|
| | C | | D | | E | |
| | Loading | | | | | |
| | Un-filled | | Un-filled | | Un-filled | |
| | TS (psi) | E % | TS (psi) | E % | TS (psi) | E % |
| Mean | 2733 | 325 | 2277 | 623 | 2392 | 538 |
| SD | 118 | 17 | 139 | 21 | 142 | 18 |

Example 11

Solvent Resistance

The curable composition of Example 9 was spray-coated onto test panels to a total thickness from 40 mils to 60 mils (1.02 mm to 1.52 mm). Layers of coating are sprayed onto as substrate at a thickness of about 5 mils (0.127 mm) with a flash off time of between about 7 min and 10 min. The coatings were fully cured at room temperature (21° C. to 25° C.) for 7 days.

After the coatings were fully cured the samples were immersed in various aerospace fluids for 7 days at 60° C. The volume and mass of the coatings were measured before and after immersion in the aerospace fluids. The results are presented in Table 6.

Volume Swell and weight gain measurements were performed by weighing a 2-inch x 1-inch cured sample before immersion in air and while suspended in water. The samples were placed into various aerospace fluids for 7 days at 140° F. (60° C.), and tested both in air and while suspended in water to determine weight gain and volume swell of the samples. The results are provided in Table 6.

JP-8 is a kerosene-based military aviation jet fuel.

MIL-PRF-23699 Lube Oil gas turbine lubricant

Skydrol® is a fire-resistant hydraulic fluid based on phosphate ester chemistry. Skydrol® fluids include Skydrol® 500B-4, Skydrol® LD-4, Skydrol® 5, and Skydrol® PE-5 are commercially available from Eastman Chemical Company.

For an aerospace coating, both the % volume swell and % weight gain should be no greater than 7.5%, and preferably less than 5%.

Example 12

Properties of Comparative Coatings Prepared Using Isocyanate-Terminated Polyurethane/Polyester Prepolymers and Isocyanate-Terminated Polycarbonate Prepolymers Polyurea coatings prepared using isocyanate-terminated polyurethane/polyester prepolymers and isocyanate-terminated polycarbonate prepolymers incorporating polyurethane segments and non-linear short chain diols were prepared according to Examples 1, 3, and 5 of U.S. application Ser. No. 15/384,346, filed on Dec. 20, 2016, which is incorporated by reference in its entirety.

For example, an isocyanate-terminated polyurethane/polyester prepolymer was prepared as follows. A polyester diol (405.08 g, Priplast® XL-101) with a weight average molecular weight of 2,000 was charged in a pre-warmed kettle. Methyl amyl ketone was added and mixed at a temperature from 50° C. to 60° C. (122° F. to 140° F.). A non-linear short chain diol with pendent methyl and/or ethyl groups (4.26 g, 2,4-diethyl-1,5-pentanediol), a polyol with a functionality of four (4) (5 wt %, CAPA™ 4101, having a molecular weight of 1,000, Perstorp) and a diisocyanate (190.0 g, $H_{12}$MDI, Desmodur® W) were sequentially added and mixed. The temperature was decreased to 50° C. (122° F.) and additional diisocyanate was added. With the mixture at 50° C. a dibutyl tin dilaurate catalyst was added and the temperature maintained at 70° C. for 90 min to 120 min. The NCO value of the product was determined by back-titration to be from 3.5% to 4.2% or from 6% to 7%. The volatile organic content (VOC) was less than 180 g/L.

For example, an isocyanate-terminated polycarbonate prepolymer was prepared as follows. Polycarbonate diol (Desmophen® C 3200, 235 g; 0.248 equivalent), tetra-functional polyol (13.39 g; 0.0535 eq.; a CAPA® 4101), a non-linear short chain diol (2,4-diethyl-1,5-pentanediol; 20.6 g; 0.2575 eq), and $H_{12}$MDI (174.52 g; Desmodur® W) were charged into a round bottom kettle. Under agitation, solvent (15 wt %) was added, and the mixture heated to 60° C. Di-butyl tin dilaurate catalyst was added and the reactants mixed at a temperature from 65° C. and 70° C. for 90 min to 120 min. The final NCO content was between 6% to 7%.

To prepare a polyurea coating the polyurethane/polyester prepolymer was combined with a blocked, moisture sensitive amine (Vestamin® A 139, aldimine based on isobutyl aldehyde and isophorone diamine, Evonik Industries). The curable composition was sprayed onto the surface of a substrate at different thicknesses. The coatings cured within

TABLE 6

Solvent resistance: weight gain (ΔM (%)) and volume swell (ΔV (%)).

| | | ΔM (%) | | | ΔV (%) | | |
|---|---|---|---|---|---|---|---|
| Prepolymer | Filler | JP-8 Jet Fuel | MIL-PRF-23699 Lube Oil | Skydrol® LD-4 Hydraulic Fluid | JP-8 Jet Fuel | MIL-PRF-23699 Lube Oil | Skydrol® LD-4 Hydraulic Fluid |
| A | no | 4.9 | 4.6 | — | 6.5 | 4.7 | — |
| A | yes | 3.0 | 2.2 | 1.1 | 6.1 | 4.7 | 2.2 |
| B | yes | 2.0 | 1.4 | 1.4 | 5.5 | 3.7 | 3.3 |
| C | yes | 1.9 | 0.9 | 1.1 | 5.7 | 4.0 | 2.5 |
| D | yes | 2.4 | 2.2 | 1.4 | 6.1 | 4.9 | 3.3 |

5 days to 7 days at room temperature. The cured films were visually clear and flexible. The equivalent ratio of isocyanate to amine is typically from 1 to 0.8 or from 1 to 0.6.

The volume swell and weight gain of coatings prepared using these sealants was determined according to the method described in Example 11, and the results are present in Table 7. The filled coating had a filler content of 65 wt %.

TABLE 7

Solvent resistance of polyurea coatings prepared using polyester- and polycarbonate-based prepolymers: weight gain (ΔM (%)) and volume swell (ΔV (%)).

| Prepolymer | Filler | ΔM (%) | | | ΔV (%) | | |
|---|---|---|---|---|---|---|---|
| | | JP-8 Jet Fuel | MIL-PRF-23699 Lube Oil | Skydrol ® LD-4 Hydraulic Fluid | JP-8 Jet Fuel | MIL-PRF-23699 Lube Oil | Skydrol ® LD-4 Hydraulic Fluid |
| Polyester, 2.2 wt % Cross-linker | no | 17.88 | 36.87 | 0.06 | 23.61 | 39.68 | 0.81 |
| Polyester, 2.2 wt % Cross-linker | yes | 5.61 | 14.39 | 0.44 | 17.54 | 38.01 | 0.49 |
| Polyester, 3.0 wt % Cross-linker | no | 18.85 | 36.22 | 1.10 | 24.11 | 38.44 | 0.92 |
| Polycarbonate-based | no | 10.82 | 19.19 | 0.10 | 14.65 | 21.02 | −0.19 |

Polyurea coatings prepared using the isocyanate-terminated chain-extended polythioether prepolymers provided by the present disclosure exhibit a significantly improved solvent resistance as reflected in the weight gain and volume swell compared to polyurea coatings prepared using isocyanate-terminated polyurethane/polyester prepolymers and isocyanate-terminated polycarbonate prepolymers incorporating polyurethane segments and non-linear short chain diols.

ASPECTS OF THE INVENTION

Aspect 1. An isocyanate-terminated chain-extended polythioether prepolymer comprising reaction products of reactants, wherein the reactants comprise: a thiol-terminated polythioether, a hydroxyl-terminated polythioether, or a combination thereof; a diisocyanate; a diisocyanate trimer; and a non-linear short chain diol.

Aspect 2. The prepolymer of aspect 1, wherein the thiol-terminated polythioether, the hydroxyl-terminated polythioether, or both the thiol-terminated polythioether and the hydroxyl-terminated polythioether comprise a moiety having the structure of Formula (2):

$$-S-R^1-[S-A-S-R^1-]_n-S- \quad (2)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$;
p is an integer from 2 to 6;
q is an integer from 1 to 5;
r is an integer from 2 to 10;
each $R^3$ is independently selected from hydrogen and methyl; and
each X is independently selected from O, S, S—S, and NR, wherein R is selected from hydrogen and methyl; and
each A is independently a moiety derived from a polyvinyl ether of Formula (3) and a moiety derived from a polyalkenyl polyfunctionalizing agent of Formula (4):

$$CH_2=CH-O-(R^2-O)_m-CH=CH_2 \quad (3)$$

$$B^2(-R^{20}-CH=CH_2)_z \quad (4)$$

wherein,
m is an integer from 0 to 50;
each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$; and
$B^2$ represents a core of a z-valent, polyalkenyl polyfunctionalizing agent $B^2(-R^{20}-CH=CH_2)_z$ wherein,
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

Aspect 3. The prepolymer of any one of aspects 1 to 2, wherein each A is independently selected from a moiety of Formula (3a) and a moiety of Formula (4a):

$$-(CH_2)_2-O-(R^2-O)_m-(CH_2)_2- \quad (3a)$$

$$B^2\{-R^{20}-(CH_2)_2-\}_2\{-R^{20}-(CH_2)_2-S-[-R^1-S-A-S-]_{n1}-R^1-S-\}_{z-2} \quad (4a)$$

wherein n1 is an integer from 0 to 60.

Aspect 4. The prepolymer of any one of aspects 1 to 3, wherein the thiol-terminated polythioether comprises a thiol-terminated polythioether of Formula (2a):

$$HS-R^1-[S-A-S-R^1-]_n-SH \quad (2a)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$;
p is an integer from 2 to 6;
q is an integer from 1 to 5;
r is an integer from 2 to 10;
each $R^3$ is independently selected from hydrogen and methyl; and
each X is independently selected from O, S, S—S, and NR, wherein R is selected from hydrogen and methyl; and
each A is independently a moiety derived from a polyvinyl ether of Formula (3) or a moiety derived from a polyalkenyl polyfunctionalizing agent of Formula (4):

$$CH_2=CH-O-(R^2-O)_m-CH=CH_2 \quad (3)$$

$$B^2(-R^{20}-CH=CH_2)_z \quad (4)$$

wherein,
each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;
m is an integer from 0 to 50; and
$B^2$ represents a core of a z-valent, polyalkenyl polyfunctionalizing agent $B^2(-R^{20}-CH=CH_2)_z$;
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

Aspect 5. The prepolymer of any one of aspects 1 to 4, wherein the thiol-terminated polythioether comprises reaction products of reactants, wherein the reactants comprise: a dithiol; and a divinyl ether, a polyalkenyl polyfunctionalizing agent, or a combination of a divinyl ether and a polyalkenyl polyfunctionalizing agent.

Aspect 6. The prepolymer of aspect 5, wherein the dithiol comprises a dithiol of Formula (5):

$$HS-R^1-SH \quad (5)$$

wherein,
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[(CHR^3)_p-X-]_q(CHR^3)_r-$; wherein,
each $R^3$ is independently selected from hydrogen and methyl;
each X is independently selected from O, S, S—S, and NR wherein R is selected from hydrogen and methyl;
p is an integer from 2 to 6;
q is an integer from 1 to 5; and
r is an integer from 2 to 10.

Aspect 7. The prepolymer of any one of aspects 5 to 6, wherein the divinyl ether comprises a divinyl ether of Formula (3):

$$CH_2=CH-O-(R^2-O-)_mCH=CH_2 \quad (3)$$

wherein,
each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined above; and
m is an integer from 0 to 50.

Aspect 8. The prepolymer of any one of aspects 5 to 7, wherein the polyalkenyl polyfunctionalizing agent comprises a polyalkenyl polyfunctionalizing agent of Formula (4):

$$B2(-R^{20}-CH=CH_2)_z \quad (4)$$

wherein,
$B^2$ comprises a core of the z-valent polyfunctionalizing agent $B^2(-R^{20}-CH=CH_2)_z$;
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

Aspect 9. The prepolymer of aspect 2, wherein,
each $R^1$ is $-(CH_2)_2-O-(CH_2)_2-O-(CH_2)_2-$;
each $R^2$ is $-(CH_2)_2-$;
m is an integer from 1 to 4; and the polyfunctionalizing agent $B^2(-R^{20}-CH=CH_2)_z$ comprises triallyl cyanurate.

Aspect 10. The prepolymer of any one of aspects 1 to 9, wherein the hydroxyl-terminated polythioether comprises a hydroxyl-terminated polythioether of Formula (2b):

$$HO-R^{10}-S-R^1-[S-A-S-R^1-]_n-S-R^{10}-OH \quad (2b)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$;
p is an integer from 2 to 6;
q is an integer from 1 to 5;
r is an integer from 2 to 10;
each $R^3$ is independently selected from hydrogen and methyl; and
each X is independently selected from O, S, S—S, and NR, wherein R is selected from hydrogen and methyl; and
each A is independently a moiety derived from a polyvinyl ether of Formula (3) or a moiety derived from a polyalkenyl polyfunctionalizing agent of Formula (4):

$$CH_2=CH-O-(R^2-O)_m-CH=CH_2 \quad (3)$$

$$B^2(-R^{20}-CH=CH_2)_z \quad (4)$$

wherein,
each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;
m is an integer from 0 to 50;
$B^2$ represents a core of a z-valent, polyalkenyl polyfunctionalizing agent $B^2(-R^{20}-CH=CH_2)_z$;
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and
$R^{10}$ is a moiety derived from the reaction of a compound comprising a hydroxyl group and a group reactive with a thiol group.

Aspect 11. The prepolymer of aspect 10, wherein each A is independently selected from a moiety of Formula (3a) and a moiety Formula (4a):

$$-(CH_2)_2-O-(R^2-O)_m-(CH_2)_2- \quad (3a)$$

$$B^2\{-R^{20}-(CH_2)_2-\}_2\{-R^{20}-(CH_2)_2-S-[-R^1-S-A-S-]_{n1}-R^1-S-R^{10}-OH\}_{z-2} \quad (4a)$$

wherein n1 in an integer from 0 to 60.

Aspect 12. The prepolymer of any one of aspects 10 to 11, wherein the compound comprising a hydroxyl group and a group reactive with a thiol group has the structure of Formula (6):

$$R^{60}-R^{70}-OH \quad (6)$$

wherein,
$R^{60}$ is selected from an alkenyl, epoxy, isocyanate, and a Michael acceptor group; and
$R^{70}$ is selected from $C_{2-20}$ alkanediyl, $C_{2-20}$ heteroalkanediyl, substituted $C_{2-20}$ alkanediyl, and substituted $C_{2-20}$ heteroalkanediyl.

Aspect 13. The prepolymer of any one of aspects 10 to 12, wherein each $-R^{10}-OH$ is a moiety of Formula (6a):

$$-R^{60a}-R^{70}-OH \quad (6a)$$

wherein R$^{60a}$ is selected from —(CH$_2$)$_2$—, —CH$_2$—C(OH)—, —O—C(O)—NH—, and a residue of a Michael acceptor.

Aspect 14. The prepolymer of any one of aspects 10 to 13, wherein the compound having a hydroxyl group and a group reactive with a thiol group comprises a hydroxyl-functional vinyl ether.

Aspect 15. The prepolymer of any one of aspects 10 to 14, wherein the compound having a hydroxyl group and a group reactive with a thiol group comprises a hydroxyl-functional vinyl ether of Formula (7):

CH$_2$=CH—O—[C(R$^5$)$_2$]$_t$—OH  (7)

wherein,
t is an integer from 2 to 10; and
each R$^5$ is independently selected from hydrogen and C$_{1-6}$ alkyl.

Aspect 16. The prepolymer of any one of aspects 10 to 15, wherein each —R$^{10}$—OH is independently a moiety of Formula (7a):

—(CH$_2$)$_2$—O—[C(R$^5$)$_2$]$_t$—OH  (7a)

wherein,
t is an integer from 2 to 10; and
each R$^5$ is independently selected from hydrogen and C$_{1-6}$ alkyl.

Aspect 17. The prepolymer of any one of aspects 1 to 16, wherein the hydroxyl-terminated polythioether comprises reaction products of reactants comprising:
(a) a thiol-terminated polythioether of Formula (2a):

HS—R$^1$—[S-A-S—R$^1$—]$_n$—SH  (2a)

wherein,
n is an integer from 1 to 60;
each R$^1$ is independently selected from C$_{2-10}$ alkanediyl, C$_{6-8}$ cycloalkanediyl, C$_{6-14}$ alkanecycloalkanediyl, C$_{5-8}$ heterocycloalkanediyl, and —[(CHR$^3$)$_p$—X—]$_q$(CHR$^3$)$_r$—;
p is an integer from 2 to 6;
q is an integer from 1 to 5;
r is an integer from 2 to 10;
each R$^3$ is independently selected from hydrogen and methyl;
each X is independently selected from O, S, S—S, and NR, wherein R is selected from hydrogen and methyl; and
each A is independently a moiety derived from a polyvinyl ether of Formula (3) or a moiety derived from a polyalkenyl polyfunctionalizing agent of Formula (4):

CH$_2$=CH—O—(R$^2$—O)$_m$—CH=CH$_2$  (3)

B$^2$(—R$^{20}$—CH=CH$_2$)$_z$  (4)

wherein,
each R$^2$ is independently selected from C$_{1-10}$ alkanediyl, C$_{6-8}$ cycloalkanediyl, C$_{6-14}$ alkanecycloalkanediyl, and —[(CHR$^3$)$_p$—X—]$_q$(CHR$^3$)$_r$—, wherein p, q, r, R$^3$, and X are as defined as for R$^1$;
m is an integer from 0 to 50;
B$^2$ represents a core of a z-valent, polyalkenyl polyfunctionalizing agent B$^2$(—R$^{20}$—CH=CH$_2$)$_z$;
z is an integer from 3 to 6; and
each R$^{20}$ is independently selected from C$_{1-10}$ alkanediyl, C$_{1-10}$ heteroalkanediyl, substituted C$_{1-10}$ alkanediyl, and substituted C$_{1-10}$ heteroalkanediyl; and (b) a compound having a hydroxyl group and a group reactive with a thiol group.

Aspect 18. The prepolymer of aspect 17, wherein,
each R$^1$ is —(CH$_2$)$_2$—O—(CH$_2$)$_2$—O—(CH$_2$)$_2$—;
each R$^2$ is —(CH$_2$)$_2$—;
m is an integer from 1 to 4;
the polyfunctionalizing agent B$^2$(—R$^{20}$—CH=CH$_2$)$_z$ comprises triallyl cyanurate; and
the compound having a hydroxyl group and a group reactive with a thiol group comprises hydroxyl-butyl vinyl ether.

Aspect 19. The prepolymer of any one of aspects 1 to 18, wherein the thiol-terminated polythioether and the hydroxyl-terminated polythioether are characterized by: a number average molecular weight within a range from 1,000 Daltons to 8,000 Daltons as determined by gel permeation chromatography using a polystyrene standard; a viscosity within a range from 20 poise to 200 poise (2 Pa-sec to 20 Pa-sec) as measured using a Brookfield CAP 2000 viscometer, spindle #6, at 25° C. and 300 rpm; an average thiol functionality or an average hydroxyl functionality within a range from 2.1 to 2.8; and a mercaptan number or a hydroxyl number within a range from 20 to 50 as determined by iodine titration, as determined by potassium hydroxyl neutralization, or as determined using a Brookfield CAP 2000 viscometer, spindle #6, at 25° C., and 300 rpm, respectively.

Aspect 20. The prepolymer of any one of aspects 1 to 19, wherein the diisocyanate comprises a diisocyanate having the structure of Formula (8):

O=C=N—R$^4$—N=C=O  (8)

wherein R$^4$ is selected from C$_{1-10}$ alkane-diyl, C$_{5-8}$ cycloalkanediyl, C$_{6-10}$ arene-diyl, C$_{6-18}$ alkanecycloalkane-diyl, C$_{7-18}$ alkanearene-diyl, C$_{1-10}$ heteroalkane-diyl, C$_{5-8}$ heterocycloalkane-diyl, C$_{6-10}$ heteroarene-diyl, C$_{6-18}$ heteroalkanecycloalkane-diyl, C$_{7-18}$ heteroalkanearene-diyl, substituted C$_{1-10}$ alkane-diyl, substituted C$_{5-8}$ cycloalkane-diyl, substituted C$_{6-10}$ arene-diyl, substituted C$_{6-18}$ alkanecycloalkane-diyl, substituted C$_{7-18}$ alkanearene-diyl, substituted C$_{1-10}$ heteroalkane-diyl, substituted C$_{5-8}$ heterocycloalkanediyl, and substituted C$_{6-10}$ heteroarene-diyl.

Aspect 21. The prepolymer of any one of aspects 1 to 20, wherein the diisocyanate comprises an aliphatic diisocyanate.

Aspect 22. The prepolymer of any one of aspects 1 to 21, wherein the diisocyanate comprises isophorone diisocyanate, a hexamethylene diisocyanate, diphenylmethane diisocyanate, toluene diisocyanate, dicyclohexylmethane-4,4'-diisocyanate, or a combination of any of the foregoing;

Aspect 23. The prepolymer of any one of aspects 1 to 22, wherein the diisocyanate comprises dicyclohexylmethane-4,4'-diisocyanate.

Aspect 24. The prepolymer of any one of aspects 1 to 23, wherein the non-linear short chain diol comprises: a branched short-chain diol; a cyclic diol; or a combination thereof.

Aspect 25. The prepolymer of any one of aspects 1 to 24, wherein the non-linear short-chain diol comprises a branched short-chain diol.

Aspect 26. The prepolymer of aspect 25, wherein the branched short-chain diol comprises a branched short-chain diol of Formula (10):

HO—[C(R$^5$)$_2$—]$_s$—OH  (10)

wherein, s is an integer from 1 to 10;

each $R^5$ is independently selected from hydrogen and $C_{1-6}$ alkyl; and at least one $R^5$ is $C_{1-6}$ alkyl.

Aspect 27. The prepolymer of any one of aspects 25 to 26, wherein the branched short-chain diol comprises 2-butyl-2-ethyl-1,3-propanediol, 2,4-diethyl-1,5-pentanediol, or a combination thereof.

Aspect 28. The prepolymer of any one of aspects 1 to 27, wherein the non-linear short-chain diol comprises a cyclic diol.

Aspect 29. The prepolymer of aspect 28, wherein the cyclic diol comprises a cyclic diol of Formula (11):

$$HO—R^6—OH \quad (11)$$

wherein $R^6$ is selected from $C_{5-10}$ cycloalkanediyl, $C_{6-18}$ alkanecycloalkanediyl, $C_{5-10}$ heterocycloalkanediyl, $C_{6-18}$ heteroalkanecycloalkanediyl, substituted $C_{5-10}$ cycloalkanediyl, substituted $C_{6-18}$ alkanecycloalkanediyl, substituted $C_{5-10}$ heterocycloalkanediyl, and substituted $C_{6-18}$ heteroalkanecycloalkanediyl.

Aspect 30. The prepolymer of any one of aspects 1 to 29, wherein the non-linear short-chain diol has a number average molecular weight less than 500 Daltons as determined by gel permeation chromatography using a polystyrene standard.

Aspect 31. The prepolymer of any one of aspects 1 to 30, wherein the reactants further comprise a linear short-chain diol.

Aspect 32. The prepolymer of aspect 31, wherein the linear short-chain diol comprises a linear short-chain diol of Formula (12):

$$HO—R^7—OH \quad (12)$$

wherein $R^7$ is selected from $C_{1-10}$ n-alkanediyl and $C_{1-10}$ n-heteroalkanediyl.

Aspect 33. The prepolymer of any one of aspects 1 to 32, wherein the reactants further comprise a polyol polyfunctionalizing agent having a hydroxyl functionality from 3 to 6.

Aspect 34. The prepolymer of aspect 33, wherein the polyol polyfunctionalizing agent comprises a polyol polyfunctionalizing of Formula (14):

$$B^5\{—R^{50}—OH\}_z \quad (14)$$

wherein, z is an integer from 3 to 6;

each $R^{50}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and $B^5$ is a core of the polyfunctionalizing agent.

Aspect 35. The prepolymer of any one of aspects 1 to 34, wherein the reactants further comprise a polythiol polyfunctionalizing agent having a thiol functionality from 3 to 6.

Aspect 36. The prepolymer of aspect 35, wherein the polythiol polyfunctionalizing agent comprises a polythiol polyfunctionalizing agent of Formula (13):

$$B^4\{—R^{40}—SH\}_z \quad (13)$$

wherein, z is an integer from 3 to 6;

each $R^{40}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and B is a core of the polyfunctionalizing agent.

Aspect 37. The prepolymer of any one of aspects 1 to 36, wherein the diisocyanate trimer comprises a co-reaction product of a diisocyanate.

Aspect 38. The prepolymer of any one of aspects 1 to 37, wherein the diisocyanate trimer comprises a co-reaction product of the diisocyanate, wherein the diisocyanate has the structure of Formula (8):

$$O=C=N—R^4—N=C=O \quad (8)$$

wherein $R^4$ is selected from $C_{1-10}$ alkane-diyl, $C_{5-8}$ cycloalkane-diyl, $C_{6-10}$ arenediyl, $C_{6-18}$ alkanecycloalkane-diyl, $C_{7-18}$ alkanearene-diyl, $C_{1-10}$ heteroalkane-diyl, $C_{5-8}$ heterocycloalkane-diyl, $C_{6-10}$ heteroarene-diyl, $C_{6-18}$ heteroalkanecycloalkane-diyl, $C_{7-18}$ heteroalkanearene-diyl, substituted $C_{1-10}$ alkane-diyl, substituted $C_{5-8}$ cycloalkane-diyl, substituted $C_{6-10}$ arene-diyl, substituted $C_{6-18}$ alkanecycloalkane-diyl, substituted $C_{7-18}$ alkanearene-diyl, substituted $C_{1-10}$ heteroalkane-diyl, substituted $C_{5-8}$ heterocycloalkane-diyl, and substituted $C_{6-10}$ heteroarene-diyl.

Aspect 39. The prepolymer of any one of aspects 1 to 38, wherein the diisocyanate trimer comprises a diisocyanate trimer having the structure of Formula (9):

$$B^3\{—R^4—N=C=O\}_3 \quad (9)$$

wherein, each $R^4$ is independently selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ heteroalkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl; and $B^3$ is a core of the diisocyanate trimer.

Aspect 40. The prepolymer of any one of aspects 1 to 39, wherein the diisocyanate trimer comprises a diisocyanate trimer of Formula (9a):

(9a)

[Isocyanurate structure with three $R^4$-NCO groups attached to a triazine-trione core]

wherein each $R^4$ is independently selected from $C_{1-10}$ alkane-diyl, $C_{5-8}$ cycloalkanediyl, $C_{6-10}$ arene-diyl, $C_{6-18}$ alkanecycloalkane-diyl, $C_{7-18}$ alkanearene-diyl, $C_{1-10}$ heteroalkane-diyl, $C_{5-8}$ heterocycloalkanediyl, $C_{6-10}$ heteroarene-diyl, $C_{6-18}$ heteroalkanecycloalkane-diyl, $C_{7-18}$ hetero alkanearene-diyl, substituted $C_{1-10}$ alkane-diyl, substituted $C_{5-8}$ cycloalkanediyl, substituted $C_6$-10 arene-diyl, substituted $C_{6-18}$ alkanecycloalkane-diyl, substituted $C_{7-18}$ alkanearene-diyl, substituted $C_{1-10}$ heteroalkane-diyl, substituted $C_{5-8}$ heterocycloalkanediyl, and substituted $C_{6-10}$ heteroarenediyl.

Aspect 41. The prepolymer of aspect 40, wherein each $R^4$ is di(4-yl-cyclohexyl)methane.

Aspect 42. The prepolymer of any one of aspects 40 to 41, wherein each $R^4$ is independently selected from $C_{13-18}$ alkanecycloalkane-diyl.

Aspect 43. The prepolymer of any one of aspects 1 to 42, wherein the diisocyanate trimer comprises a trimer of a diisocyanate selected from isophorone diisocyanate, hexamethylene diisocyanate, diphenylmethane diisocyanate, toluene diisocyanate, dicyclohexylmethane-4,4'-diisocyanate, or a combination of any of the foregoing;

Aspect 44. The prepolymer of any one of aspects 1 to 43, wherein the diisocyanate trimer comprises a trimer of dicyclohexylmethane-4,4'-diisocyanate.

Aspect 45. The prepolymer of any one of aspects 1 to 44, wherein, the diisocyanate comprises an isophorone diisocyanate, hexamethylene diisocyanate, diphenylmethane diisocyanate, toluene diisocyanate, 4,4-dicyclohexylmethane diisocyanate, or a combination of any of the foregoing; and the diisocyanate trimer comprises isophorone diisocyanate trimer, a hexamethylene diisocyanate trimer, a diphenylmethane diisocyanate trimer, a toluene diisocyanate trimer, a 4,4-dicyclohexylmethane diisocyanate trimer, or a combination of any of the foregoing.

Aspect 46. The prepolymer of any one of aspects 1 to 45, wherein the reactants further comprise a polythiol polyfunctionalizing agent, a polyhydroxyl polyfunctionalizing agent, a linear short-chain diol, or a combination of any of the foregoing.

Aspect 47. The prepolymer of aspect 46, wherein the polythiol polyfunctionalizing agent comprises a polythiol polyfunctionalizing agent of Formula (13):

$$B^4\{-R^{40}-SH\}_z \quad (13)$$

wherein,
$B^4$ represents a core of a z-valent, polythiol polyfunctionalizing agent $B^4\{-R^{40}-SH\}_z$ wherein,
z is an integer from 3 to 6; and
each $R^{40}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

Aspect 48. The prepolymer of any one of aspects 46 to 47, wherein the polyol polyfunctionalizing agent comprises a polyol polyfunctionalizing agent of Formula (14):

$$B^5\{-R^{50}-OH\}_z \quad (14)$$

wherein,
$B^5$ represents a core of a z-valent, polyol polyfunctionalizing agent $B^5\{-R^{50}-OH\}_z$ wherein,
z is an integer from 3 to 6; and
each $R^{50}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

Aspect 49. The prepolymer of any one of aspects 46 to 48, wherein the linear short-chain diol comprises a linear short-chain diol of Formula (12):

$$HO-R^7-OH \quad (12)$$

wherein $R^7$ is selected from $C_{1-10}$ n-alkanediyl and $C_{1-10}$ n-heteroalkanediyl.

Aspect 50. The prepolymer of any one of aspects 1 to 49, wherein the prepolymer has a number average molecular weight within a range from 2,000 Daltons to 24,000 Daltons as determined by gel permeation chromatography using a polystyrene standard.

Aspect 51. The prepolymer of any one of aspects 1 to 50, wherein the prepolymer has an isocyanate content within a range from 2 mol % to 8 mol % as determined by indirect titration.

Aspect 52. The prepolymer of any one of aspects 1 to 51, wherein the prepolymer has an isocyanate content greater than 3% as determined by indirect titration.

Aspect 53. The prepolymer of any one of aspects 1 to 52, wherein the prepolymer has a viscosity within a range from 100 cps to 600 cps, as measured using a Brookfield CAP 2000 viscometer, spindle #6, at 25° C., and 300 rpm.

Aspect 54. An isocyanate-terminated chain-extended polythioether prepolymer comprising a moiety of Formula (15):

$$-[-E-C(O)-NH-D-NH-C(O)-]_n- \quad (15)$$

wherein,
n is an integer from 1 to 60;
each E is independently selected from (i), (ii), and (iii), wherein,
(i) is a moiety derived from a non-linear short-chain diol;
(ii) is a moiety derived from a thiol-terminated polythioether; and
(iii) is a moiety derived from a hydroxyl-terminated polythioether; and
each D is independently selected from a moiety derived from a diisocyanate and a moiety derived from a diisocyanate trimer,
wherein the prepolymer comprises:
at least one moiety of Formula (15) in which E is selected from (i); and at least one moiety of Formula (15) in which E is selected from (ii); or
at least one moiety of Formula (15) in which E is selected from (i); and at least one moiety of Formula (15) in which E is selected from (iii).

Aspect 55. The prepolymer of aspect 54, wherein greater than 2 wt % of the E moieties are derived from the non-linear short-chain diol.

Aspect 56. The prepolymer of any one of aspects 54 to 55, wherein the non-linear short-chain diol has the structure of Formula (10) and the moiety derived from the non-linear short-chain diol has the structure of Formula (10a):

$$HO-[C(R^5)_2-]_s-OH \quad (10)$$

$$-O-[C(R^5)_2-]_s-O- \quad (10a)$$

wherein,
s is an integer from 1 to 10;
each $R^5$ is independently selected from hydrogen and $C_{1-6}$ alkyl; and
at least one $R^5$ is $C_{1-6}$ alkyl.

Aspect 57. The prepolymer of any one of aspects 54 to 56, wherein the thiol-terminated polythioether has the structure of Formula (2a) and the moiety derived from the thiol-terminated polythioether has the structure of Formula (2):

$$HS-R^1-[S-A-S-R^1-]_n-SH \quad (2a)$$

$$-S-R^1-[S-A-S-R^1-]_n-S- \quad (2)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$;
p is an integer from 2 to 6;
q is an integer from 1 to 5;
r is an integer from 2 to 10;
each $R^3$ is independently selected from hydrogen and methyl; and each X is independently selected from O, S, S—S, and NR, wherein R is selected from hydrogen and methyl; and each A is independently a moiety derived from a polyvinyl ether of Formula (3) or a moiety derived from a polyalkenyl polyfunctionalizing agent of Formula (4):

$$CH_2=CH-O-(R^2-O)_m-CH=CH_2 \qquad (3)$$

$$B^2(-R^{20}-CH=CH_2)_z \qquad (4)$$

wherein, m is an integer from 0 to 50;

each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;

$B^2$ represents a core of a z-valent, polyalkenyl polyfunctionalizing agent $B^2(-R^{20}-CH=CH_2)_z$ wherein, z is an integer from 3 to 6; and each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and each A is independently derived from a polyalkenyl.

Aspect 58. The prepolymer of aspect 57, wherein the polyalkenyl is selected from a divinyl ether of Formula (3), a polyalkenyl polyfunctionalizing agent of Formula (4), or a combination thereof:

$$CH_2=CH-O-(R^2-O)_m-CH=CH_2 \qquad (3)$$

$$B(-R^{70}-CH=CH_2)_z \qquad (4)$$

wherein, each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;

m is an integer from 0 to 50; and $B^2$ represents a core of a z-valent, polyalkenyl polyfunctionalizing agent $B^2(-R^{20}-CH=CH_2)_z$;

z is an integer from 3 to 6; and each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

Aspect 59. The prepolymer of any one of aspects 57 to 58, wherein each A is independently selected from a moiety of Formula (3a) and a moiety of Formula (4a):

$$-(CH_2)_2-O-(R^2-O)_m-(CH_2)_2- \qquad (3a)$$

$$B^2\{-R^{20}-(CH_2)_2-\}_2\{-R^{20}-(CH_2)_2-S-[-R^1-S-A-S-]_{n1}-R^1-S-\}_{z-2} \qquad (4a)$$

wherein, each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;

m is an integer from 0 to 50; and each n1 is independently selected from an integer from 0 to 60;

B2 represents a core of a z-valent, polyalkenyl polyfunctionalizing agent $B^2(-R^{20}-CH=CH_2)_z$;

z is an integer from 3 to 6; and each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

Aspect 60. The prepolymer of any one of aspects 57 to 59, wherein the hydroxyl-terminated polythioether has the structure of Formula (2b) and the moiety derived from the hydroxyl-terminated polythioether has the structure of Formula (2c):

$$OH-R^{10}-S-R^1-[S-A-S-R^1-]_n-S-R^{10}-OH \qquad (2b)$$

$$-O-R^{10}-S-R^1-[S-A-S-R^1-]_n-S-R^{10}-O- \qquad (2c)$$

wherein, n is an integer from 1 to 60;

each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$;

p is an integer from 2 to 6;

q is an integer from 1 to 5;

r is an integer from 2 to 10;

each $R^3$ is independently selected from hydrogen and methyl; and each X is independently selected from O, S, S—S, and NR, wherein R is selected from hydrogen and methyl;

each A is independently a moiety derived from a polyvinyl ether or a moiety derived from a polyalkenyl polyfunctionalizing agent; and each $R^{10}$ is independently a moiety derived from the reaction of a compound comprising a hydroxyl group and a group reactive with a thiol group.

Aspect 61. The prepolymer of aspect 60, wherein the polyvinyl ether comprises a polyvinyl ether of Formula (3) and the polyalkenyl polyfunctionalizing agent comprises a polyalkenyl polyfunctionalizing agent of Formula (4):

$$CH_2=CH-O-(R^2-O)_m-CH=CH_2 \qquad (3)$$

$$B^2(-R^{20}-CH=CH_2)_z \qquad (4)$$

wherein, each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;

m is an integer from 0 to 50;

$B^2$ represents a core of a z-valent, polyalkenyl polyfunctionalizing agent $B^2(-R^{20}-CH=CH_2)_z$ wherein, z is an integer from 3 to 6; and each $R^{70}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

Aspect 62. The prepolymer of any one of aspects 60 to 61, wherein each A is independently selected from a moiety of Formula (3a) and a moiety of Formula (4a):

$$-(CH_2)_2-O-(R^2-O)_m-(CH_2)_2- \qquad (3a)$$

$$B^2\{-R^{20}-(CH_2)_2-\}_2\{-R^{20}-(CH_2)_2-S-[-R^1-S-A-S-]_{n1}-R^1-S-\}_{z-2} \qquad (4a)$$

wherein, each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^B)_r-$, wherein p, q, r, $R^3$, and X are as defined as for $R^1$;

m is an integer from 0 to 50; and each n1 is independently selected from an integer from 0 to 60;

$B^2$ represents a core of a z-valent, polyalkenyl polyfunctionalizing agent $B^2(-R^{20}-CH=CH_2)_z$;

z is an integer from 3 to 6; and each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

Aspect 63. The prepolymer of any one of aspects 60 to 62, wherein the compound comprising a hydroxyl group and a group reactive with a thiol group comprises a compound having the structure of Formula (6):

$$R^{60}-R^{70}-OH \quad (6)$$

wherein, $R^{60}$ is selected from an alkenyl, epoxy, isocyanate, and a Michael acceptor group;

$R^{70}$ is selected from $C_{2-20}$ alkanediyl, $C_{2-20}$ heteroalkanediyl, substituted $C_{2-20}$ alkanediyl, and substituted $C_{2-20}$ heteroalkanediyl.

Aspect 64. The prepolymer of any one of aspects 60 to 63, wherein $-R^{10}-OH$ has the structure of Formula (6a):

$$-R^{60a}-R^{70}-OH \quad (6a)$$

wherein, $R^{60a}$ is selected from $-(CH_2)_2-$, $-CH_2-C(OH)-$, $-O-C(O)-NH-$, and residue of a Michael acceptor; and $R^{70}$ is selected from $C_{2-20}$ alkanediyl, $C_{2-20}$ heteroalkanediyl, substituted $C_{2-20}$ alkanediyl, and substituted $C_{2-20}$ heteroalkanediyl.

Aspect 65. The prepolymer of any one of aspects 60 to 64, wherein the compound comprising a hydroxyl group and a group reactive with a thiol group comprises a hydroxyl-functional vinyl ether of Formula (7):

$$CH_2=CH-O-[C(R^5)_2]_t-OH \quad (7)$$

wherein, t is an integer from 2 to 10; and each $R^5$ is independently selected from hydrogen and $C_{1-6}$ alkyl.

Aspect 66. The prepolymer of any one of aspects 60 to 65, wherein each $-R^{10}-OH$ independently has the structure of Formula (7a):

$$-(CH_2)_2-O-[C(R^5)_2]_t-OH \quad (7a)$$

wherein, t is an integer from 2 to 10; and each $R^5$ is independently selected from hydrogen and $C_{1-6}$ alkyl.

Aspect 67. The prepolymer of any one of aspects 54 to 66, wherein the diisocyanate has the structure of Formula (8) and the moiety derived from the diisocyanate has the structure of Formula (8a):

$$O=C=N-R^4-N=C=O \quad (8)$$

$$-R^4- \quad (8a)$$

wherein, each $R^4$ is selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ heteroalkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl.

Aspect 68. The prepolymer of any one of aspects 54 to 67, wherein the diisocyanate trimer comprises a diisocyanate trimer of Formula (9) and the moiety derived from the diisocyanate trimer comprises a moiety of Formula (9a):

$$B^3\{-R^4-N=C=O\}_3 \quad (9)$$

$$B^3\{-R^4-NH-C(O)-\}_2\{-R^4-R^{41}\} \quad (9a)$$

wherein, $R^{41}$ is selected from a moiety of Formula (17) and a moiety of Formula (18):

$$-N=C=O \quad (17)$$

$$-NH-C(O)-[-E-C(O)-NH-D-NH-C(O)-]_{n1}-E-C(O)-NH-D-N=C=O \quad (18)$$

each n1 is independently selected from an integer from 0 to 20;

$B^3$ represents a core of a tri-valent, diisocyanate trimer $B^3\{-R^4-N=C=O\}_3$, wherein, each $R^4$ can independently be selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ hetero alkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl; and each E and D are defined as for Formula (15).

Aspect 69. The prepolymer of any one of aspects 54 to 68, wherein the diisocyanate trimer comprises a diisocyanate trimer of Formula (16b):

(16b)

wherein, each $R^4$ is independently selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ hetero alkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl.

Aspect 70. The prepolymer of any one of aspects 54 to 69, wherein the moiety derived from a diisocyanate trimer comprises a moiety of Formula (16c):

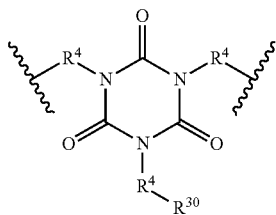

(16c)

wherein,
each $R^4$ is independently selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ heteroalkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl; and
$R^{30}$ is selected from a moiety of Formula (17) and a moiety of Formula (18):

—N=C=O  (17)

—NH—C(O)-[-E-C(O)—NH-D-NH—C(O)—]$_{n1}$-E-C(O)—NH-D-N=C=O  (18)

wherein E, D, and n1 are defined as for Formula (1).

Aspect 71. The prepolymer of any one of aspects 54 to 70, wherein each E is further independently selected from (iv) a moiety derived from a polyol polyfunctionalizing agent.

Aspect 72. The prepolymer of aspect 71, wherein the polyol polyfunctionalizing agent comprises a polyol polyfunctionalizing agent of Formula (24), and the moiety derived from a polyol polyfunctionalizing agent has the structure of Formula (14a):

$B^5\{$—$R^{50}$—OH$\}_z$  (14)

$B^5\{$—$R^{50}$—O-$\}_2\{$—$R^{50}$—O—[—C(O)—NH-D-NH—C(O)-E-]$_{n1}$-C(O)—NH-D-N=C=O$\}_{z-2}$  (14a)

wherein,
each n1 is independently selected from an integer from 0 to 60;
$B^5$ represents a core of a z-valent, polyol polyfunctionalizing agent $B^5\{$—$R^{50}$—OH$\}_z$;
z is an integer from 3 to 6; and
each $R^{50}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and
E and D are defined as for Formula (15).

Aspect 73. The prepolymer of any one of aspects 54 to 72, wherein each E is further independently selected from (v) a moiety derived from a polythiol polyfunctionalizing agent.

Aspect 74. The prepolymer of aspect 73, wherein the polythiol polyfunctionalizing agent comprises a polythiol polyfunctionalizing agent of Formula (9), and the moiety derived from the polythiol polyfunctionalizing agent has the structure of Formula (9a):

$B^4\{$—$R^{40}$—SH$\}_z$  (9)

$B^4\{$—$R^{40}$—S-$\}_2\{$—$R^{40}$—S—[—C(O)—NH-D-NH—C(O)-E-]$_{n1}$-C(O)—NH-D-N=C=O$\}_{z-2}$  (9a)

wherein,
each n1 is independently selected from an integer from 0 to 60;
$B^4$ represents a core of a z-valent, polythiol polyfunctionalizing agent $B^4\{$—$R^{40}$—SH$\}_z$;
z is an integer from 3 to 6; and
each $R^{40}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and
E and D are defined as for Formula (15).

Aspect 75. The prepolymer of any one of aspects 54 to 74, wherein each E is further independently selected from (vi) a moiety derived from a linear short-chain diol.

Aspect 76. The prepolymer of aspect 75, wherein the linear short-chain diol comprises a linear short-chain diol of Formula (12), and the moiety derived from a linear short-chain diol has the structure of Formula (12a):

HO—$R^7$—OH  (12)

—O—$R^7$—O—  (12a)

wherein $R^7$ is selected from $C_{1-10}$ n-alkanediyl and $C_{1-10}$ n-heteroalkanediyl.

Aspect 77. An isocyanate-terminated chain-extended polythioether prepolymer comprising a prepolymer having the structure of Formula (19):

O=C=N-D-NH—C(O)-[-E-C(O)—NH-D-NH—C(O)—]$_n$-E-C(O)—NH-D-N=C=O  (19)

wherein,
n is an integer from 1 to 60;
each E is independently selected from (i); (ii), and (iii), wherein,
(i) is a moiety derived from a non-linear short-chain diol;
(ii) is a moiety derived from a thiol-terminated polythioether; and
(iii) is a moiety derived from a hydroxyl-terminated polythioether; and
each D is independently selected from a moiety derived from a diisocyanate and a moiety derived from a diisocyanate trimer,
wherein the prepolymer comprises:
at least one E is selected from (i); and at least one E is selected from (ii); or
at least one E is selected from (i); and at least one E is selected from (iii).

Aspect 78. The prepolymer of aspect 77, wherein the non-linear short-chain diol has the structure of Formula (10), and the moiety derived from the non-linear short-chain diol has the structure of Formula (10a):

HO—[C($R^5$)$_2$—]$_s$—OH  (10)

—O—[C($R^5$)$_2$—]$_s$—O—  (10a)

wherein,
s is an integer from 1 to 10;
each $R^5$ is independently selected from hydrogen and $C_{1-6}$ alkyl; and
at least one $R^5$ is $C_{1-6}$ alkyl.

Aspect 79. The prepolymer of any one of aspects 77 to 78, wherein the thiol-terminated polythioether has the structure of Formula (2a), and the moiety derived from the thiol-terminated polythioether has the structure of Formula (2):

HS—$R^1$—[S-A-S—$R^1$—]$_n$—SH  (2a)

—S—$R^1$—[S-A-S—$R^1$—]$_n$—S—  (2)

wherein, n is an integer from 1 to 60;

each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(CHR^3)_p—X—]_q(CHR^3)_r—$;

p is an integer from 2 to 6;

q is an integer from 1 to 5;

r is an integer from 2 to 10;

each $R^3$ is independently selected from hydrogen and methyl; and each X is independently selected from O, S, S—S, and NR, wherein R is selected from hydrogen and methyl; and each A is independently a moiety derived from a polyvinyl ether of Formula (3) or a moiety derived from a polyalkenyl polyfunctionalizing agent of Formula (4):

$$CH_2=CH—O—(R^2—O)_m—CH=CH_2 \qquad (3)$$

$$B^2(—R^{20}—CH=CH_2)_z \qquad (4)$$

wherein, each $R^2$ is independently selected from $C_{1-10}$ alkanediyl, $C_{6-8}$ cycloalkanediyl, $C_{6-14}$ alkanecycloalkanediyl, and $—[(CHR^3)_p—X—]_q(CHR^3)_r—$, wherein p, q, r, $R^3$, and X are as defined for $R^1$;

m is an integer from 0 to 50;

$B^2$ represents a core of a z-valent, polyalkenyl polyfunctionalizing agent $B^2(—R^{20}—CH=CH_2)_z$;

z is an integer from 3 to 6; and each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

Aspect 80. The prepolymer of any one of aspects 77 to 79, wherein the hydroxyl-terminated polythioether has the structure of Formula (2b), and the moiety derived from the hydroxyl-terminated polythioether has the structure of Formula (2c):

$$HO—R^{10}—S—R^1—[S-A-S—R^1]_n—S—R^{10}—OH \qquad (2b)$$

$$—O—R^{10}—S—R^1—[S-A-S—R^1]_n—S—R^{10}—O— \qquad (2c)$$

wherein, n is an integer from 1 to 60;

each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(CHR^3)_p—X—]_q(CHR^3)_r—$;

p is an integer from 2 to 6;

q is an integer from 1 to 5;

r is an integer from 2 to 10;

each $R^3$ is independently selected from hydrogen and methyl; and each X is independently selected from O, S, S—S, and NR, wherein R is selected from hydrogen and methyl; and each A is independently a moiety derived from a polyvinyl ether of Formula (3) or a moiety derived from a polyalkenyl polyfunctionalizing agent of Formula (4):

$$CH_2=CH—O—(R^2—O)_m—CH=CH_2 \qquad (3)$$

$$B^2(—R^{20}—CH=CH_2)_z \qquad (4)$$

wherein, each $R^2$ is independently selected from $C_{1-10}$ alkanediyl, $C_{6-8}$ cycloalkanediyl, $C_{6-14}$ alkanecycloalkanediyl, and $—[(CHR^3)_p—X—]_q(CH-R^3)_r—$, wherein p, q, r, $R^3$, and X are as defined for $R^1$;

m is an integer from 0 to 50; and $B^2$ represents a core of a z-valent, polyalkenyl polyfunctionalizing agent $B^2(—R^{20}—CH=CH_2)_z$ wherein, z is an integer from 3 to 6; and each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and $R^{10}$ is a moiety derived from the reaction of a compound comprising a hydroxyl group and a group reactive with a thiol group.

Aspect 81. The prepolymer of any one of aspects 77 to 80, wherein the diisocyanate has the structure of Formula (8), and the moiety derived from the diisocyanate has the structure of Formula (8a):

$$O=C=N—R^4—N=C=O \qquad (8)$$

$$—R^4— \qquad (8a)$$

wherein $R^4$ is selected from $C_{1-10}$ alkane-diyl, $C_{5-8}$ cycloalkanediyl, $C_{6-10}$ arene-diyl, $C_{6-18}$ alkanecycloalkane-diyl, $C_{7-18}$ alkanearene-diyl, $C_{1-10}$ heteroalkane-diyl, $C_{5-8}$ heterocycloalkanediyl, $C_{6-10}$ heteroarene-diyl, $C_{6-18}$ heteroalkanecycloalkane-diyl, $C_{7-18}$ heteroalkanearene-diyl, substituted $C_{1-10}$ alkane-diyl, substituted $C_{5-8}$ cycloalkanediyl, substituted $C_{6-10}$ arene-diyl, substituted $C_{6-18}$ alkanecycloalkane-diyl, substituted $C_{7-18}$ alkanearene-diyl, substituted $C_{1-10}$ heteroalkane-diyl, substituted $C_{5-8}$ heterocycloalkanediyl, and substituted $C_{6-10}$ heteroarenediyl.

Aspect 82. The prepolymer of any one of aspects 77 to 81, wherein the diisocyanate trimer has the structure of Formula (9), and the moiety derived from the diisocyanate trimer has the structure of Formula (9a):

$$B^3\{—R^4—N=C=O\}_3 \qquad (9)$$

$$B^3\{—R^4—NH—C(O)—\}_2\{—R^4—R^{41}\} \qquad (9a)$$

wherein, $R^{41}$ is selected from a moiety of Formula (17) and a moiety of Formula (18):

$$—N=C=O \qquad (17)$$

$$—NH—C(O)\text{-}[\text{-E-C(O)}—NH\text{-D-NH}—C(O)—]_{n1}\text{-E-}C(O)—NH\text{-D-N}=C=O \qquad (18)$$

each n1 is independently selected from an integer from 0 to 20;

$B^3$ represents a core of a tri-valent, diisocyanate trimer $B^3\{—R^4—N=C=O\}_3$, wherein, each $R^4$ is independently selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ hetero alkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl; and each E and D are defined as for Formula (15).

Aspect 83. The prepolymer of any one of aspects 77 to 82, wherein each E is further independently selected from (iv) a moiety derived from a polyol polyfunctionalizing agent.

Aspect 84. The prepolymer of aspect 83, wherein the polyol polyfunctionalizing agent has the structure of Formula (14), and the moiety derived from the polyol polyfunctionalizing agent has the structure of Formula (14a):

$$B^5\{-R^{50}-OH\}_z \qquad (14)$$

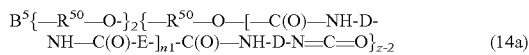

$$B^5\{-R^{50}-O-\}_2\{-R^{50}-O-[-C(O)-NH-D-NH-C(O)-E-]_{n1}-C(O)-NH-D-N=C=O\}_{z-2} \qquad (14a)$$

wherein,
each n1 is independently selected from an integer from 0 to 60;
$B^5$ represents a core of a z-valent, polyol polyfunctionalizing agent $B^5 \{-R^{50}-OH\}_z$ wherein,
z is an integer from 3 to 6;
each $R^{50}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and
E and D are defined as for Formula (15).

Aspect 85. The prepolymer of any one of aspects 77 to 84, wherein each E is further independently selected from (v) a moiety derived from a polythiol polyfunctionalizing agent.

Aspect 86. The prepolymer of aspect 85, wherein the polythiol polyfunctionalizing agent has the structure of Formula (9), and the moiety derived from the polythiol polyfunctionalizing agent has the structure of Formula (9a):

$$B^4\{-R^{40}-SH\}_z \qquad (9)$$

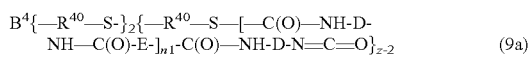

$$B^4\{-R^{40}-S-\}_2\{-R^{40}-S-[-C(O)-NH-D-NH-C(O)-E-]_{n1}-C(O)-NH-D-N=C=O\}_{z-2} \qquad (9a)$$

wherein,
each n1 is independently selected from an integer from 0 to 60;
$B^4$ represents a core of a z-valent, polythiol polyfunctionalizing agent $B^4\{-R^{40}-SH\}_z$ wherein,
z is an integer from 3 to 6;
each $R^{40}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and
E and D are defined as for Formula (15).

Aspect 87. The prepolymer of any one of aspects 77 to 86, wherein each E is further independently selected from (vi) a moiety derived from a linear short-chain diol.

Aspect 88. The prepolymer of claim 87, wherein the linear short-chain diol has the structure of Formula (12), and the moiety derived from the linear short-chain diol has the structure of Formula (12a):

$$HO-R^7-OH \qquad (12)$$

$$-O-R^7-O- \qquad (12a)$$

wherein $R^7$ is selected from $C_{1-10}$ n-alkanediyl and $C_{1-10}$ n-heteroalkanediyl.

Aspect 89. The prepolymer of any one of aspects 1 to 89, wherein the isocyanate-terminated chain-extended polythioether prepolymer has a viscosity within a range from 100 cps to 600 cps, wherein the viscosity is measured using a Brookfield CAP 2000 viscometer, spindle #6, at 25° C., and 300 rpm.

Aspect 90. A method of making an isocyanate-terminated chain-extended polythioether prepolymer, comprising:
(a) combining:
a polythioether, wherein the polythioether comprises a thiol-terminated polythioether, a hydroxyl-terminated polythioether, or a combination thereof;
a diisocyanate;
a non-linear short-chain diol; and
a diisocyanate trimerization catalyst to provide a first mixture;
(b) reacting the first mixture to provide a second mixture, wherein the second mixture comprises a diisocyanate trimer, the polythioether, the diisocyanate, and the non-linear short-chain diol;
(c) adding a cross-linking catalyst to the second mixture; and
(d) reacting the second mixture to provide an isocyanate-terminated chain-extended polythioether prepolymer.

Aspect 91. The method of aspect 90, wherein, the thiol-terminated polythioether comprises the thiol-terminated polythioether as defined in any one of aspects 2-9 and 19; the hydroxyl-terminated polythioether comprises a hydroxyl-terminated polythioether as defined in any one of aspects 10-18, and 19; the diisocyanate comprises the diisocyanate as defined in any one of aspects 20-23 and 45; the non-linear short-chain diol comprises the non-linear short-chain diol as defined in any one of aspects 24-30; and the diisocyanate trimer comprise the diisocyanate trimer as defined in any one of aspects 37-45.

Aspect 92. The method of any one of aspects 90 to 91, wherein (a) combining further comprises combining: a linear-short chain diol; a polythiol polyfunctionalizing agent; a polyol polyfunctionalizing agent; or a combination of any of the foregoing.

Aspect 93. The method of aspect 92, wherein, the linear short-chain diol comprises a linear short-chain diol as defined in any one of aspects 31, 32, and 49; the polythiol polyfunctionalizing agent comprises the polythiol polyfunctionalizing agent as defined in any one of aspects 35, 36, and 47; and the polyol polyfunctionalizing agent comprises the polyol polyfunctionalizing agent as defined in any one of aspects 33, 34, and 48.

Aspect 94. The method of any one of aspects 90 to 93, wherein the diisocyanate trimerization catalyst comprises a tertiary amine catalyst.

Aspect 95. The method of any one of aspects 90 to 94, wherein the diisocyanate trimerization catalyst comprises N,N'-dimethylcyclohexylamine.

Aspect 96. The method of any one of aspects 90 to 95, wherein the cross-linking catalyst comprises an organo-tin catalyst.

Aspect 97. The method of any one of aspects 90 to 96, wherein the second mixture is characterized by an isocyanate content within a range from 2% to 8%, wherein the isocyanate content is determined by indirect titration.

Aspect 98. The method of any one of aspects 90 to 91, wherein the second mixture, before reacting, comprises a molar ratio of diisocyanate to diisocyanate trimer within a range from 4:1 to 9:1.

Aspect 99. An isocyanate-terminated chain-extended-polythioether prepolymer prepared by the method of any one of aspects 90 to 98.

Aspect 100. A composition comprising the isocyanate-terminated chain-extended polythioether prepolymer of any one of aspects 1 to 89 or 99.

Aspect 101. The composition of aspect 100, wherein the composition comprises from 10 wt % to 90 wt % of the isocyanate-terminated chain-extended polythioether prepolymer, wherein wt % is based on the total weight of the composition.

Aspect 102. The composition of any one of aspects 100 to 101, further comprising a filler.

Aspect 103. The composition of aspect 102, wherein the filler comprises an organic filler, an inorganic filler, an electrically conductive filler, a low-density filler, or a combination of any of the foregoing.

Aspect 104. The composition of any one of aspects 102 to 103, wherein the composition comprises from 0.1 wt % to 80 wt % of the filler, wherein wt % is based on the total weight of the composition.

Aspect 105. The composition of any one of aspects 102 to 104, wherein the composition comprises from 0.1 vol % to 80 vol % of the filler, wherein vol % is based on the total volume of the composition.

Aspect 106. The composition of any one of aspects 100 to 105, further comprising a curing agent reactive with the isocyanate-terminated chain-extended polythioether.

Aspect 107. The composition of aspect 106, wherein the curing agent comprises a polyamine, a blocked polyamine, a polyol, a blocked polyol, or a combination of any of the foregoing.

Aspect 108. The composition of any one of aspects 106 to 107, wherein the composition comprises from 1 wt % to 15 wt % of the curing agent, wherein wt % is based on the total weight of the composition.

Aspect 109. The composition of any one of aspects 100 to 108, further comprising a solvent.

Aspect 110. The composition of aspect 109, wherein the composition comprises from 15 wt % to 40 wt % of the solvent, wherein wt % is based on the total weight of the composition.

Aspect 111. The composition of any one of aspects 100 to 110, wherein the composition further comprises a catalyst for catalyzing the reaction of an isocyanate group with an amine group or for catalyzing the reaction of an isocyanate group with a hydroxyl group.

Aspect 112. The composition of any one of aspects 100 to 111, wherein the composition is formulated as a sprayable composition.

Aspect 113. The composition of any one of aspects 100 to 112, wherein the composition comprises: from 10 wt % to 40 wt % of the isocyanate-terminated chain-extended polythioether prepolymer; from 1 wt % to 70 wt % of a filler; from 15 wt % to 40 wt % of a solvent; and from 1 wt % to 6 wt % of a curing agent, wherein wt % is based on the total weight of the composition.

Aspect 114. A cured composition prepared from the composition of any one of aspects 100 to 113.

Aspect 115. A part comprising the cured composition of aspect 114.

Aspect 116. The part of aspect 115, wherein the part comprises a portion of an aerospace vehicle.

Aspect 117. A vehicle comprising the cured composition of any one of aspects 114 to 116.

Aspect 118. A method of coating a surface, comprising applying the composition of any one of aspects 100 to 113 to a surface; and curing the applied composition to provide a surface coating.

Aspect 119. The method of aspect 118, wherein coating a surface comprises sealing a surface.

Aspect 120. The method of any one of aspects 118 to 119, wherein applying comprises spraying.

Aspect 121. The method of any one of aspects 118 to 120, wherein curing comprises allowing the applied composition to cure at a temperature within a range from 20° C. to 25° C.

Aspect 122. The method of any one of aspects 118 to 122, wherein the surface comprises a surface of a vehicle.

Aspect 123. A cured composition prepared using the method of any one of aspects 118 to 123.

Aspect 124. A part comprising the cured composition of aspect 123.

Aspect 125. The part of aspect 124, wherein the part comprises a portion of an aerospace vehicle.

Aspect 126. A vehicle comprising the cured composition of aspect 123.

Aspect 127. A coating system comprising: a first part, wherein the first part comprises the isocyanate-terminated chain-extended polythioether prepolymer of any one of aspects 1 to 89 or 99; and a second part, wherein the second part comprises a curing agent reactive with the isocyanate-terminated chain-extended polythioether prepolymer.

Aspect 128. The coating system of aspect 127, wherein the first part further comprises a filler and a solvent.

Aspect 129. The coating system of any one of aspects 127 to 128, wherein the first part comprises: from 10 wt % to 40 wt % of the isocyanate-terminated chain-extended polythioether; from 1 wt % to 70 wt % of a filler; and from 1 wt % to 15 wt % of a solvent, wherein wt % is based on the total weight of the first part.

Aspect 130. The coating system of any one of aspects 127 to 129, wherein the first part and the second part are combined.

Aspect 131. The coating system of any one of aspects 127 to 130, wherein the system comprises a third part, wherein the third part comprises solvent.

Aspect 132. A method of coating a surface, comprising: combining the first part of the coating system of any one of aspects 127 to 131 with the second part of the coating system of any one of aspects 127 to 131 to provide a coating composition; applying the coating composition to a surface; and curing the applied coating composition to provide a coated surface.

Aspect 133. The method of aspect 132, wherein applying comprises spraying.

Aspect 134. The method of any one of aspects 132 to 133, wherein curing comprises allowing the applied composition to cure at a temperature within a range from 20° C. to 25° C.

Aspect 135. The method of any one of aspects 132 to 134, wherein the surface comprises a surface of a vehicle.

Aspect 136. A cured composition prepared using the method of any one of aspects 132 to 135.

Aspect 137. A part comprising the cured composition of aspect 136.

Aspect 138. The part of aspect 137, wherein the part comprises a portion of a vehicle.

Aspect 139. A vehicle comprising the cured composition of aspect 136.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled to their full scope and equivalents thereof.

What is claimed is:

1. An isocyanate-terminated chain-extended polythioether prepolymer comprising reaction products of reactants, wherein the reactants comprise:
   a thiol-terminated polythioether, a hydroxyl-terminated polythioether, or a combination thereof;
   a diisocyanate;
   a diisocyanate trimer; and
   a non-linear short chain diol, wherein the prepolymer:
is characterized by an isocyanate content from 4% to 6%, wherein the isocyanate content is determined according to indirect titration; and
comprises diisocyanates and diisocyanate trimers incorporated into the prepolymer backbone.

2. The prepolymer of claim 1, wherein the thiol-terminated polythioether, the hydroxyl-terminated polythioether, or both the thiol-terminated polythioether and the hydroxyl-terminated polythioether comprise a moiety having the structure of Formula (2)

$$-S-R^1-[S-A-S-R^1-]_n-S- \qquad (2)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$;
p is an integer from 2 to 6;
q is an integer from 1 to 5;
r is an integer from 2 to 10;
each $R^3$ is independently selected from hydrogen and methyl; and
each X is independently selected from O, S, S—S, and NR, wherein R is selected from hydrogen and methyl; and
each A is independently a moiety derived from a polyvinyl ether of Formula (3) and a moiety derived from a polyalkenyl polyfunctionalizing agent of Formula (4):

$$CH_2=CH-O-(R^2-O)_m-CH=CH_2 \qquad (3)$$

$$B^2(-R^{20}-CH=CH_2)_z \qquad (4)$$

wherein,
m is an integer from 0 to 50;
each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$,
wherein p, q, r, $R^3$, and X are as defined as for $R^1$; and
$B^2$ is derived from an atom, a $C_{2-4}$ alkane, a $C_{2-8}$ heteroalkane, a cycloalkane, a substituted cycloalkane, a heterocycloalkane, a substituted heterocycloalkane, an arene, a substituted arene, a heteroarene, or a substituted heteroarene;
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

3. The prepolymer of claim 2, wherein each A is independently selected from a moiety of Formula (3a) and a moiety of Formula (4a):

$$-(CH_2)_2-O-(R^2-O)_m(CH_2)_2- \qquad (3a)$$

$$B^2\{-R^{20}-(CH_2)_2-\}_2\{-R^{20}-(CH_2)_2-S-[-R^1-S-A-S-]_{n1}-R^1-S-\}_{z-2} \qquad (4a)$$

wherein n1 is an integer from 0 to 60.

4. The prepolymer of claim 1, wherein the thiol-terminated polythioether comprises a thiol-terminated polythioether of Formula (2a):

$$HS-R^1-[S-A-S-R^1-]_n-SH \qquad (2a)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$;
p is an integer from 2 to 6;
q is an integer from 1 to 5;
r is an integer from 2 to 10;
each $R^3$ is independently selected from hydrogen and methyl; and
each X is independently selected from O, S, S—S, and NR, wherein R is selected from hydrogen and methyl; and
each A is independently a moiety derived from a polyvinyl ether of Formula (3) or a moiety derived from a polyalkenyl polyfunctionalizing agent of Formula (4):

$$CH_2=CH-O-(R^2-O)_m-CH=CH_2 \qquad (3)$$

$$B^2(-R^{20}-CH=CH_2)_z \qquad (4)$$

wherein,
each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$,
wherein p, q, r, $R^3$, and X are as defined as for $R^1$;
m is an integer from 0 to 50; and
$B^2$ is derived from an atom, a $C_{2-4}$ alkane, a $C_{2-8}$ heteroalkane, a cycloalkane, a substituted cycloalkane, a heterocycloalkane, a substituted heterocycloalkane, an arene, a substituted arene, a heteroarene, or a substituted heteroarene;
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

5. The prepolymer of claim 1, wherein the hydroxyl-terminated polythioether comprises a hydroxyl-terminated polythioether of Formula (2b):

$$HO-R^{10}-S-R^1-[S-A-S-R^1-]_n-S-R^{10}-OH \qquad (2b)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$;
p is an integer from 2 to 6;
q is an integer from 1 to 5;
r is an integer from 2 to 10;
each $R^3$ is independently selected from hydrogen and methyl; and
each X is independently selected from O, S, S—S, and NR, wherein R is selected from hydrogen and methyl; and
each A is independently a moiety derived from a polyvinyl ether of Formula (3) or a moiety derived from a polyalkenyl polyfunctionalizing agent of Formula (4):

$$CH_2=CH-O-(R^2-O)_m-CH=CH_2 \qquad (3)$$

$$B^2(-R^{20}-CH=CH_2)_z \qquad (4)$$

wherein,
each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, R³, and X are as defined as for R¹;
m is an integer from 0 to 50;
B² is derived from an atom, a C₂₋₄ alkane, a C₂₋₈ heteroalkane, a cycloalkane, a substituted cycloalkane, a heterocycloalkane, a substituted heterocycloalkane, an arene, a substituted arene, a heteroarene, or a substituted heteroarene;
z is an integer from 3 to 6; and
each R²⁰ is independently selected from $C_{1-10}$ alkanediyl, $C_{1-10}$ heteroalkanediyl, substituted $C_{1-10}$ alkanediyl, and substituted $C_{1-10}$ heteroalkanediyl; and
R¹⁰ is a moiety derived from the reaction of a compound comprising a hydroxyl group and a group reactive with a thiol group.

6. The prepolymer of claim 5, wherein each A is independently selected from a moiety of Formula (3a) and a moiety Formula (4a):

—(CH₂)₂—O—(R²—O)ₘ—(CH₂)₂—  (3a)

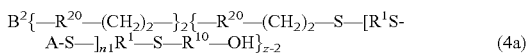  (4a)

wherein n1 in an integer from 0 to 60.

7. The prepolymer of claim 1, wherein the diisocyanate comprises a diisocyanate having the structure of Formula (8):

O=C=N—R⁴—N=C=O  (8)

wherein R⁴ is selected from $C_{1-10}$ alkane-diyl, $C_{5-8}$ cycloalkanediyl, $C_{6-10}$ arene-diyl, $C_{6-18}$ alkanecycloalkane-diyl, $C_{7-18}$ alkanearene-diyl, $C_{1-10}$ heteroalkanediyl, $C_{5-8}$ heterocycloalkane-diyl, $C_{6-10}$ heteroarenediyl, $C_{6-18}$ heteroalkanecycloalkane-diyl, $C_{7-18}$ hetero alkanearene-diyl, substituted $C_{1-10}$ alkane-diyl, substituted $C_{5-8}$ cycloalkane-diyl, substituted $C_{6-10}$ arene-diyl, substituted $C_{6-18}$ alkanecycloalkane-diyl, substituted $C_{7-18}$ alkanearene-diyl, substituted $C_{1-10}$ heteroalkane-diyl, substituted $C_{5-8}$ heterocycloalkanediyl, and substituted $C_{6-10}$ heteroarene-diyl.

8. The prepolymer of claim 1, wherein the non-linear short chain diol comprises:
a branched short-chain diol;
a cyclic diol; or
a combination thereof.

9. The prepolymer of claim 8, wherein the branched short-chain diol comprises a branched short-chain diol of Formula (10):

HO—[C(R⁵)₂—]ₛ—OH  (10)

wherein,
s is an integer from 1 to 10;
each R⁵ is independently selected from hydrogen and $C_{1-6}$ alkyl; and
at least one R⁵ is $C_{1-6}$ alkyl.

10. The prepolymer of claim 1, wherein the diisocyanate trimer comprises a diisocyanate trimer having the structure of Formula (9):

B³{—R⁴—N=C=O}₃  (9)

wherein,
each R⁴ is independently selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ hetero alkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl B³ is a moiety having the structure:

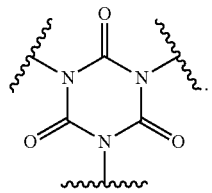 [SMILES: *n1c(=O)n(*)c(=O)n(*)c1=O]

11. An isocyanate-terminated chain-extended polythioether prepolymer comprising a moiety of Formula (15):

-[-E-C(O)—NH-D-NH—C(O)—]ₙ—  (15)

wherein,
n is an integer from 1 to 60;
each E is independently selected from (i), (ii), and (iii), wherein,
(i) is a moiety derived from a non-linear short-chain diol;
(ii) is a moiety derived from a thiol-terminated polythioether; and
(iii) is a moiety derived from a hydroxyl-terminated polythioether; and
each D is independently selected from a moiety derived from a diisocyanate and a moiety derived from a diisocyanate trimer,
wherein the prepolymer is characterized by an isocyanate content from 4% to 6%, wherein the isocyanate content is determined according to indirect titration;
wherein the prepolymer comprises diisocyanates and diisocyanate trimers incorporated into the prepolymer backbone; and
wherein the prepolymer comprises:
at least one moiety of Formula (15) in which E is selected from (i); and at least one moiety of Formula (15) in which E is selected from (ii); or
at least one moiety of Formula (15) in which E is selected from (i); and at least one moiety of Formula (15) in which E is selected from (iii).

12. The prepolymer of claim 11, wherein the non-linear short-chain diol has the structure of Formula (10) and the moiety derived from the non-linear short-chain diol has the structure of Formula (10a):

HO—[C(R⁵)₂—]ₛ—OH  (10)

—O—[C(R⁵)₂—]ₛ—O—  (10a)

wherein,
s is an integer from 1 to 10;
each R⁵ is independently selected from hydrogen and $C_{1-6}$ alkyl; and
at least one R⁵ is $C_{1-6}$ alkyl.

13. The prepolymer of claim 11, wherein the thiol-terminated polythioether has the structure of Formula (2a) and the moiety derived from the thiol-terminated polythioether has the structure of Formula (2):

HS—R¹—[S-A-S—R¹—]ₙ—SH  (2a)

—S—R¹—[S-A-S—R¹—]ₙ—S—  (2)

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and —[(CHR$^3$)$_p$—X—]$_q$(CHR$^3$)$_r$—;
p is an integer from 2 to 6;
q is an integer from 1 to 5;
r is an integer from 2 to 10;
each $R^3$ is independently selected from hydrogen and methyl; and
each X is independently selected from O, S, S—S, and NR, wherein R is selected from hydrogen and methyl; and
each A is independently a moiety derived from a polyvinyl ether of Formula (3) or a moiety derived from a polyalkenyl polyfunctionalizing agent of Formula (4):

$$CH_2=CH-O-(R^2-O)_m-CH=CH_2 \quad (3)$$

$$B^2(-R^{20}-CH=CH_2)_z \quad (4)$$

wherein,
m is an integer from 0 to 50;
each $R^2$ is independently selected from $C_{1-10}$ alkanediyl, $C_{6-8}$ cycloalkanediyl, $C_{6-14}$ alkanecycloalkanediyl, and —[(CHR$^3$)$_p$—X—]$_q$(CHR$^3$)$_r$—, wherein p, q, r, $R^3$, and X are as defined as for $R^1$;
$B^2$ is derived from an atom, a $C_{2-4}$ alkane, a $C_{2-8}$ heteroalkane, a cycloalkane, a substituted cycloalkane, a heterocycloalkane, a substituted heterocycloalkane, an arene, a substituted arene, a heteroarene, or a substituted heteroarene;
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

14. The prepolymer of claim 13, wherein each A is independently selected from a moiety of Formula (3a) and a moiety of Formula (4a):

$$-(CH_2)_2-O-(R^2-O)_m-(CH_2)_2- \quad (3a)$$

$$B^2\{-R^{20}-(CH_2)_2-\}_2\{-R^{20}-(CH_2)_2-S-[-R^1-S-A-S-]_{n1}-R^1-S\}_{z-2} \quad (4a)$$

wherein,
each $R^2$ is independently selected from $C_{1-10}$ alkanediyl, $C_{6-8}$ cycloalkanediyl, $C_{6-14}$ alkanecycloalkanediyl, and —[(CHR$^3$)$_p$—X—]$_q$(CHR$^3$)$_r$—, wherein p, q, r, $R^3$, and X are as defined as for $R^1$;
m is an integer from 0 to 50; and
each n1 is independently selected from an integer from 0 to 60;
$B^2$ is derived from an atom, a cycloalkane, a substituted cycloalkane, a heterocycloalkane, a substituted heterocycloalkane, an arene, a substituted arene, a heteroarene, or a substituted heteroarene;
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

15. The prepolymer of claim 13, wherein the hydroxyl-terminated polythioether has the structure of Formula (2b) and the moiety derived from the hydroxyl-terminated polythioether has the structure of Formula (2c):

$$HO-R^{10}-S-R^1-[S-A-S-R^1]_n-S-R^{10}-OH \quad (2b)$$

$$-O-R^{10}-S-R^1-[S-A-S-R^1]_n-S-R^{10}-O- \quad (2c)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and —[(CHR$^3$)$_p$—X—]$_q$(CHR$^3$)$_r$—;
p is an integer from 2 to 6;
q is an integer from 1 to 5;
r is an integer from 2 to 10;
each $R^3$ is independently selected from hydrogen and methyl; and
each X is independently selected from O, S, S—S, and NR, wherein R is selected from hydrogen and methyl;
each A is independently a moiety derived from a polyvinyl ether or a moiety derived from another polyalkenyl polyfunctionalizing agent; and
each $R^{10}$ is independently a moiety derived from the reaction of a compound comprising a hydroxyl group and a group reactive with a thiol group.

16. The prepolymer of claim 15, wherein each A is independently selected from a moiety of Formula (3a) and a moiety of Formula (4a):

$$-(CH_2)_2-O-(R^2-O)_m-(CH_2)_2- \quad (3a)$$

$$B^2\{-R^{20}-(CH_2)_2-\}_2\{-R^{20}-(CH_2)_2-S-[-R^1-S-A-S-]_{n1}-R^1-S\}_{z-2} \quad (4a)$$

wherein,
each $R^2$ is independently selected from $C_{1-10}$ alkanediyl, $C_{6-8}$ cycloalkanediyl, $C_{6-14}$ alkanecycloalkanediyl, and —[(CHR$^3$)$_p$—X—]$_q$(CHR$^3$)$_r$—, wherein p, q, r, $R^3$, and X are as defined as for $R^1$;
m is an integer from 0 to 50; and
each n1 is independently selected from an integer from 0 to 60;
$B^2$ is derived from an atom, a $C_{2-4}$ alkane, a $C_{2-8}$ heteroalkane, a cycloalkane, a substituted cycloalkane, a heterocycloalkane, a substituted heterocycloalkane, an arene, a substituted arene, a heteroarene, or a substituted heteroarene;
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

17. The prepolymer of claim 11, wherein the diisocyanate has the structure of Formula (8) and the moiety derived from the diisocyanate has the structure of Formula (8a):

$$O=C=N-R^4-N=C=O \quad (8)$$

$$-R^4- \quad (8a)$$

wherein,
each $R^4$ is selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ hetero alkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl.

18. The prepolymer of claim 11, wherein the diisocyanate trimer comprises a diisocyanate trimer of Formula (9) and the moiety derived from the diisocyanate trimer comprises a moiety of Formula (9a):

$$B^3\{-R^4-N=C=O\}_3 \quad (9)$$

$$B^3\{-R^4-NH-C(O)-\}_2\{-R^4-R^{41}\} \quad (9a)$$

wherein,
$R^{41}$ is selected from a moiety of Formula (17) and a moiety of Formula (18):

$$-N=C=O \quad (17)$$

$$-NH-C(O)-[-E-C(O)-NH-D-NH-C(O)-]_{n1}-E-C(O)-NH-D-N=C=O \quad (18)$$

each n1 is independently selected from an integer from 0 to 20;
$B^3$ is a moiety having the structure:

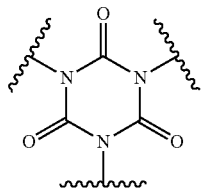 [SMILES: *n1c(=O)n(*)c(=O)n(*)c1=O]

each $R^4$ can independently be selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ hetero alkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl; and
each E and D is defined as for Formula (15).

19. The isocyanate-terminated chain-extended polythioether prepolymer of claim 11, wherein the prepolymer has the structure of Formula (19):

$$O=C=N-D-NH-C(O)-[-E-C(O)-NH-D-NH-C(O)-]_n-E-C(O)-NH-D-N=C=O \quad (19)$$

wherein,
n is an integer from 1 to 60;
each E is independently selected from (i); (ii), and (iii), wherein,
  (i) is a moiety derived from a non-linear short-chain diol;
  (ii) is a moiety derived from a thiol-terminated polythioether; and
  (iii) is a moiety derived from a hydroxyl-terminated polythioether; and
each D is independently selected from a moiety derived from a diisocyanate and a moiety derived from a diisocyanate trimer,
wherein the prepolymer is characterized by an isocyanate content from 4% to 6%, wherein the isocyanate content is determined according to indirect titration;
wherein the prepolymer comprises diisocyanates and diisocyanate trimers incorporated into the prepolymer backbone; and wherein the prepolymer comprises:
  at least one E is selected from (i); and at least one E is selected from (ii);or
  at least one E is selected from (i); and at least one E is selected from (iii).

20. The prepolymer of claim 19, wherein the non-linear short-chain diol has the structure of Formula (10), and the moiety derived from the non-linear short-chain diol has the structure of Formula (10a):

$$HO-[C(R^5)_2-]_s-OH \quad (10)$$

$$-O-[C(R^5)_2-]_s-O- \quad (10a)$$

wherein,
s is an integer from 1 to 10;
each $R^5$ is independently selected from hydrogen and $C_{1-6}$ alkyl; and
at least one $R^5$ is $C_{1-6}$ alkyl.

21. The prepolymer of claim 19, wherein the thiol-terminated polythioether has the structure of Formula (2a), and the moiety derived from the thiol-terminated polythioether has the structure of Formula (2):

$$HS-R^1-[S-A-S-R^1-]_n-SH \quad (2a)$$

$$-S-R^1-[S-A-S-R^1-]_n-S- \quad (2)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$;
p is an integer from 2 to 6;
q is an integer from 1 to 5;
r is an integer from 2 to 10;
each $R^3$ is independently selected from hydrogen and methyl; and
each X is independently selected from O, S, S—S, and NR, wherein R is selected from hydrogen and methyl; and
each A is independently a moiety derived from a polyvinyl ether of Formula (3) or a moiety derived from a polyalkenyl polyfunctionalizing agent of Formula (4):

$$CH_2=CH-O-(R^2-O)_m-CH=CH_2 \quad (3)$$

$$B^2(-R^{20}-CH=CH_2)_z \quad (4)$$

wherein,
each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$,
wherein p, q, r, $R^3$, and X are as defined as for $R^1$;
m is an integer from 0 to 50;
$B^2$ is derived from an atom, a $C_{2-4}$ alkane, a $C_{2-8}$ heteroalkane, a cycloalkane, a substituted cycloalkane, a heterocycloalkane, a substituted heterocycloalkane, arene, a substituted arene, a heteroarene, or a substituted heteroarene;
z is an integer from 3 to 6; and
each $R^{20}$ is independently selected from $C_{1-10}$ alkanediyl, heteroalkanediyl, substituted $C_{1-10}$ alkanediyl, and substituted $C_{1-10}$ heteroalkanediyl.

22. The prepolymer of claim 19, wherein the hydroxyl-terminated polythioether has the structure of Formula (2b), and the moiety derived from the hydroxyl-terminated polythioether has the structure of Formula (2c):

$$HO-R^{10}-S-R^1-[S-A-S-R^1-]_n-S-R^{10}-OH \quad (2b)$$

$$-O-R^{10}-S-R^1-[S-A-S-R^1-]_n-S-R^{10}-O- \quad (2c)$$

wherein, n is an integer from 1 to 60;

each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$;

p is an integer from 2 to 6;

q is an integer from 1 to 5;

r is an integer from 2 to 10;

each $R^3$ is independently selected from hydrogen and methyl; and each X is independently selected from O, S, S—S, and NR, wherein R is selected from hydrogen and methyl; and each A is independently a moiety derived from a polyvinyl ether of Formula (3) or a moiety derived from a polyalkenyl polyfunctionalizing agent of Formula (4):

$$CH_2=CH-O-(R^2-O)_m-CH=CH_2 \quad (3)$$

$$B^2(-R^{20}-CH=CH_2)_z \quad (4)$$

wherein, each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;

m is an integer from 0 to 50;

$B^2$ is derived from an atom, a $C_{2-4}$ alkane, a $C_{2-8}$ heteroalkane, a cycloalkane, a substituted cycloalkane, a heterocycloalkane, a substituted heterocycloalkane, an arene, a substituted arene, a heteroarene, or a substituted heteroarene;

z is an integer from 3 to 6;

each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl; and $R^{10}$ is a moiety derived from the reaction of a compound comprising a hydroxyl group and a group reactive with a thiol group.

23. The prepolymer of claim 19, wherein the diisocyanate has the structure of Formula (8), and the moiety derived from the diisocyanate has the structure of Formula (8a):

$$O=C=N-R^4-N=C=O \quad (8)$$

$$-R^4- \quad (8a)$$

wherein $R^4$ is selected from $C_{1-10}$ alkane-diyl, $C_{5-8}$ cycloalkanediyl, $C_{6-10}$ arene-diyl, $C_{6-18}$ alkanecycloalkane-diyl, $C_{7-18}$ alkanearene-diyl, $C_{1-10}$ heteroalkane-diyl, $C_{5-8}$ heterocycloalkanediyl, $C_{6-10}$ heteroarene-diyl, $C_{6-18}$ heteroalkanecycloalkane-diyl, $C_{7-18}$ heteroalkanearene-diyl, substituted $C_{1-10}$ alkane-diyl, substituted $C_{5-8}$ cycloalkanediyl, substituted $C_{6-10}$ arene-diyl, substituted $C_{6-18}$ alkanecycloalkane-diyl, substituted $C_{7-18}$ alkanearene-diyl, substituted $C_{1-10}$ heteroalkane-diyl, substituted $C_{5-8}$ heterocycloalkanediyl, and substituted $C_{6-10}$ heteroarenediyl.

24. The prepolymer of claim 19, wherein the diisocyanate trimer has the structure of Formula (9), and the moiety derived from the diisocyanate trimer has the structure of Formula (9a):

$$B^3\{-R^4-N=C=O\}_3 \quad (9)$$

$$B^3\{-R^4-NH-C(O)-\}_2\{-R^4-R^{41}\} \quad (9a)$$

wherein, $R^{41}$ is selected from a moiety of Formula (17) and a moiety of Formula (18):

$$-N=C=O \quad (17)$$

$$-NH-C(O)-[-E-C(O)-NH-D-NH-C(O)-]_{n1}-E-C(O)-NH-D-N=C=O \quad (18)$$

each n1 is independently selected from an integer from 0 to 20;

$B^3$ is a moiety having the structure:

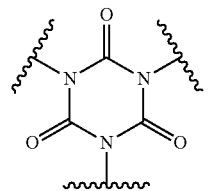 [SMILES: *n1c(=O)n(*)c(=O)n(*)c1=O]

each $R^4$ is independently selected from $C_{1-10}$ alkanediyl, $C_{5-8}$ cycloalkanediyl, $C_{6-10}$ arenediyl, $C_{6-18}$ alkanecycloalkanediyl, $C_{7-18}$ alkanearenediyl, $C_{1-10}$ heteroalkanediyl, $C_{5-8}$ heterocycloalkanediyl, $C_{6-10}$ heteroarenediyl, $C_{6-18}$ heteroalkanecycloalkanediyl, $C_{7-18}$ hetero alkanearenediyl, substituted $C_{1-10}$ alkanediyl, substituted $C_{5-8}$ cycloalkanediyl, substituted $C_{6-10}$ arenediyl, substituted $C_{6-18}$ alkanecycloalkanediyl, substituted $C_{7-18}$ alkanearenediyl, substituted $C_{1-10}$ heteroalkanediyl, substituted $C_{5-8}$ heterocycloalkanediyl, and substituted $C_{6-10}$ heteroarenediyl; and each E and D is defined as for Formula (15).

25. A composition comprising the isocyanate-terminated chain-extended polythioether prepolymer of claim 1.

26. A cured composition prepared from the composition of claim 25.

27. A vehicle comprising the cured composition of claim 26.

28. A method of coating a surface, comprising:
applying the composition of claim 25 to a surface; and
curing the applied composition to provide a surface coating.

29. A coating system comprising:
a first part, wherein the first part comprises the isocyanate-terminated chain-extended polythioether prepolymer of claim 1; and
a second part, wherein the second part comprises a curing agent reactive with the isocyanate-terminated chain-extended polythioether prepolymer.

30. The prepolymer of claim 1, wherein the molar ratio of the diisocyanate to the diisocyanate trimer is from 4:1 to 10:1.

* * * * *